United States Patent
Karasaki et al.

(10) Patent No.: US 6,260,000 B1
(45) Date of Patent: Jul. 10, 2001

(54) THREE-DIMENSIONAL SHAPE DATA PROCESSING APPARATUS

(75) Inventors: Toshihiko Karasaki, Kawachinagano; Shigenobu Fukushima, Kyoto, both of (JP)

(73) Assignee: Minolta Co., Ltd., Osaka (JP)

( * ) Notice: Subject to any disclaimer, the term of this patent is extended or adjusted under 35 U.S.C. 154(b) by 0 days.

(21) Appl. No.: 09/187,467

(22) Filed: Nov. 4, 1998

(30) Foreign Application Priority Data

Nov. 4, 1997 (JP) .................................................. 9-301636
Nov. 4, 1997 (JP) .................................................. 9-301637
Nov. 4, 1997 (JP) .................................................. 9-301638
Nov. 4, 1997 (JP) .................................................. 9-301639

(51) Int. Cl.$^7$ ............................. G06F 15/00; G01B 5/20; G10B 3/14

(52) U.S. Cl. .......................... 702/155; 702/158; 702/167; 33/554; 382/154

(58) Field of Search ................................. 702/33, 36, 94, 702/95, 119, 123, 150–153, 155–159, 166–168, 170, 171, 172; 33/1 BB, 512, 551–554; 700/98, 118, 163; 382/154, 285

(56) References Cited

U.S. PATENT DOCUMENTS 5,481,465 * 1/1996 Itoh et al. ............................. 700/118
5,668,894 * 9/1997 Hamano et al. ..................... 382/242

FOREIGN PATENT DOCUMENTS 8-110959 4/1996 (JP) .

* cited by examiner

Primary Examiner—Kamini Shah
Assistant Examiner—Manuel L. Barbee
(74) Attorney, Agent, or Firm—Sidley & Austin

(57) ABSTRACT

When the user inputs at least four points that designates the path on the surface of a three-dimensional shape represented by three-dimensional shape data, groups of three points in which two points are commonly included in two groups are formed from the input points. Each group of three points defines a plane including the three points. The line of intersection of each plane and the surface of the three-dimensional shape is obtained to calculate lengths of the line of intersection between the adjacent two points of the three points in each of the groups. Two lengths between the two points that are commonly included in two groups along two different lines of intersection are obtained for one length of the path between the two points. As a result, the average of the two lengths is estimated as the length of the path between the two points. The total length of the path is obtained according to the estimated lengths and lengths along lines of intersection.

26 Claims, 45 Drawing Sheets

OPTICAL AXIS

Fig. 5

SOLID MODEL DATA

| POLYGON MESH LIST | | | | | | |
|---|---|---|---|---|---|---|
| | 1250 1280 | | | | | → (NUMBER OF VERTEXES N) (NUMBER OF POLYGONS N) |
| POLYGON No.1 | 3 | No.41 | No.2 | No.1 | | → (NUMBER OF VERTEXES OF POLYGON No.1, VERTEX NUMBERS) |
| POLYGON No.2 | 4 | No.2 | No.41 | No.42 | No.3 | → (NUMBER OF VERTEXES OF POLYGON No.2, VERTEX NUMBERS) |
| POLYGON No.3 | 4 | No.3 | No.42 | No.43 | No.4 | → (NUMBER OF VERTEXES OF POLYGON No.3, VERTEX NUMBERS) |
| POLYGON No.4 | 4 | No.4 | No.43 | No.44 | No.5 | → (NUMBER OF VERTEXES OF POLYGON No.4, VERTEX NUMBERS) |
| | ⋮ | | | | | |
| | 3 | No.1249 | No.40 | No.1 | | |

| VERTEX LIST | | |
|---|---|---|
| VERTEX No.1 | (0.961807, -2.390115, 0.208834) | → (THREE-DIMENSIONAL COORDINATES OF VERTEX No.1) |
| VERTEX No.2 | (-0.356732, 2.458620, -0.089080) | → (THREE-DIMENSIONAL COORDINATES OF VERTEX No.2) |
| VERTEX No.3 | (1.211807, -2.332231, 0.208834) | → (THREE-DIMENSIONAL COORDINATES OF VERTEX No.3) |
| VERTEX No.4 | (1.461807, -2.274347, 0.208835) | → (THREE-DIMENSIONAL COORDINATES OF VERTEX No.4) |
| ⋮ | ⋮ | |

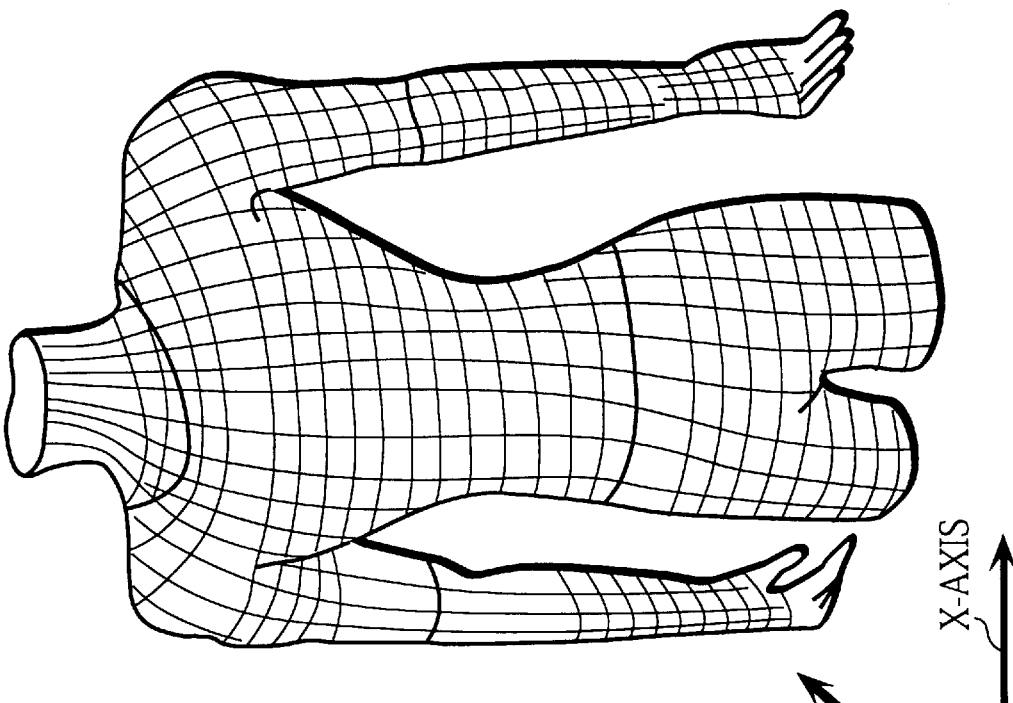
Fig. 7b VIEWER COORDINATE SYSTEM
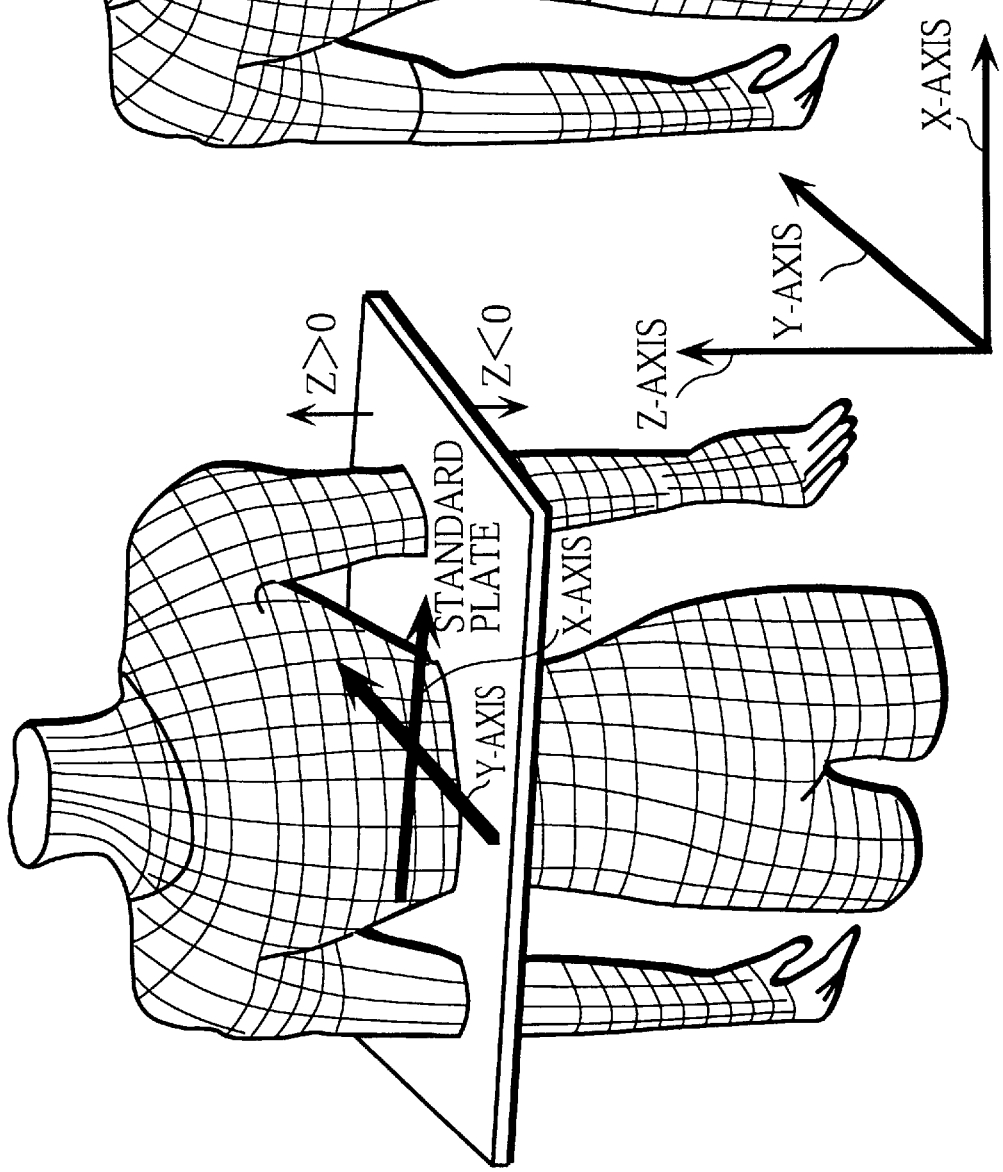
Fig. 7a CANVAS COORDINATE SYSTEM

| STANDARD PLATE DATA ||
|---|---|
| NORMAL VECTOR(p,q,r) ||
| COORDINATES OF ORIGIN(Xa,Ya,Za) ||
| WIDTH Lx | LENGTH Ly |

CANVAS COORDINATE SYSTEM

X····INTERSECTION POINTS OF SEGMENTS AND SURFACE OF STANDARD PLATE

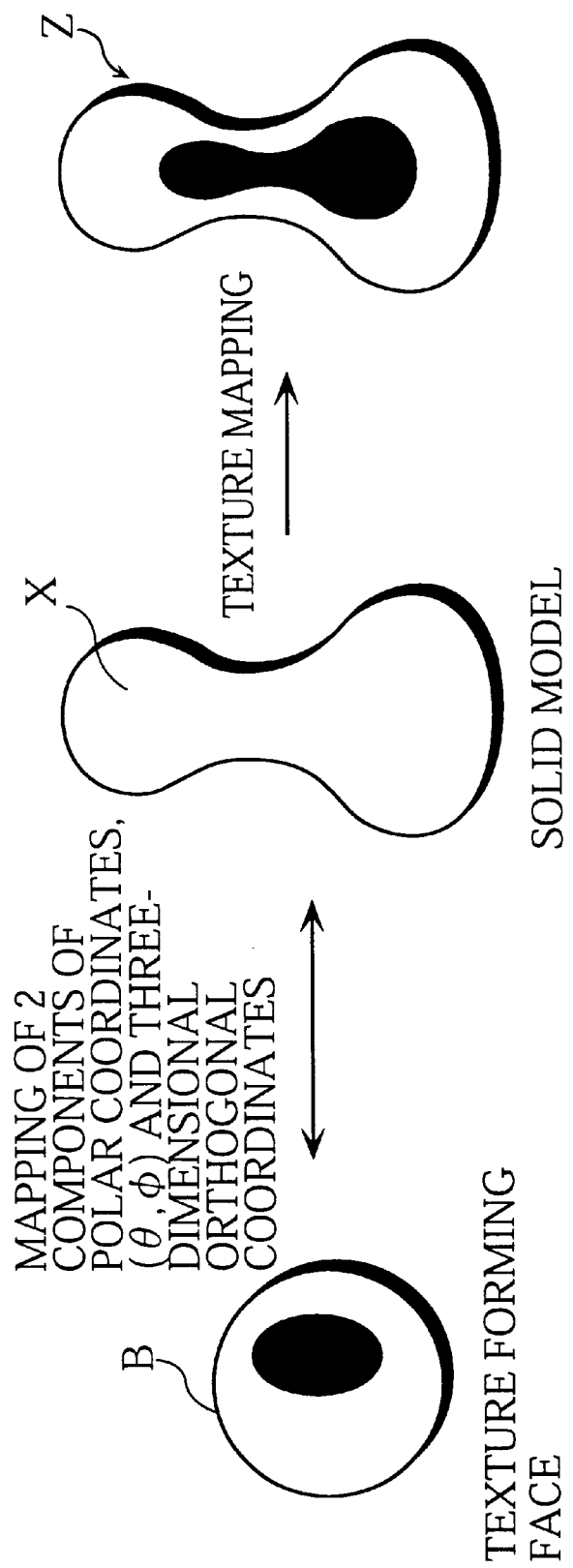

SECTIONAL DATA

SECTIONAL DATA

THREE-DIMENSIONAL SHAPE DATA PROCESSING APPARATUS

This application is based on application Nos. 9-301636, 9-301637, 9-301638, and 9-301639 filed in Japan, the contents of which are hereby incorporated by reference.

BACKGROUND OF THE INVENTION (1) Field of the Invention

The present invention relates to a three-dimensional shape data processing apparatus that obtains three-dimensional shape data of an object and analyzes the features of the object.

(2) Related Art

Recently the technologies of obtaining three-dimensional shape data have developed. In such a technology, the spatial positions of a plurality of points on an object are obtained as three-dimensional shape data with, for instance, a range finder. Those obtained three-dimensional shape data are analyzed according to a mathematical method to be used in the analysis of physical features of the object.

The demand for obtainment of path lengths of paths along the surface of an object according to such three-dimensional shape data has increased. With the consumer demand for user-friendly products, custom-made clothes, shoes, glasses, and the like designed according to the three-dimensional shape model data obtained by measuring a human body have become popular recently. In this case, a plurality of characteristic points on a human body are designated and, for instance, clothes are designed according to the path lengths of the paths drawn through the characteristic points. In order to have the clothes fit the body, it is favorable to obtain not the sum of the lengths of straight lines between the characteristic points but the path lengths of the paths drawn through the characteristic points along the surface of the body.

It has been impossible, however, to obtain the precise path length of a path along a desired line on the surface of an object that has a complicated shape such as a human body according to such three-dimensional shape data.

As the analysis of the features of the object, the unevenness on the surface of the object is also calculated according to such three-dimensional shape data.

The three-dimensional shape data obtained by measuring an object with a range finder are only represented by a group of points that are spatially designated and the unevenness on the surface of the object may not be easily distinguished. As a result, it is necessary to obtain the characteristic amount representing the surface shape of the object, such as curvatures and differential values, and to evaluate the values quantatively.

According to the conventional manner, the characteristic amount such as a curvature at a vertex is calculated using the coordinates of the vertex and the surrounding vertexes in accordance with an approximate expression.

When obtaining three-dimensional shape data of an object, however, the intervals between the vertexes are irregular depending on the shape of the object or the measurement manner. More specifically, when measuring the shape of an object with a range finder, the surface of the object is measured by directing a beam in one direction that moves with regular intervals. As a result, the relationship between the direction of the optical axis of the beam and the direction of a normal of the surface is different for each sampling point, so that the intervals between sampling points on the surface of the object are irregular. As shown in FIG. 1, when sampling points on the surface of an object X by directing a beam in one direction at the surface of the object with regular intervals, the distance between points Pa and Pb and the distance between points Pc and Pd are different.

When the intervals between the vertexes (sampling points) are irregular, the accuracy of the characteristic amount at a vertex is different according to the area of the vertex on the object because the characteristic amount at a vertex on an area that has a relatively high vertex density is calculated according to the vertexes on a relatively small area and the characteristic amount at a vertex on an area that has a relatively low vertex density is calculated according to the vertexes on a relatively large area. As a result, the spatial frequency of the unevenness on the surface of the object is different according to vertex density.

Concerning characteristic amount, the characteristic amount at a vertex is affected by the degree of unevenness on the surface of an object. For instance, an outline of an object whose three-dimensional shape data have been obtained is the curved line on a two-dimensional plane as shown in FIG. 2a. The curved line has many small concaves and convexes due to the high-frequency noise of obtained data. When the data with high spatial frequency are removed, the curved line becomes smooth as shown in FIG. 2b. As a result, the characteristic amount such as the differential values at a point A in FIGS. 2a and 2b are different.

When an object has the uneven surface with many small concaves and convexes, the degree of unevenness on the surface of the object desired by the user depends on the needs. The user may desire to calculate the characteristic amount at a vertex on a smooth curved line with small spatial frequency or the characteristic amount at a vertex on an uneven curved line with small spatial frequency.

In a conventional manner, the characteristic amount at a vertex is calculated according to the coordinates of the vertex and the surrounding vertexes. As a result, the area on the surface of the object according to which the characteristic amount is calculated is fixed for each vertex. The characteristic amount at a vertex is calculated only according to the degree of spatial frequency determined by the density of the vertexes in the fixed area. As a result, it is impossible to flexibly calculate the characteristic amount according to the degree of unevenness.

According to a conventional manner, the characteristic amount that represents the surface shape of an object, such as a curvature and differential value, is calculated for three-dimensional shape data, which is represented by X-Y coordinates and the value of height, and is represented by the numeric value of the characteristic amount at the X-Y coordinates.

When the characteristic amount is represented by a numeric value, however, the concaves and convexes on the surface of an object may not be seen. The characteristic amount is calculated from three-dimensional shape data. As a result, when the characteristic amount is represented using two-dimensional X-Y coordinates, it is difficult to find the point at which the characteristic amount is located.

In addition, it is necessary to obtain the three-dimensional shape data of the object completely in order to analyze three-dimensional shape data precisely.

When measuring an object, some points on the object may not be measured due to the measurement direction, the light reflection on the surface of the object, and the color and the shade of the object. In this case, it is impossible to obtain the three-dimensional shape data of the points. When the three-dimensional shape data of some points on the object may not be obtained, it is impossible to analyze the physical features of the points and to calculate the volume of the object and the like.

According to a conventional manner, when the three-dimensional shape data of some points on the object are not obtained, the user edits a vertex as polygon mesh data or adding polygon mesh data with a hand process to supplement the three-dimensional shape data.

When the user supplements the three-dimensional shape data that has not been obtained with a hand process, the three-dimensional shape data is easily detected. At the same time, however, when the amount of data is large, the workload by the user is heavy. In addition, since the three-dimensional shape data is added on the two-dimensional image in the process, it is difficult to smoothly connect newly added polygon mesh data with the original polygon mesh data.

SUMMARY OF THE INVENTION

It is accordingly an object of the present invention to provide a three-dimensional shape data processing apparatus that calculates the length of a path including at least four points on the surface of a three-dimensional shape.

Another object of the present invention is to provide a three-dimensional shape data processing apparatus that adjusts the spatial frequency of the unevenness of the surface of the three-dimensional shape when calculating characteristic amount from the three-dimensional shape data.

A further object of the present invention is to provide a three-dimensional shape data processing apparatus that has the user see the position and the value of the characteristic amount on the surface of the three-dimensional shape.

Yet another object of the present invention is to provide a three-dimensional shape data processing apparatus that easily detects and supplements the data loss part of the three-dimensional shape.

The above-mentioned first object is achieved by a three-dimensional shape data processing apparatus that measures a length of a path on a surface of a three-dimensional shape represented by three-dimensional shape data, including: a point acceptance section for accepting input of at least four points that designates the path on the surface of the three-dimensional shape; a grouping section for grouping the points that have been accepted by the point acceptance section to form groups, each of which includes three points, wherein two points in one group are included in another group; a first length obtaining section for obtaining each first length that is a length between two adjacent points of three points in one of the groups along a line of intersection of a plane including the three points and the surface of the three-dimensional shape for each of the groups; a second length obtaining section for obtaining each second length that is a length between two points commonly included in two of the groups along the path that has been designated by the point acceptance section according to first lengths that has been obtained by the first length obtaining section.

In the three-dimensional shape data processing apparatus, even when the path on the surface of the three-dimensional shape is designated by at least four points, the first length obtaining section may obtain each first length that is the length between adjacent two points in a group of three points two points of which are included in another group of three points along the line of intersection of the plane designated by three points in the group and the surface of the three-dimensional shape. The second length obtaining section may properly obtain each second length that is the length between adjacent two points included by two groups of three points along the path on the surface of the three-dimensional shape by referring to each first length that has been obtained by the first length obtaining section. As a result, the length of the path designated by at least four points may be obtained.

The above-mentioned second object is achieved by a three-dimensional shape data processing apparatus that calculates characteristic amount representing a shape of a surface of a three-dimensional shape represented by three-dimensional shape data, including: a distance information obtaining section for obtaining distance information; a point obtaining section for obtaining a plurality of points in an area defined by the obtained distance information on the surface of the three-dimensional shape; and a characteristic amount calculation section for considering the surface of the three-dimensional shape including the obtained plurality of points to be a smoothed curved surface and for calculating the characteristic amount for a shape of the smoothed curved surface.

Such a three-dimensional shape data processing apparatus considers the shape of the surface of the three-dimensional shape within the predetermined area to be a smoothed curved surface, and obtains the characteristic amount on the predetermined area. As a result, the characteristic amount on the surface of the three-dimensional shape at a proper degree of spatial frequency may be obtained.

The above-mentioned third object is achieved by a three-dimensional shape data processing apparatus that processes three-dimensional shape data representing a three-dimensional shape, including: a characteristic amount obtaining section for obtaining characteristic amount that represents a shape of a surface of the three-dimensional shape at a plurality of points on the surface of the three-dimensional shape; a texture creation section for creating a texture pattern on a texture forming face that corresponds to the surface of the three-dimensional shape according to the obtained characteristic amount at the plurality of points on the surface of the three-dimensional shape; and a texture mapping section for mapping the created texture pattern on the surface of the three-dimensional shape.

Such a three-dimensional shape data processing apparatus obtains the characteristic amount on the surface of the three-dimensional shape, forms a texture pattern according to the obtained characteristic amount, and maps the texture pattern at the corresponding position on the surface of the three-dimensional shape. As a result, the characteristics of the shape on the surface of the three-dimensional shape may be seen.

The above-mentioned fourth object is achieved by a three-dimensional shape data processing apparatus that supplements a deficit of three-dimensional shape data, including: a section obtaining section for cutting a three-dimensional shape represented by the three-dimensional shape data with a plurality of planes to obtain a plurality of sections, each of which is represented by a piece of sectional data; a lack extracting section for extracting a lack for each of outlines of the plurality of sections; a supplement section for supplementing the lack of each outline found by the lack extracting section, and for supplementing sectional data corresponding to the lack; and a restoration section for restoring the three-dimensional shape data using pieces of sectional data including the sectional data that have been supplemented by the supplement section.

Such a three-dimensional shape data processing apparatus cuts the three-dimensional shape represented by the three-dimensional shape data with the plurality of planes, obtains the plurality of sections, each of which is represented by sectional data, and extracts and supplements a lack of each of outlines of the plurality of sections to supplement the data loss parts of the sectional data. Each lack of outline is supplemented on the two-dimensional plane. As a result, the data loss part may be supplemented easily. The three-dimensional shape data may be supplemented using the supplemented sectional data. As a result, the data loss part may be restored properly.

BRIEF DESCRIPTION OF THE DRAWINGS

These and other objects, advantages and features of the invention will become apparent from the following description thereof taken in conjunction with the accompanying drawings which illustrate a specific embodiment of the invention. In the Drawings:

FIG. 4b shows a solid model of the object shown in FIG. 4a;

FIG. 5 shows the data structure of the solid model;

FIG. 7a shows the coordinate system in a Canvas;

FIG. 7b shows the coordinate system in a Viewer;

FIG. 21b shows the segments drawn between intersection points shown in FIG. 21a;

FIG. 28b shows a path that includes a group of three of the four points designated in FIG. 28a;

FIG. 28c shows a path that includes another group of three of the four points designated in FIG. 28a;

FIG. 38 is a drawing for explaining the texture mapping processing;

FIG. 44b shows an example of the outline that includes the same data loss part as the outline in FIG. 44a and has the shape quite different from that of the outline in FIG. 44a;

DESCRIPTION OF THE PREFERRED EMBODIMENT

The preferred embodiment of the present invention will be explained with reference to figures.

(1) System Configuration

Figure 1:
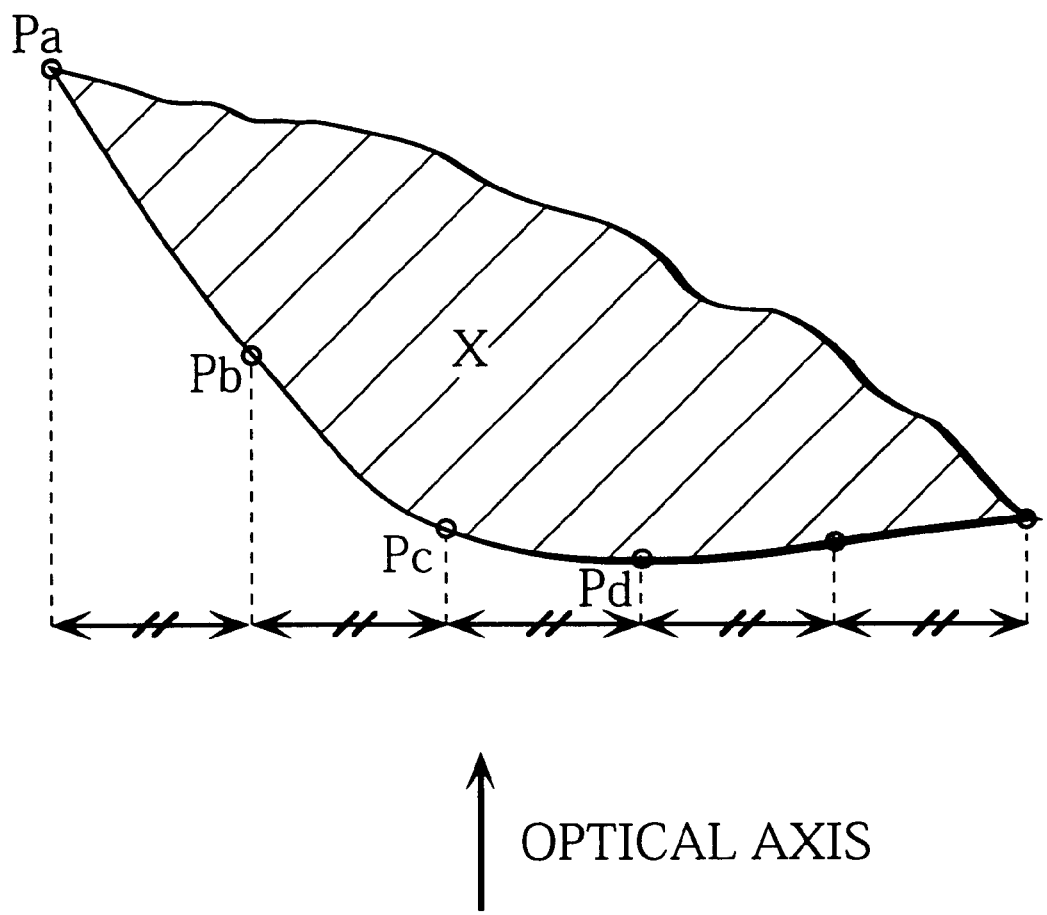
FIG. 1 shows irregular intervals between target points on the surface of an object that is measured with a range finder.
Figure 2A:
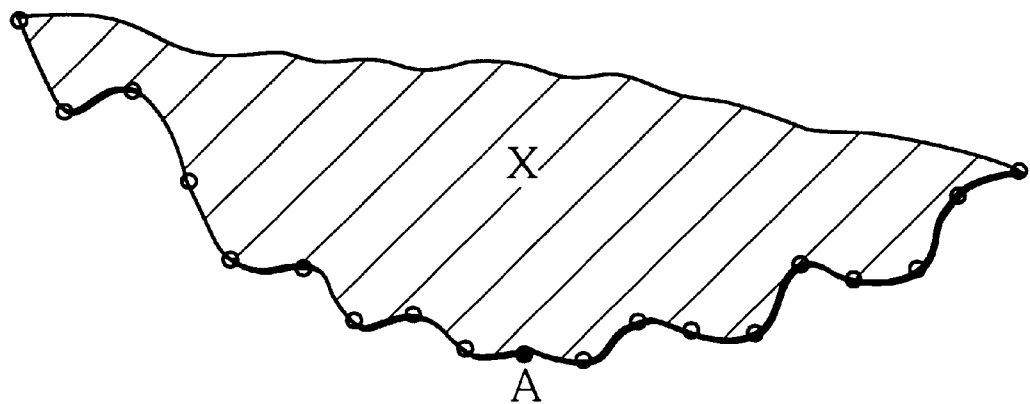
FIG. 2a shows the curved line illustrating a two-dimensional outline of a three-dimensional object represented by three-dimensional shape data including high-frequency noise.
Figure 2B:
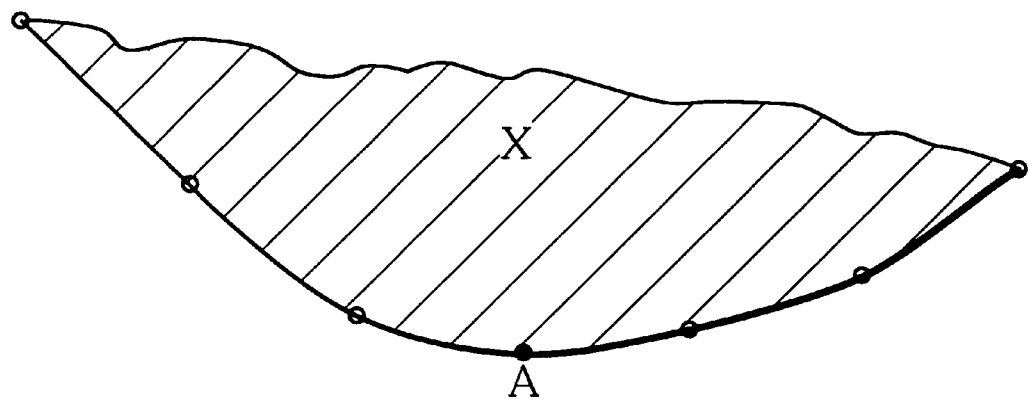
FIG. 2b shows the curved line in FIG. 2a when the high-frequency noise is removed.
Figure 3:
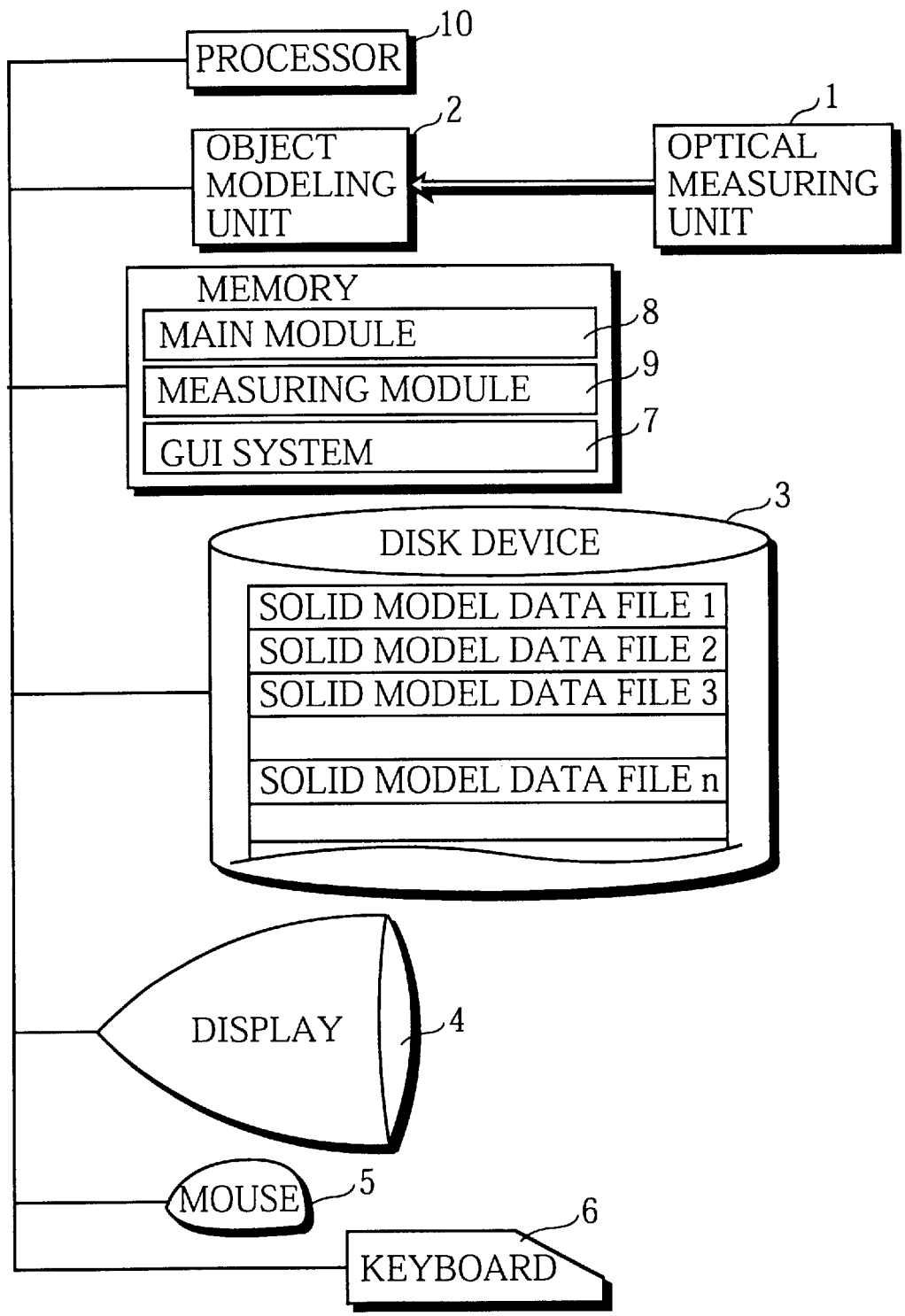
FIG. 3 shows a functional block diagram illustrating the internal construction of a three-dimensional shape data processing apparatus according to the present embodiment.

FIG. 3 shows a functional block diagram illustrating the internal construction of a three-dimensional shape data processing apparatus according to the present embodiment. The three-dimensional shape data processing apparatus includes an optical measuring unit 1, an object modeling unit 2, a disk device 3, a display 4, a mouse 5, a keyboard 6, a graphical user interface (GUI) system 7, a main module 8, and a measuring module 9.

The optical measuring unit 1 is, for instance, a range finder described in Japanese Laid-Open Patent Application No. 7-174536. The optical measuring unit 1 includes a laser measuring device and optically reads an object.

The object modeling unit 2 creates a solid model from an object that has been optically read. FIGS. 4a and 4b show the relationship between an object and the solid model created from the object. FIG. 4a shows part of a human body that is an object. A laser beam is directed at a plurality of points on the surface of the object in order to read the positions of the plurality of points at three-dimensional coordinates. The object modeling unit 2 creates a solid model as shown in FIG. 4b using the data of the read positions. A solid model (three-dimensional shape model) is made of "polygon meshes" and represents an object with polyhedron approximations. Such a solid model includes thousands or tens of thousands of planes.

Figure 4C:
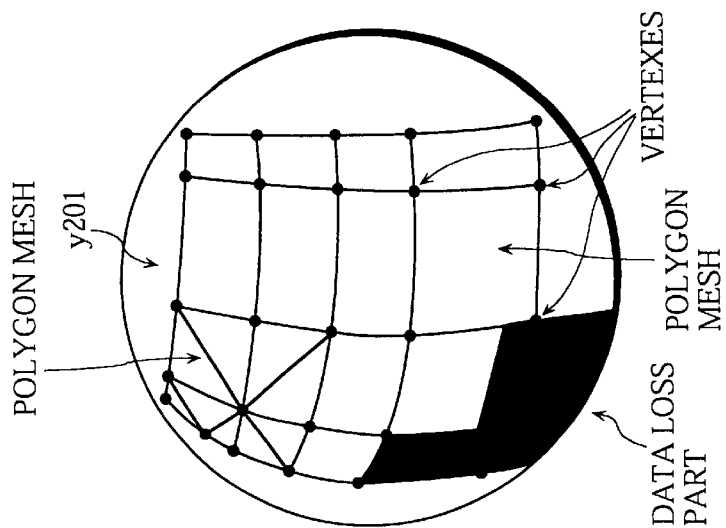
FIG. 4c shows a fragmentary enlarged detail of FIG. 4b.
Figure 4B:
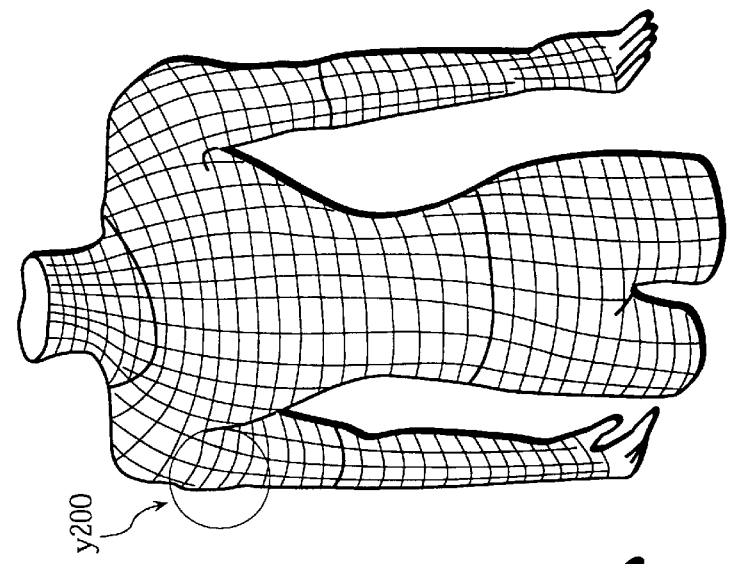
Figure 4A:
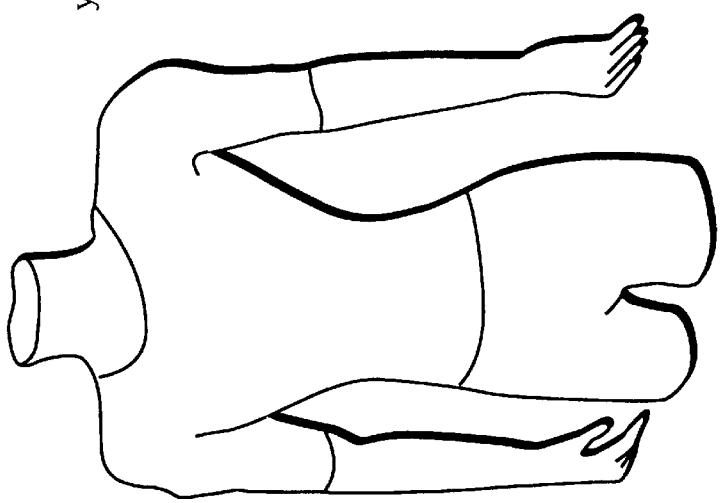
FIG. 4a shows an object to be measured.

A circle y201 in FIG. 4c shows an enlarged detail of the part of the solid model in FIG. 4b surrounded by a circle y200. Each plane included in the solid model is called a "polygon mesh" that is a triangle or quadrangle. The circle y201 in FIG. 4c includes a part in which three-dimensional shape data are not obtained (in this embodiment, such a part is called a "data loss part"). This data loss part is due to insufficient reading of reflected light by the optical measuring unit 1.

FIG. 5 shows the data structure of the solid model. The data representing a solid model includes a set of the number of the vertexes and the number of the polygon meshes, a polygon mesh list, and a vertex list. The vertex list shows the identifier and the three-dimensional coordinates of each vertex. The polygon mesh list shows the identifier of each polygon mesh, and the number and the identifiers of the vertexes included in each polygon mesh.

In the polygon mesh list, the identifiers of the vertexes included in a polygon mesh are described in an anticlockwise direction when the solid model is observed from the front. As a result, it is possible to distinguish the front and the back, and the inside and the outside of the solid model.

The disk device 3 stores a large number of data files that include solid model data.

The display 4 includes a large display screen that is not smaller than 20 inches, so that a number of windows may be displayed on the screen. On the screen of the display 4, three kinds of windows, "Viewer", "Canvas", and "Panel", are displayed. A Viewer is a window showing a solid (three-dimensional) model. A Canvas shows two-dimensional data. A Panel shows measured values and a variety of buttons for operation.

It is possible to add shadows on the surface of the solid model displayed in a Viewer by rendering processing and to apply patterns to the solid model by texture mapping processing. It is possible to display a Viewer on a goggle-type three-dimensional display equipped with a liquid crystal shutter, a real time holography or the like.

Figure 6:
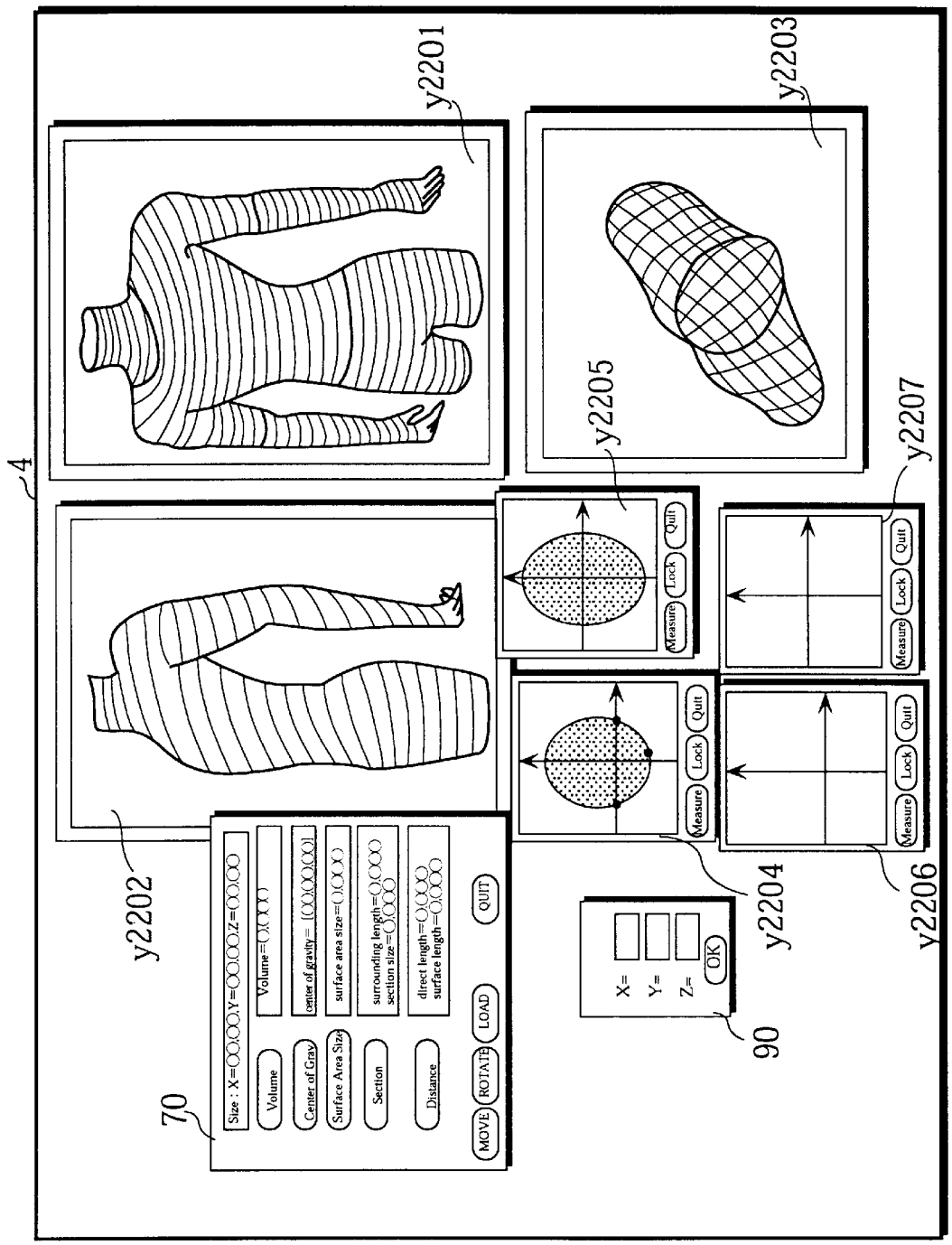
FIG. 6 shows examples of windows displayed on the display of the three-dimensional shape data processing apparatus.

FIG. 6 shows examples of windows that are displayed on the display 4. In FIG. 6, three Viewers y2201 to y2203, four Canvases y2204 to y2207, and two Panels 70 and 90 are shown on the display screen of the display 4. The Viewer y2201 shows a perspective view of the solid model. The Viewer y2202 shows a side view. The Viewer y2203 shows a top plan view. The Canvases y2204 to y2207 show cross sectional views. A plurality of Canvases are displayed in order to display the cross sectional views of a plurality of parts of the solid model, such as the neck, the waist, the chest and the like. A measuring processing operation panel 70 and a curved surface mode processing panel 140 (refer to FIG. 33) are displayed on the screen if necessary. The measuring processing operation panel 70 is used for displaying the information on sectional areas and lengths on the surface of the solid model and for inputting user's instructions. The curved surface mode processing panel 140 is used for displaying characteristic amount and for inputting user's instructions.

FIGS. 7a and 7b show the relationship between the coordinate systems in a Viewer and a Canvas. The origin of the coordinate system in a Viewer is positioned at the bottom left of the solid model as shown in FIG. 7b. On the other hand, the origin of the coordinate system in a Canvas is positioned at the center of a virtual plate that is called a "standard plate". In other words, the X-axis and the Y-axis of the coordinate system are set on the surface of the standard plate as shown in FIG. 7a. The standard plate is used when the user designates the part that is to be measured or supplemented and displayed in a Viewer with a solid model. The values of the Z-coordinates of the vertexes in a polygon mesh above the standard plate are positive and those below the standard plate are negative.

Figures 8A, 8B:
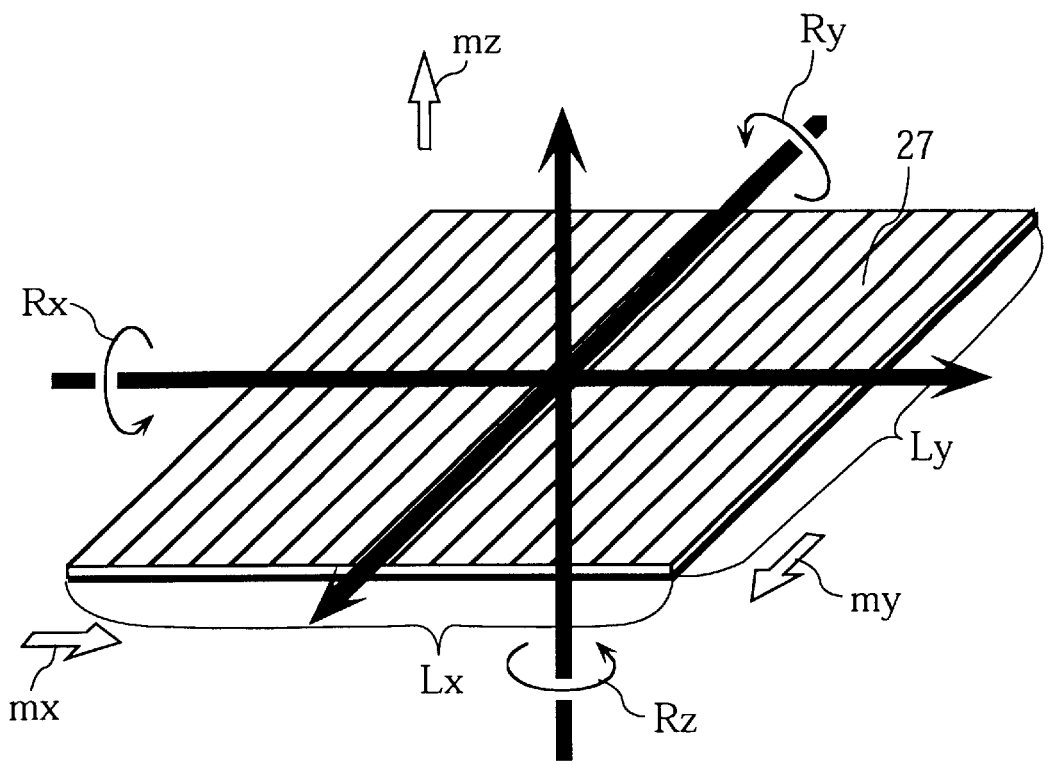
FIG. 8a shows the standard plate.
FIG. 8b shows the data structure of the standard plate.

The standard plate will be explained with reference to FIGS. 8a, 8b, 9a and 9b. As shown in FIG. 8a, the X-axis, the Y-axis, and the Z-axis of the coordinate system in a Canvas orthogonally intersect at the center of the standard plate. The point at which the three axes orthogonally intersect is the origin of the coordinate system in a Canvas. The X-axis, the Y-axis, and the Z-axis are displayed with the standard plate in a Canvas. These three axes are displayed in different colors in order to be easily distinguished from each other. The color of each of the axes changes at the origin of the coordinate system.

The position of the standard plate shown in FIG. 8a is represented by the data structure shown in FIG. 8b. More specifically, the position of the standard plate is represented by a normal vector (p,q,r), the coordinates of the origin of the coordinate system in a Viewer (Xa,Ya,Za), and the length Ly and the width Lx of the standard plate. In the coordinate system in a Viewer, coordinates (X,Y,Z) on the standard plate is related to the normal vector (p,q,r) by the equation "$p(X-Xa)+q(Y-Ya)+r(Z-Za)=0$".

Figure 9A:
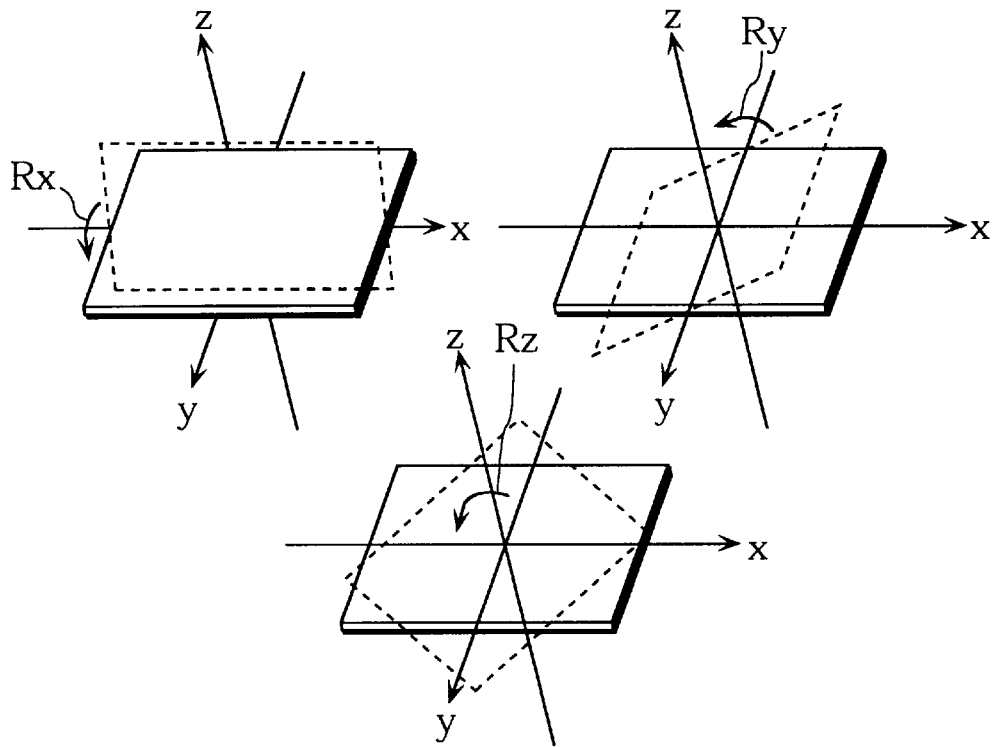
FIG. 9a shows the change of the inclination of the standard plate.
Figure 9B:
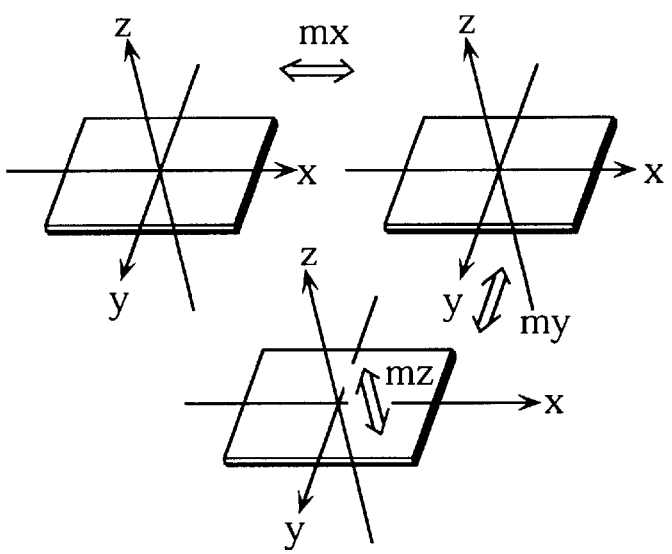
FIG. 9b shows the change of the position of the standard plate.

The degree of freedom (the position and the inclination in a three-dimensional space) of the standard plate is six. More specifically, the standard plate rotates on the X-axis, the Y-axis, and the Z-axis in the directions of arrows Rx, Ry, and Rz as shown in FIG. 9a and moves along the X-axis, the Y-axis, and the Z-axis in the directions of arrows mx, my, and mz as shown in FIG. 9b according to user's operation. The rotation defines the inclination of the standard plate and the movement defines the position of the standard plate.

The GUI system 7 manages events. More specifically, the GUI system 7 controls the arrangement of Canvases, Viewers, and a variety of menus on the display 4.

The main module 8 represents a program that describes the procedure of the main routine in an execute form. The measuring module 9 represents a program that describes the procedures of measuring processing and the like branched from the main routine in an execute form. These modules are loaded into the memory from the disk device 3 and executed by the processor 10.

The processor 10 is an integrated circuit and includes a decoder, an arithmetic logic unit (ALU), and registers. The processor 10 controls three-dimensional data processing according to the contents of the main module 8 and the measuring module 9.

The three-dimensional data processing apparatus that has been described may be realized using a general purpose computer into which the data obtained by the optical measuring unit 1 are input and by setting up the program that has the computer execute the operation and the functions described below on the computer. The program may be recorded on a computer-readable record medium such as a compact disk read-only memory (CD-ROM).

(2) Overall Description of Control

Figure 10:
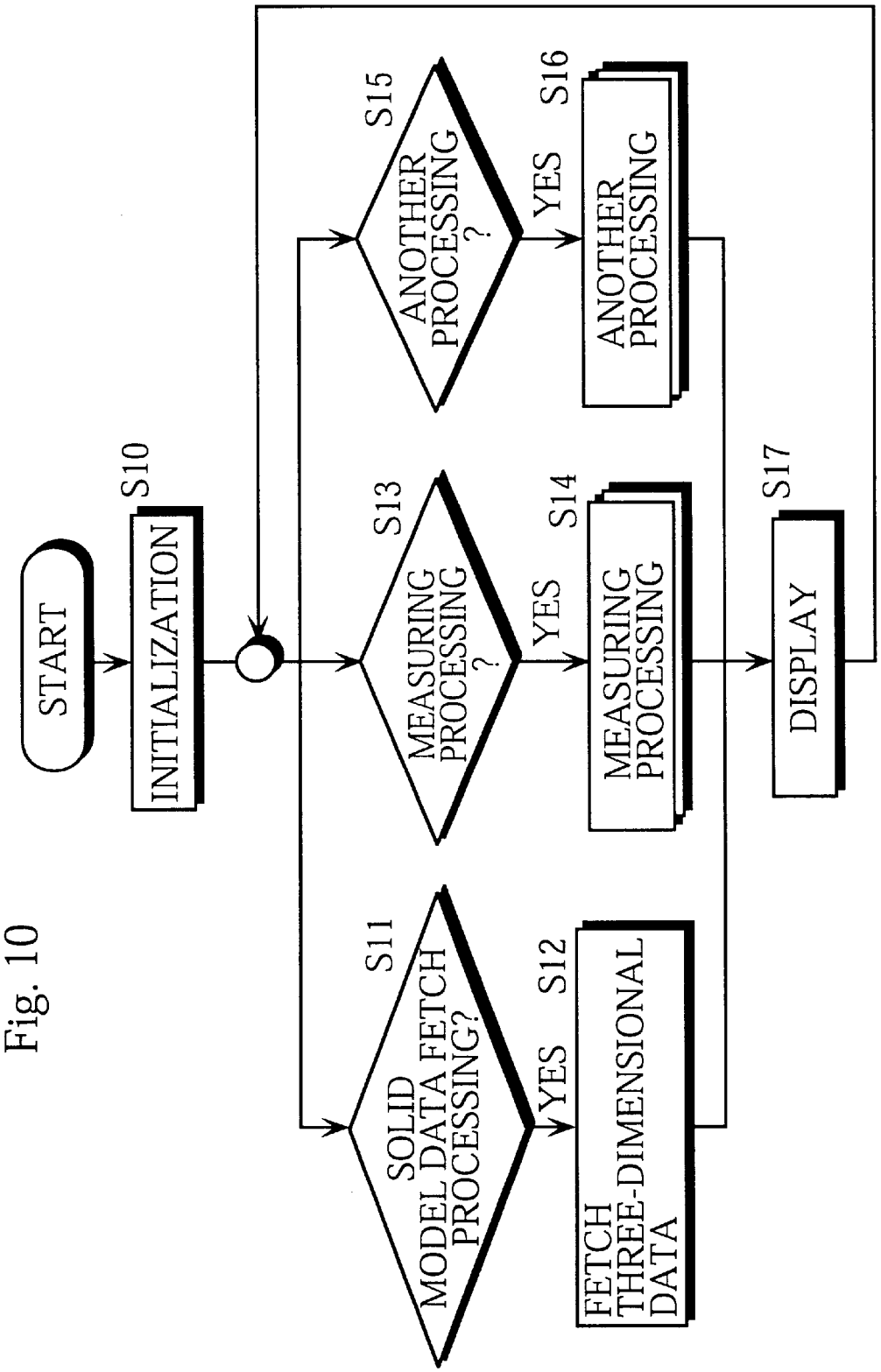
FIG. 10 is the main flowchart illustrating the process by the three-dimensional shape data processing apparatus.

The control by the processor 10 according to the main module 8 will be described with reference to the main flowchart in FIG. 10. At step S10, the processor 10 initializes the hardware and the display of the windows. After the initialization, a pop-up menu for requiring the user to choose the processing to be executed, for instance, solid model data fetch processing, measuring processing or the like, is displayed on the display 4. When the user selects the solid model data fetch processing, the result of the judgement at Step S11 is "yes". The process proceeds to Step S12.

At Step S12, the processor 10 drives the optical measuring unit 1. The processor 10 has the optical measuring unit 1 direct a laser beam at the object and measure the reflected light. After that, the processor 10 has the object modeling unit 2 create a solid model data based on the result of the measurement. The solid model shown in FIG. 4b is made according to the solid model data. At Step S17, the processor 10 displays the solid model in Viewers. The display example of windows shown in FIG. 6 is realized at Step S17. The cursor location is moved by the event management by the GUI system 7.

When the user selects the measurement or the supplement processing of the solid model data, the result of the judgement at Step S13 is "yes". The process proceeds to Step S14. The content of the processing at Step S14 will be described later in detail. When the user selects another processing, the result of the judgement at Step S15 is "yes". The process proceeds to Step S16. At Step S16, the processor 10 has solid model data deleted or converted and has the solid model be rotated or moved.

(3) Measuring Processing

Figure 11:
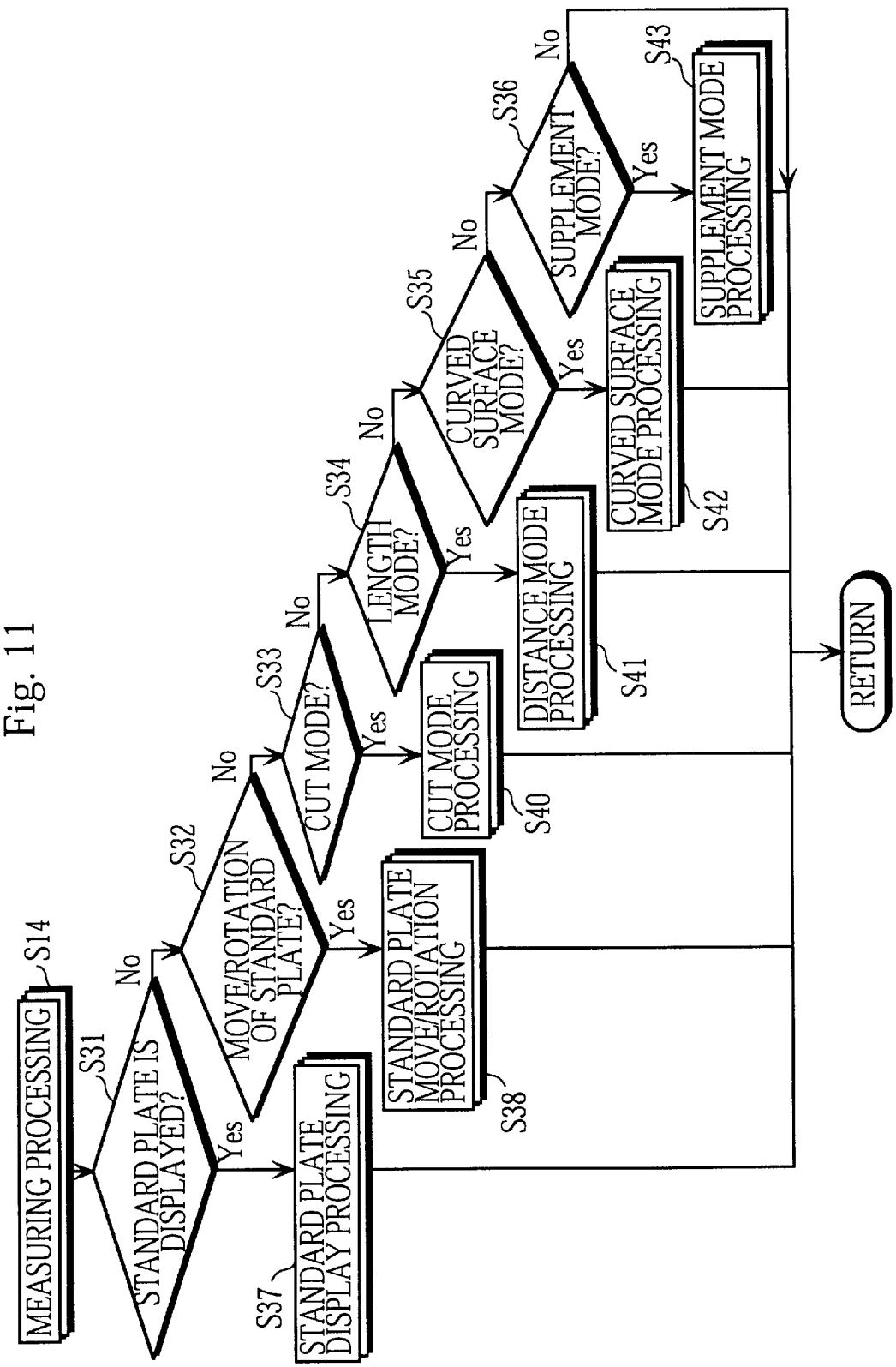
FIG. 11 is a flowchart illustrating the measuring processing.
Figure 12:
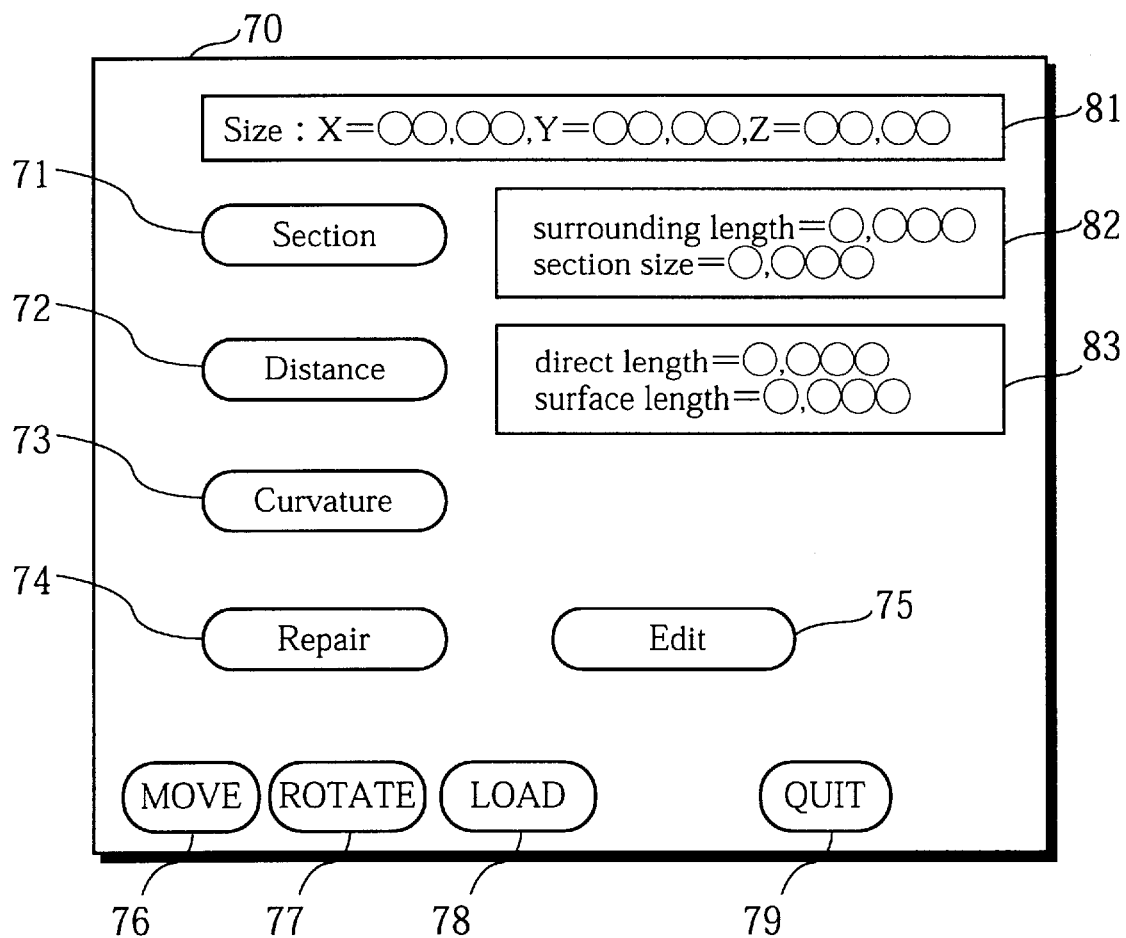
FIG. 12 shows the measuring processing operation panel.

The measuring processing at Step S14 in FIG. 10 will be described in detail. FIG. 11 is a main flowchart illustrating the measuring processing. When the measuring processing starts, the measuring processing operation panel 70 shown in FIG. 12 is displayed on the display 4, and an event is awaited. In the measuring processing, a mode is activated by selecting a button on the measuring processing operation panel 70.

As shown in FIG. 12, in order to accept user's instructions and activate modes, the measuring processing operation panel 70 includes buttons: (1) a cut mode activation button 71 for activating a cut mode processing in which the solid model is virtually cut and the sectional area and the perimeter of a sectional face are calculated; (2) a distance mode activation button 72 for activating a length mode processing in which the length between two points and the path length of a path on the surface of the solid model are obtained; (3) a curved surface activation button 73 for activating a curved surface mode processing in which the characteristic amount on the surface of the solid model is obtained; and (4) a supplement mode activation button 74 for activating a supplement mode processing in which the data loss part of the solid model is automatically supplemented.

The measuring processing operation panel 70 also includes buttons for accepting user's instructions: a standard plate move button 76 for moving the standard plate; a standard plate rotation button 77 for rotating the standard plate; a solid model loading button 78 for loading the solid model; and a measuring processing completion button 79 for completing the measuring process. In order to show the user the result of the measurement, the measuring processing operation panel 70 further includes three display units: a model size display unit 81 for displaying the sizes of the solid model in the directions of the X-axis, Y-axis, and Z-axis in the coordinate system in a viewer; a sectional face information display unit 82 for displaying the sectional area and the perimeter of a sectional face of the solid model that has been cut with the standard plate; and a length information display unit 83 for displaying the length of a straight line between two points and the path length of a path on the surface of the solid model.

The user positions the cursor to a button on the measuring processing operation panel 70 to input instructions with the mouse 5 or keyboard 6. When an event is input by the user's selection of a button, the process of the flowchart in FIG. 11 proceeds to Step S31. The process proceeds from Step S31 through Step S36 until the result of a judgement is "yes".

(3-1) Standard Plate Display Processing

Standard plate display processing is executed at Step S37 in FIG. 11 when it is judged that the standard plate is not displayed in any Viewer at Step S31. When the three-dimensional shape data processing apparatus is activated, the standard plate is not displayed. As a result, the process proceeds to Step S31 and standard plate display processing starts. The standard plate display processing focuses on displaying the standard plate the size of which is adjusted to the size of the solid model with the solid model in the Viewers.

Figure 13:
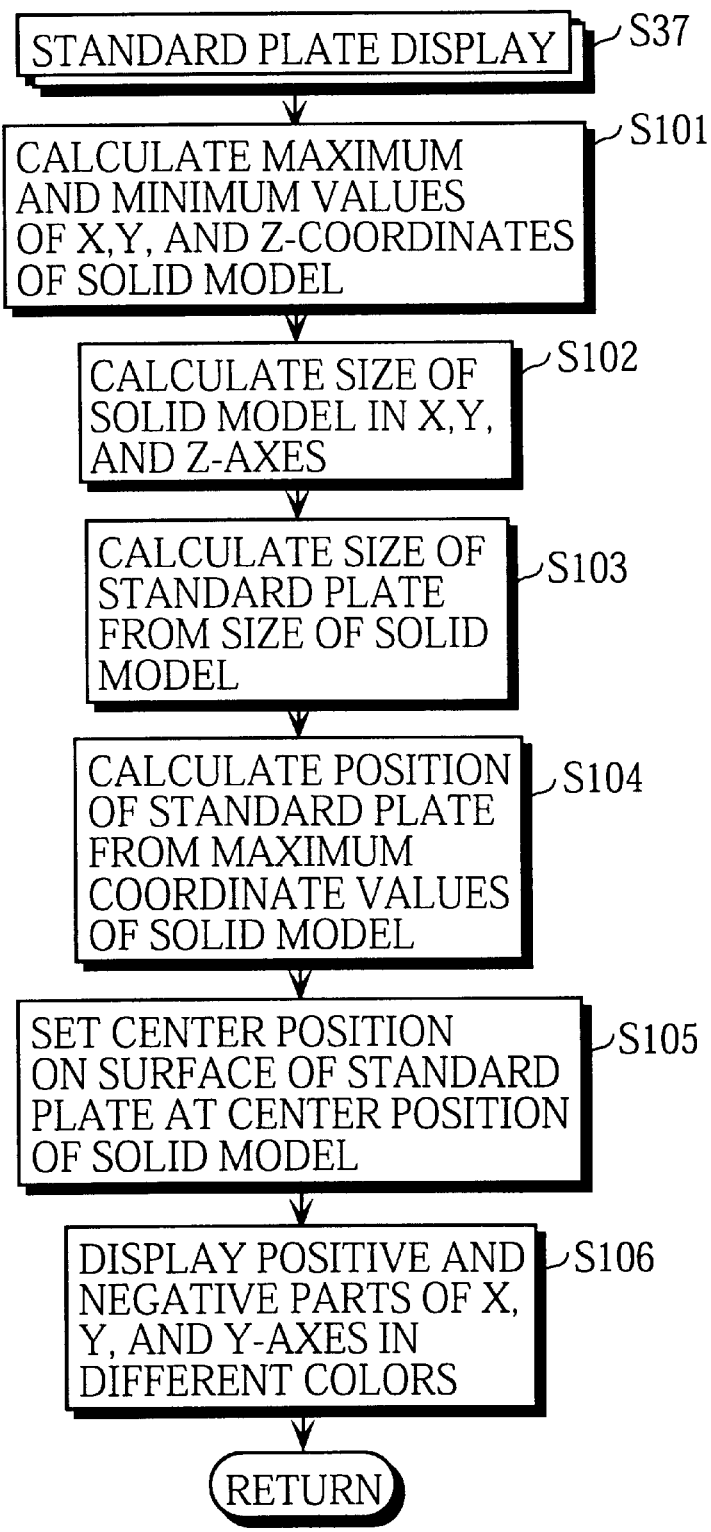
FIG. 13 is a flowchart illustrating the standard plate display processing.

The standard plate display processing will be explained with reference to the flowchart in FIG. 13. At Step S101, the maximum and minimum values of the X, Y, and Z-coordinates of the solid model are searched for in the vertex list shown in FIG. 5. At Step S102, the sizes of the solid model in the directions of the X, Y, and Z-axes are calculated from the maximum and minimum coordinate values. In other words, the length and the width of the solid model are calculated from the maximum and minimum coordinate values that have been searched for at Step S101. Each calculated size is displayed on the model size display unit 81 in the measuring processing operation panel 70.

At Step S103, the processor 10 adjusts the size of the standard plate to the calculated length and width of the solid model. In this embodiment, the length or width of the standard plate is 1.1 times the largest size of the solid model in the X, Y, and Z-axes. At Step S104, the processor 10 calculates the space occupied by the solid model and the center of the solid model using the maximum and minimum values of the X, Y, and Z-coordinates. The calculated center represents the center on the surface of the standard plate. At Step 105, the processor 10 sets the standard plate so that the center on the surface of the standard plate is positioned at the center of the solid model in each of the Viewers. At Step S106, the standard plate the center on the surface of which is positioned at the center of the solid model is displayed. The axes of the coordinate system of the standard plate is displayed in different colors and the positive part and the negative part of each axis are displayed in different colors.

(3-2) Standard Plate Move/Rotation Processing

Figure 14:
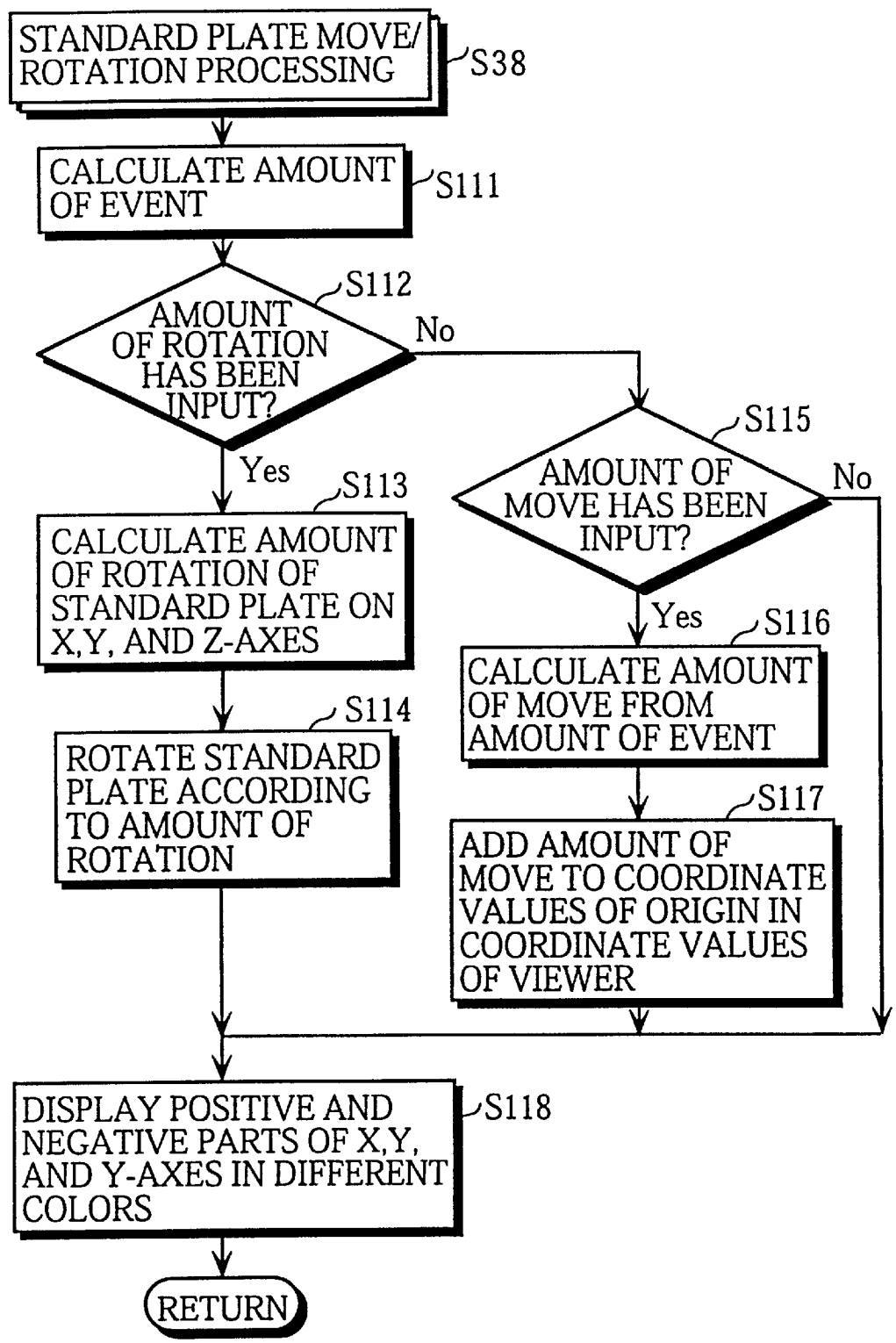
FIG. 14 is a flowchart illustrating the standard plate move/rotation processing.

When the user selects the standard plate move button 76 or the standard plate rotation button 77, the process of the flowchart in FIG. 11 proceeds from Step S32 to Step S38. Standard plate move/rotation processing starts. The standard plate is used for designating the part of the solid model to be measured or supplemented. The standard plate is moved or rotated according to the user's instructions. FIG. 14 is a flowchart illustrating the standard plate move/rotation processing.

The standard plate move/rotation processing includes following processings (1) and (2). The processing (1) is activated by the selection of the standard plate rotation button 77 and changes the inclination of the standard plate. The processing (2) is activated by the selection of the standard plate move button 76 and changes the position of the standard plate. The amount of rotation and move in the processings (1) and (2) is defined by the amount of event input by the user.

Figure 15:
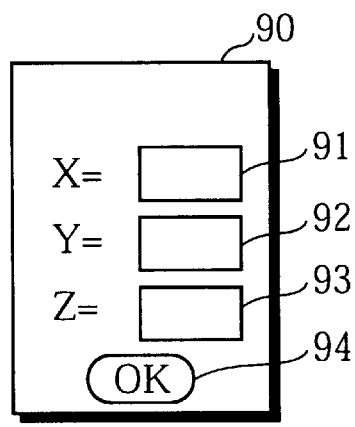
FIG. 15 shows a rotation/move amount input panel.

The amount of event is input using a rotation/move amount input panel 90 (FIG. 15) that is displayed when the user selects the standard plate move button 76 or the standard plate rotation button 77. More specifically, when inputting the amount of event, the user indicates the position in the rotation/move amount input panel 90 for inputting the amount of rotation or movement on each coordinate with the cursor and inputs desired numeric values with the keyboard 6.

In the standard plate move/rotation processing, the amount of event that has been input by the user is detected at Step S111. The input amount of event is displayed in display units 91, 92, and 93 for each coordinate. When the user selects a confirmation button 94, the displayed amount of event is confirmed and is accepted. The amount of event may be input using the amount of rotation of the ball included in the mouse 5 that is obtained when the mouse 5 is moved.

At Step S112, whether the standard plate rotation button 77 is being selected is judged. When it is the case, the processor 10 judges that the amount of rotation of the standard plate has been input. The process proceeds to Step S113. At Step S113, the processor 10 calculates the amount of rotation of the standard plate on each axis from the amount of event that has been detected at Step S111. At Step S114, the standard plate is rotated on each axis according to the calculated amount of rotation (refer to FIG. 9a). At Step S118, the standard plate with the inclination by the rotation at Step S114 is displayed. The process returns to the main routine shown in FIG. 11.

When the result of the judgement at Step S112 is "No", the process proceeds to Step S115. At Step S115, whether the standard plate move button 76 is being selected is judged. When it is the case, the processor 10 judges that the amount of move has been input. The process proceeds to Step S116. At Step S116, the amount of move is calculated from the amount of event that has been input at Step S111. At Step S117, the calculated amount of move is added to the coordinate values of the origin in the coordinate system in the Viewer. When the coordinates of the center on the surface of the standard plate in the coordinate system in the Viewer are set as (Xa,Ya,Za), the amount of move that has been calculated at Step S116 is added to the coordinates (Xa,Ya,Za). As a result, the position of the standard plate moves freely according to the amount of event (refer to FIG. 9b). The process proceeds to Step S118, and the standard plate moved to the new position is displayed. The process returns to the main routine shown in FIG. 11.

In the standard plate move/rotation processing, the inclination and position of the standard plate may be changed freely. As a result, any sectional face of the solid model may be obtained.

(3-3) Cut Mode Processing

When the user selects the cut mode activation button 71, the process of the flowchart in FIG. 11 proceeds to Step S40. Cut mode processing will be described with reference to the flowchart in FIG. 16. At Step S61, the sectional data of the solid model that is cut with the standard plate is calculated in sectional data calculation processing. At Step S62, a cross sectional view of the solid model is displayed in a Canvas according to the calculated sectional data in section display processing. At Step S63, the sectional area of the solid model is calculated according to the calculated sectional data in sectional area measurement processing. At Step S64, the length of the outline of the sectional face of the solid model is measured in outline length measurement processing. At Step 65, the sectional area and the length of the outline of the sectional face of the solid model are displayed. Each processing will be described below in detail.

(3-3-1) Sectional Data Calculation Mode Processing

The "sectional data" is the information that represents a section by the intersection points of the standard plate and the solid model and the sequence of segments connecting the intersection points. The sectional data calculation processing is explained by the flowcharts shown in FIGS. 17a to 19.

In the flowchart in FIG. 17b, the "section "i"" represents the variable that designates a section on the standard plate. In the sectional data calculation processing, the processor 10 converts the coordinates of the vertexes in the polygon meshes into the coordinates in the Canvas coordinate system at Step S201. At Step S202, the flowchart branches to the flowchart in FIG. 17b to connect segments. In the flowchart in FIG. 17b, at Step S301 the flowchart branches to the flowchart in FIG. 18 for "intersection point connection processing", and at Step S302 the flowchart branches to the flowchart in FIG. 19 for "segment sequence connection processing".

(3-3-2) Intersection Point Connection Processing

Figure 18:
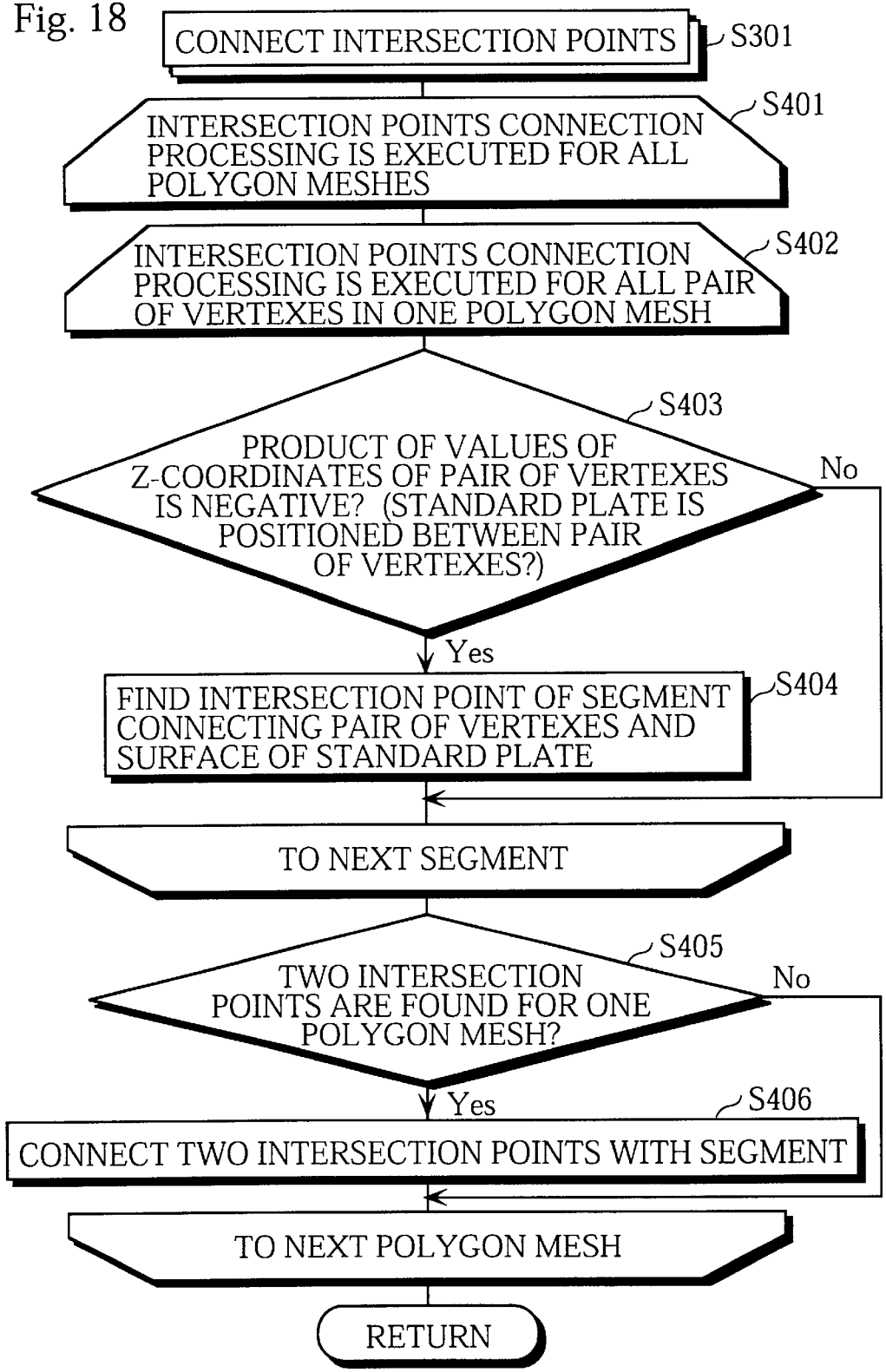
FIG. 18 is a flowchart illustrating the connection processing of intersection points.
Figure 20A:
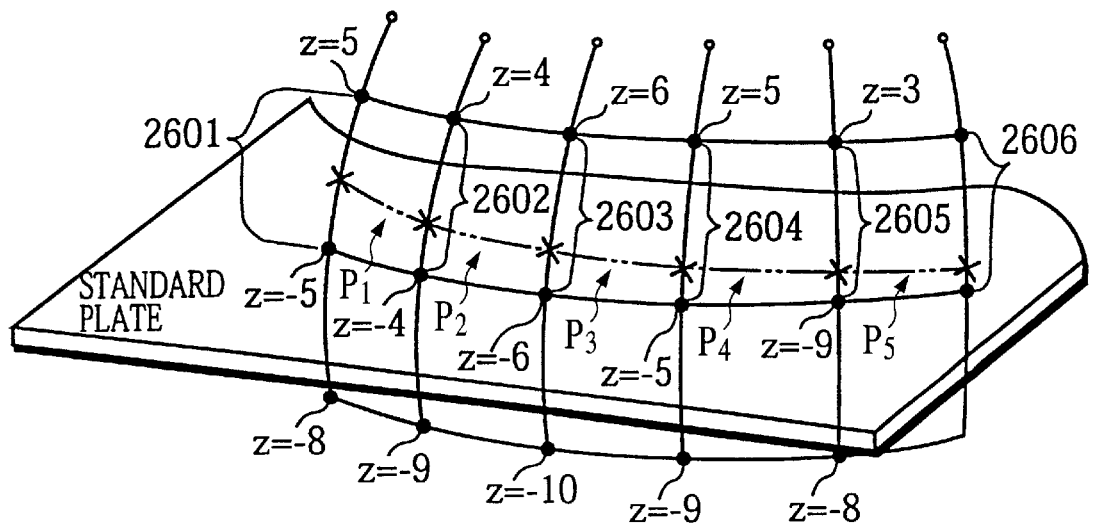
FIG. 20a shows polygon meshes cut by the standard plate.
Figure 20B:
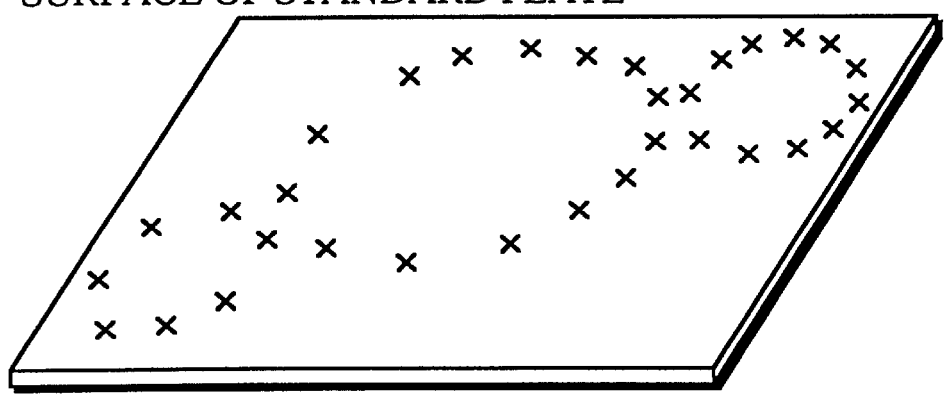
FIG. 20b shows intersection points of the standard plate and the polygon meshes.

In the "intersection point connection processing" shown in FIG. 18, the coordinates of the intersection points of the solid model and the standard plate are calculated, and the calculated coordinates of the intersection points are connected to create segments. At Step S403, the processor 10 judges whether the product of the values of the Z-coordinates (a "Z-coordinate" here represents the Z-coordinate in the Canvas coordinate system) of a pair of vertexes in polygon meshes is negative. When the product is negative, the intersection point of the segment that connects the pair of vertexes and the surface of the standard plate is obtained. This means that the standard plate is positioned between the pair of vertexes when the product is negative. For instance, when polygon meshes and the standard plate are positioned as shown in FIG. 20a, the standard plate is positioned between the vertexes of pairs 2601, 2602, or 2603 which each are pairs of vertexes in polygon meshes P1, P2, P3, P4, and P5. As a result, the coordinate value of one vertex of one of the pairs is positive and that of the other vertex is negative, so that the product of the coordinate values of the vertexes of one of the pairs is negative. When the product is negative, the vertexes in a pair is connected with a segment, and the coordinates of the intersection point of the segment and the surface of the standard plate are calculated. Such an intersection point is represented by an "x" in FIG. 20b. When the processing that has been described is executed for all the pair of vertexes in the polygon meshes (Step S402), a plurality of intersection points are created on the surface of the standard plate as shown in FIG. 20b.

Figure 21A:
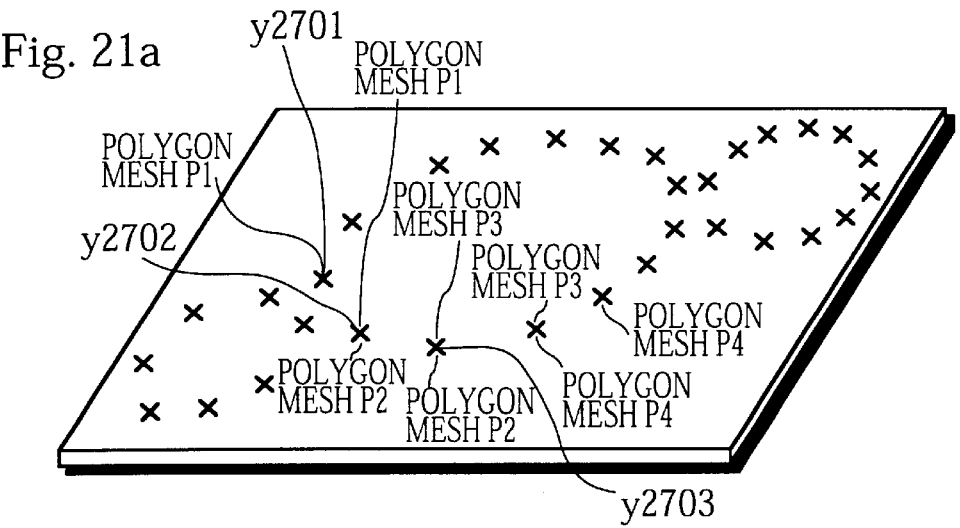
FIG. 21a shows examples of intersection points created for one polygon mesh.
Figure 21B:
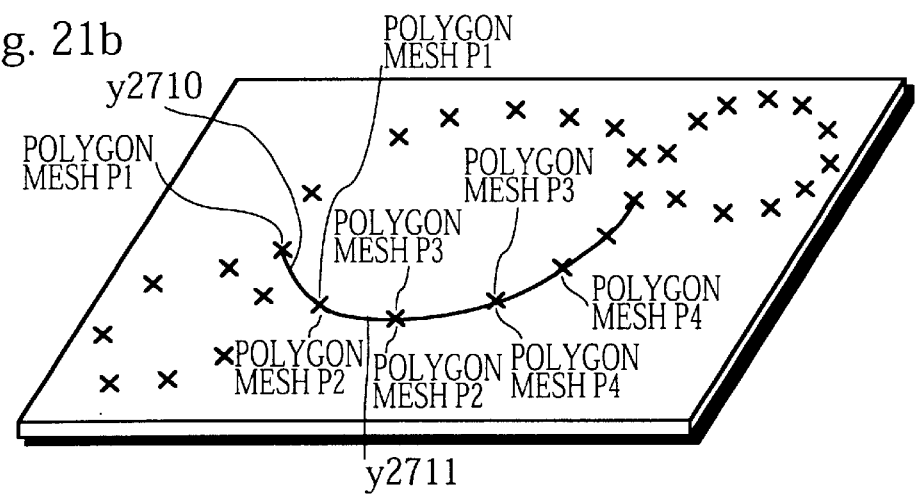

At Step S405, the processor 10 judges whether two intersection points are obtained for one polygon mesh. When it is the case, the processor 10 connects the intersection points with a segment at Step S406. For instance, as a result of repeating the process from Step S402 to Step S404, a plurality of intersection points are obtained as shown in FIG. 21a. Intersection points y2701 and y2702 are obtained for the polygon mesh P1 shown in FIG. 20. As a result, segment y2710 is drawn between the intersection points y2701 and y2702 as shown in FIG. 21b. In the same manner, a segment y2711 is drawn to connect intersection points y2702 and y2703 that have been obtained for one polygon mesh, the polygon mesh P2.

The processing that has been described is executed for all the pairs of vertexes in all the polygon meshes (Steps S401 and S402).

(3-3-3) Segment Sequence Connection Processing

Figure 19:
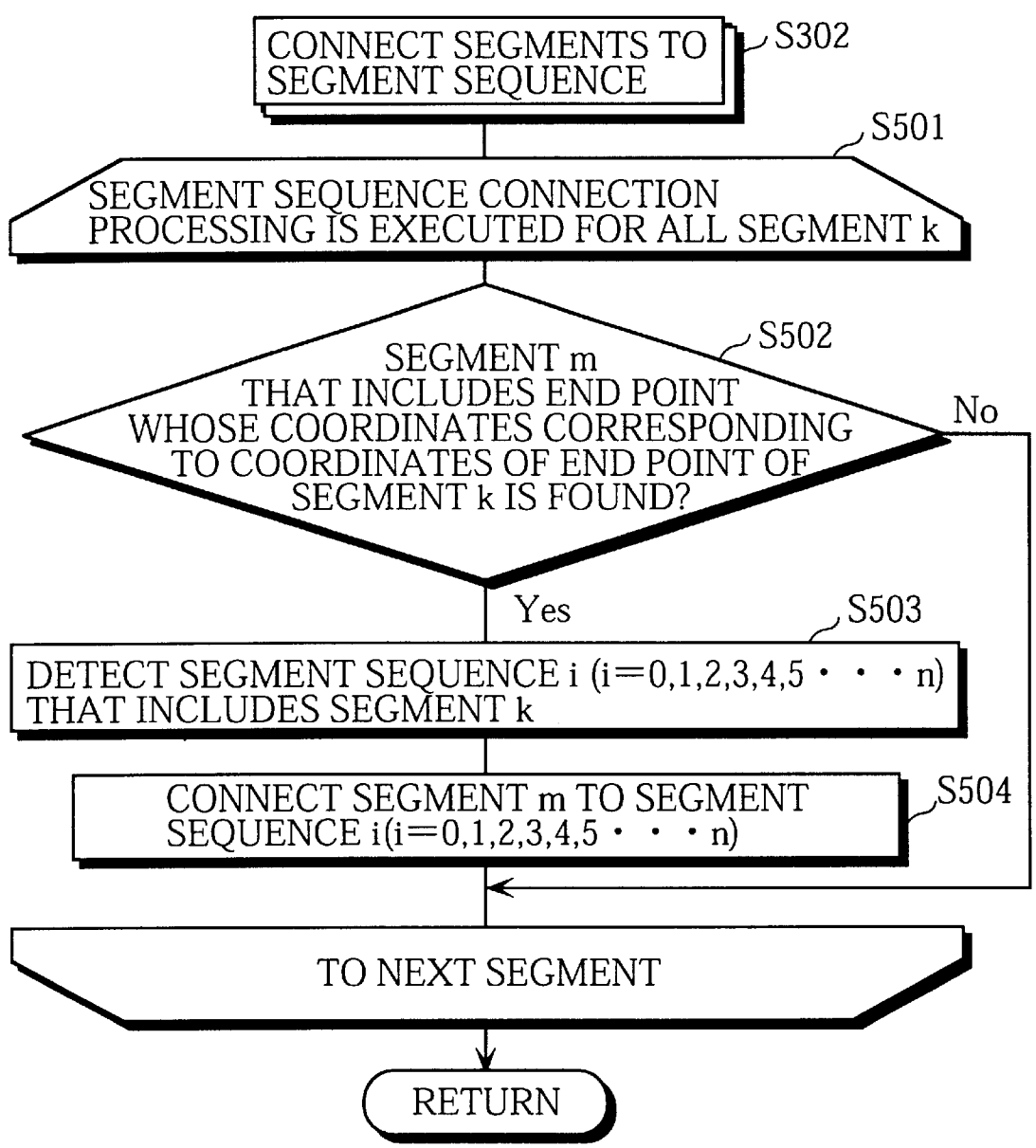
FIG. 19 is a flowchart illustrating the connection processing of segments.

When the intersection point connection processing is completed, the process proceeds to the segment sequence connection processing. The "segment sequence" is a broken line for representing the outline of the solid model on the standard plate, and is created by connecting the segments drawn in the intersection point connection processing. FIG. 19 is a flowchart illustrating the "segment sequence connection processing". In the flowchart in FIG. 19, the "segment "i"" represents the variable for designating a segment on the surface of the standard plate, and the "segment sequence "i"" represents the variable for designating the segment sequence that includes a segment "i".

Figure 21C:
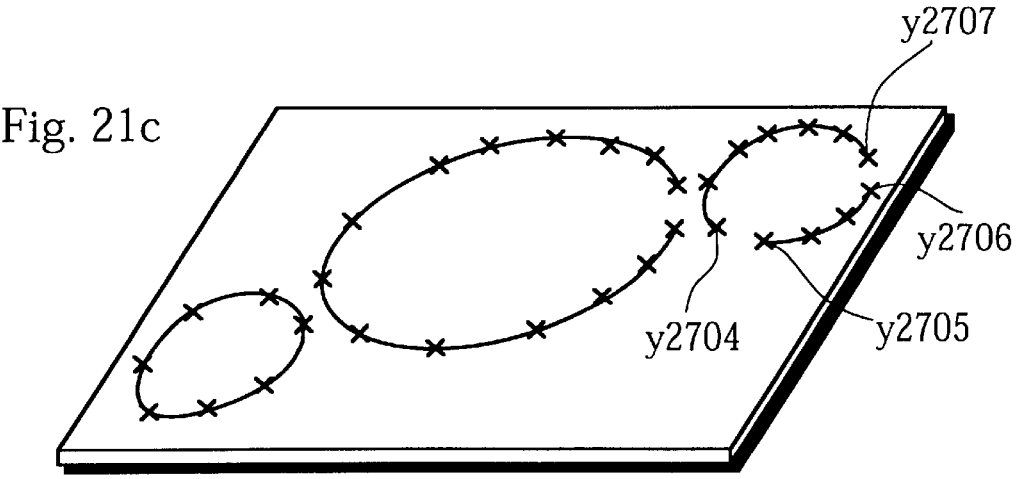
FIG. 21c shows the connection of segments shown in FIG. 21b.

In the segment sequence connection processing, a segment "m" that includes an end point whose coordinates corresponding to the coordinates of an end point of a segment "k" is searched for at Step S502. When the segment "m" is found, the segment sequence "i" that includes the segment "k" is detected, and the segment "m" is connected to the segment sequence "i". The processing that has been described is executed for all the segment "k" (k=1, 2, ... n), the segments shown in FIG. 21b are connected to be a segment sequence on the surface of the standard plate shown in FIG. 21c. In FIG. 21c, no segment is drawn between the intersection points y2704 and y2705, and y2706 and y2707 due to a data loss part.

(3-3-4) Sectional Data Judgment Processing

When the segment sequence connection processing is completed, the process proceeds to Step S305 of the flowchart in FIG. 17b, and whether the outline of the section "i" is open is judged.

At Step S305, the processor 10 judges whether the distance between the starting point and the ending point of the outline of the section "i" is shorter than a predetermined length. When it is the case, the process proceeds to Step S306. The processor 10 judges that the outline of the section "i" is closed, and sets a section flag Fi at "0" to indicate that the outline is closed. On the other hand, when the distance between the starting point and the ending point of the outline of a section "i" is equal to or longer than the predetermined length as the distance between the sectional points y2704 and y2705 or that between the sectional points y2706 and y2707 in FIG. 21c, the segment sequence that is closest to the outline of the section "i" is searched for at Step S307. When such a segment sequence is found, the processor 10 judges whether the distance between the outline of the section "i" and the closest segment sequence is longer than the predetermined length at Step S308. When it is not the case, the outline of the section "i" is connected to the closest segment sequence (Step S309), and the process returns to Step S305. On the other hand, when it is the case, the process proceeds to Step S310, and the processor 10 sets the section flag Fi at "1" to indicate that the outline is open.

When the processing that has been described is executed for each segment sequence "i" (i=1,2, ... n) in each section "i" (Steps S303 and S304), the process returns to Step S203 of the flowchart in FIG. 17a. At Step S203, the coordinates of the intersection points on the outline of a section are converted into the coordinate values in the Canvas coordinate system. At Step S204, the outline of each section is created.

(3-3-5) Section Display Processing

Figure 16:
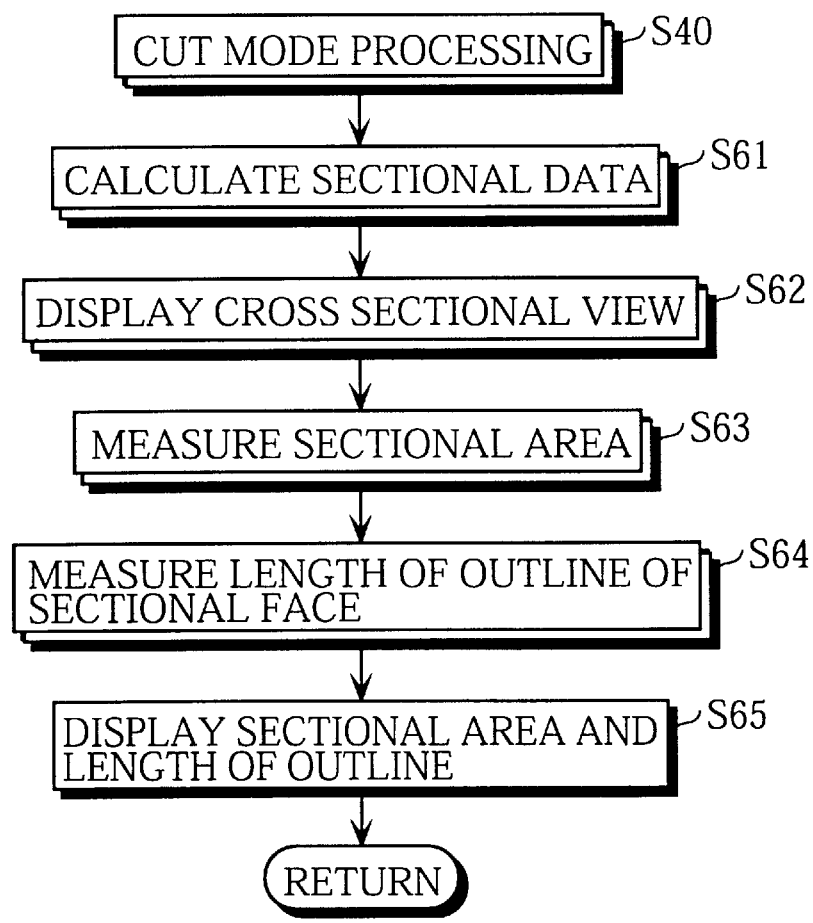
FIG. 16 is a flowchart illustrating the cut mode processing.
Figure 17:
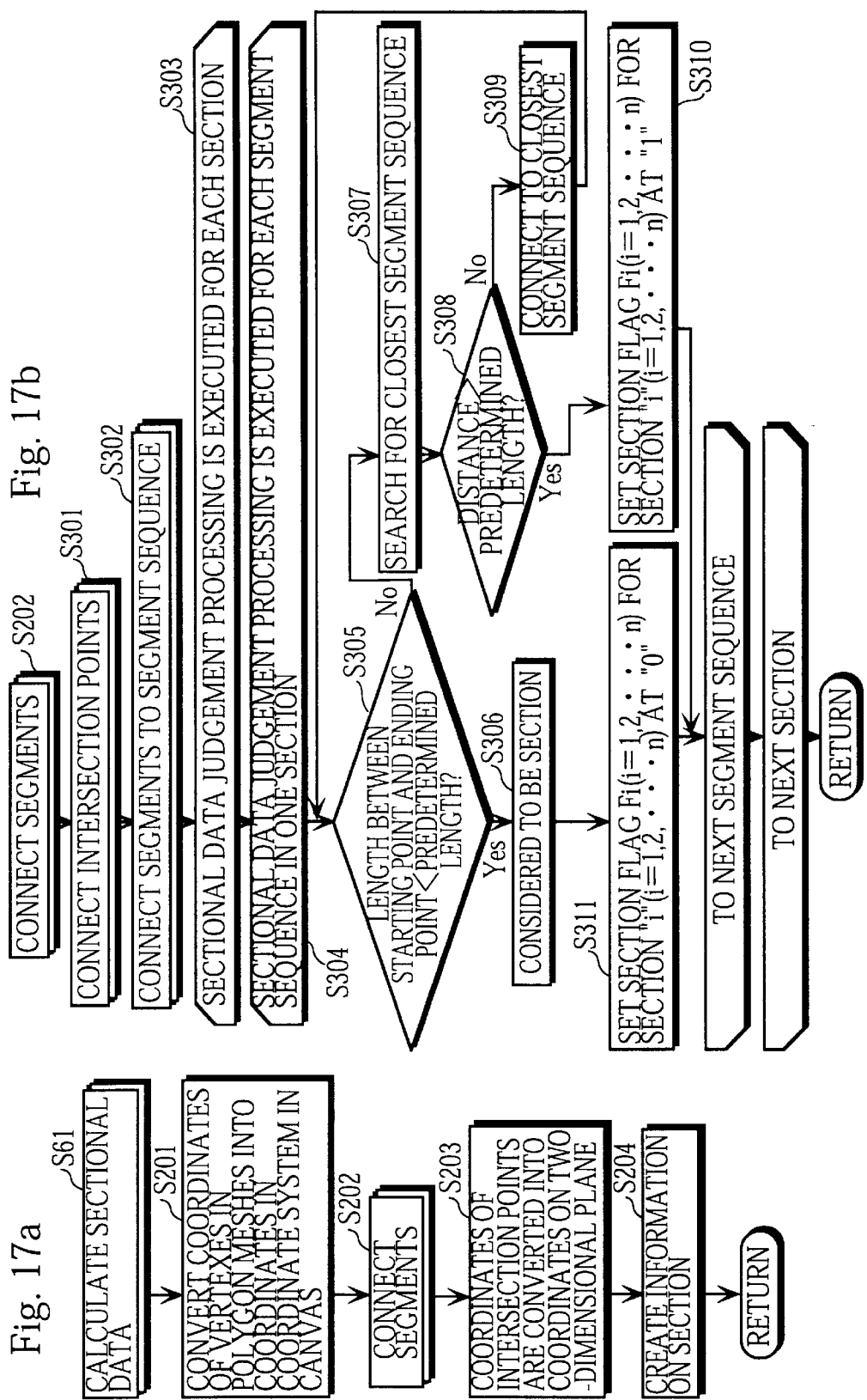
FIG. 17a is a flowchart illustrating the sectional data calculation processing.
FIG. 17b is a flowchart illustrating segment connection processing.

In the section display processing at Step S62 in the flowchart in FIG. 16, the outline represented as the connection of segments is displayed as a cross sectional view in a Canvas. In displaying the cross sectional view, the section flag Fi is referred to, and the sectional views of a closed section and an open section is displayed in different manners. More specifically, when the section flag Fi is set at "0", i.e., when a closed section is displayed in the Canvas, the inside of the closed section is painted in "light green". A closed section is easily painted according to a color conversion algorithm that is used in a conventional graphics system. On the other hand, when the section flag Fi is set at "1", i.e., when an open section is displayed in the Canvas, the segment sequence representing the outline is displayed in yellow. This is because the outside of the section can be painted in error when an open section is painted according to the color conversion algorithm. As a result, when an open section is displayed, the outline is delineated in a different color.

(3-3-6) Sectional Area measurement Processing

Figure 22A:
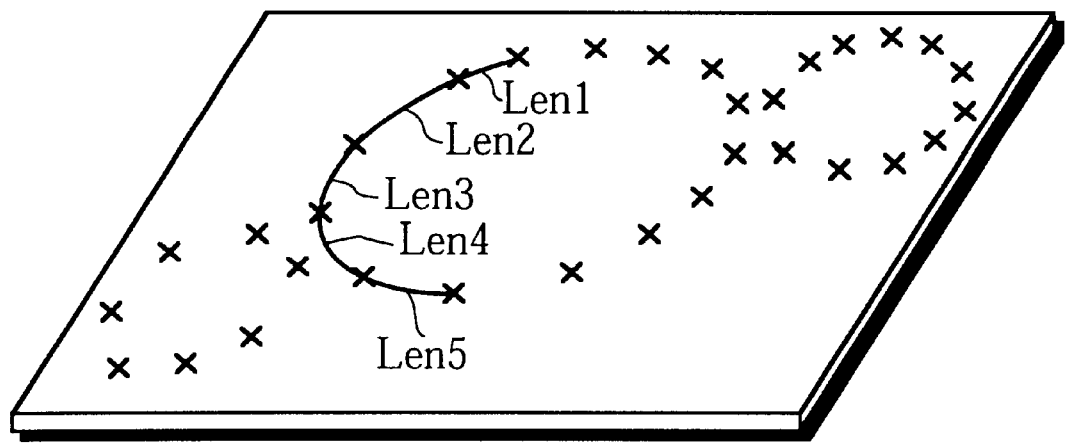
FIG. 22a is a drawing for explaining the calculation of the length
Figure 22B:
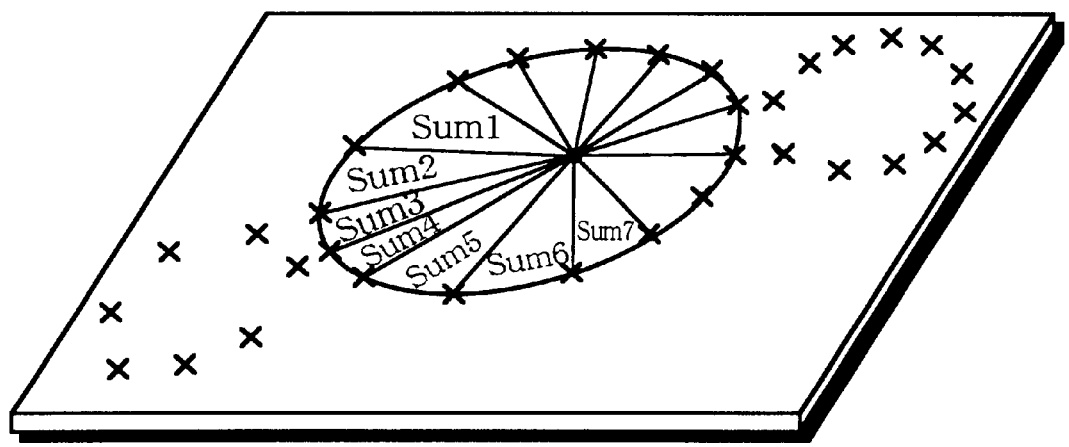
FIG. 22b is a drawing for explaining the calculation of the sectional area.

In the sectional area measurement processing at Step 63 in the flowchart in FIG. 16, a sectional area on the standard plate is calculated using polygon approximation. More specifically, when intersection points that are included in the outline of a section are obtained as shown in FIG. 22a, the sectional area is calculated from the summation of the area of triangles each of which includes the origin of the Canvas coordinate system and two adjacent intersection points as shown in FIG. 22b (Sums 1, 2, 3, . . . ). The area of each of the triangles is calculated from the exterior product of two vectors that are directed from the origin to the adjacent intersection points. When the area of a section is calculated and when the origin of the Canvas is positioned at the outside of the section, the value of the area of a triangle that includes a vector that is in contact with the outside of the outline of the section is set as negative, and the value of the area of a triangle that includes a vector that is in contact with the inside of the outline of the section is set as positive.

(3-3-7) Outline Length Measurement Processing

In the outline length measurement processing at Step 64 in the flowchart in FIG. 16, the length of the outline of a section is approximately calculated by obtaining the length of a broken line that is a segment sequence connecting the intersection points on the outline of a section. For instance, when the intersection points are obtained as shown in FIG. 22a, the length of the outline is the summation of the segments (called "Len" in this embodiment) each of which connects the adjacent intersection points (Len=Len1+Len2+len3+Len4+ . . . ). When calculating the length of the outline of an open section, the length of the straight line between the starting point and the ending point of the outline is added to the Len of the open section.

The sectional area and the outline length of a section that have been obtained in the sectional area measurement processing and the outline length measurement processing are displayed in the sectional face information display unit 82 with significant figures of four digits at Step S65 in the flowchart in FIG. 16. The cut mode processing is completed here.

(3-4) Distance Mode Processing

When the distance mode activation button 72 in the measuring processing operation panel 70 is selected, the process proceeds to the distance mode processing at Step S41 in the flowchart in FIG. 11. In the distance mode processing, a desired distance in the three-dimensional space in which a solid model is positioned is measured.

In this embodiment, the processing of the measurement of the length of the straight line between two points and that of the length of two kinds of path on the surface of a solid model will be explained. The two kinds of path are a path on one plane and a path on more than one plane.

Figure 23:
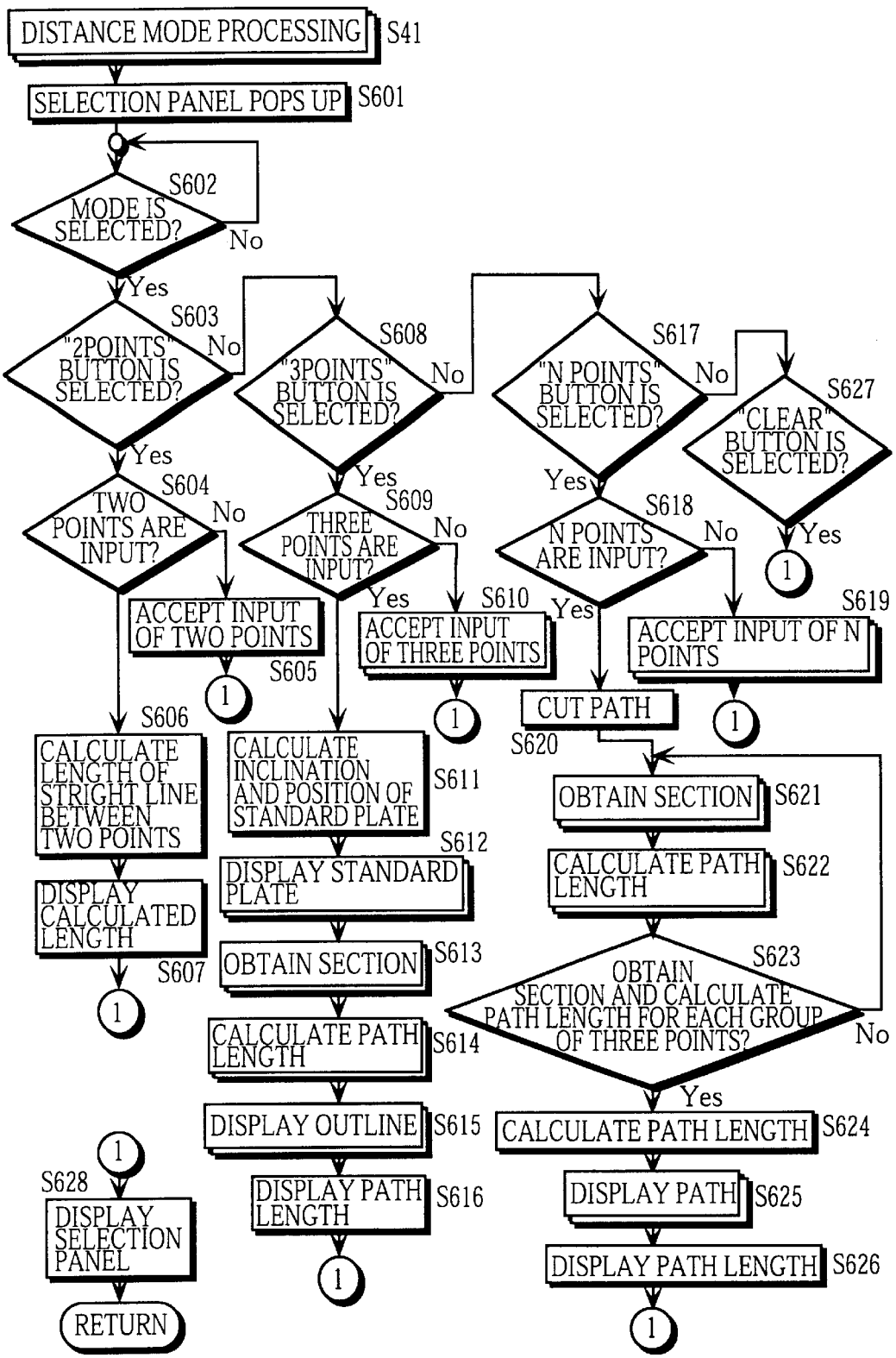
FIG. 23 is a flowchart illustrating the distance mode processing.
Figure 24:
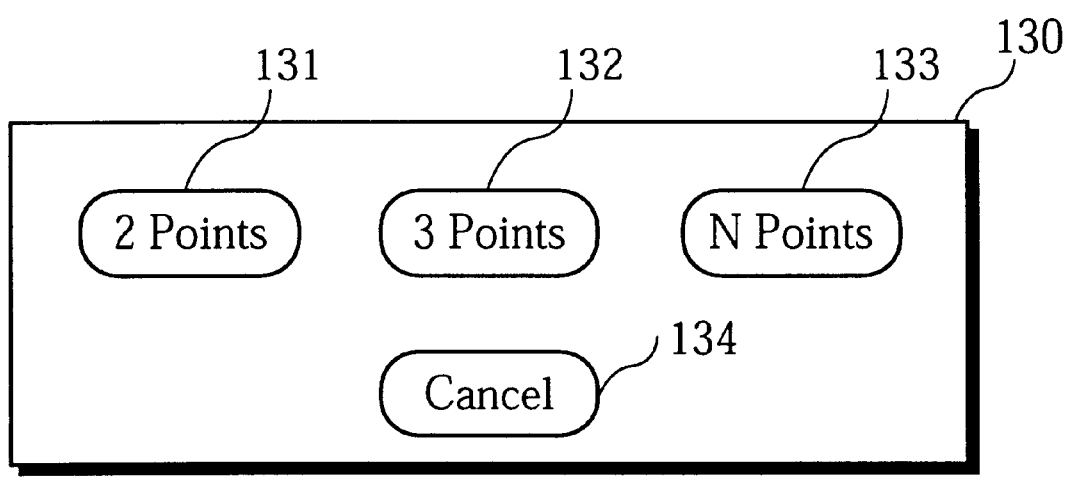
FIG. 24 shows the selection panel.

FIG. 23 is a flowchart illustrating the distance mode processing. When the distance mode processing is activated, a selection panel 130 (FIG. 24) pops up at Step S601. The selection panel 130 includes a two-point mode button 131 for activating two-point-input mode processing in which the length of the straight line between two points is obtained, a three-point mode button 132 for activating three-point-input mode processing in which the length of a path on one plane on the surface of the solid model is obtained, an N-point mode button 133 for activating N-point-input mode processing in which the length of a path on more than two planes is obtained, and a cancel button 134 for finishing each processing. At Step S602, the selection of one of the two-point mode button 131, the three-point mode button 132, and the N-point mode button 133 is awaited. The process proceeds according to the selection.

(3-4-1) Two-Point-Input Mode Processing

When the two-point mode button 131 in the selection panel 130 is selected, whether a starting point and an ending point have been input for obtaining the length of the straight line between the two points is judged at Step S604. When it is not the case, the input of a starting point and an ending point is awaited at Step S605. When inputting two points in the two-point mode processing, the user clicks two points on the surface of the solid model in a Viewer or two points on the outline of the section in a Canvas.

When two points are input, the process proceeds to the main routine and returns to Step S604. At Step S606, the length of the straight line between the two points are calculated from the coordinate values of the two points. At Step S607, the calculated length is displayed in the length information display unit 83 in the measuring processing operation panel 70.

(3-4-2) Three-Point-Input Mode Processing

When the three-point mode button 132 in the selection panel 130 is selected, the process proceeds to Step S608 and the three-point-input mode processing starts. At Step S608, whether three points on the solid model have been input is judged. When it is not the case, the input of three points is awaited. When inputting three points in the three-point mode processing, the user clicks the starting point, the ending point, and the passing point on the outline of the section in a Canvas or on the surface of the solid model in a Viewer.

Figure 25A:
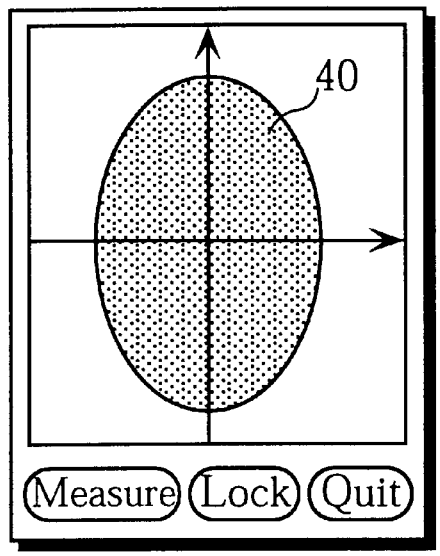
FIG. 25a shows a section displayed on a Canvas.
Figure 25B:
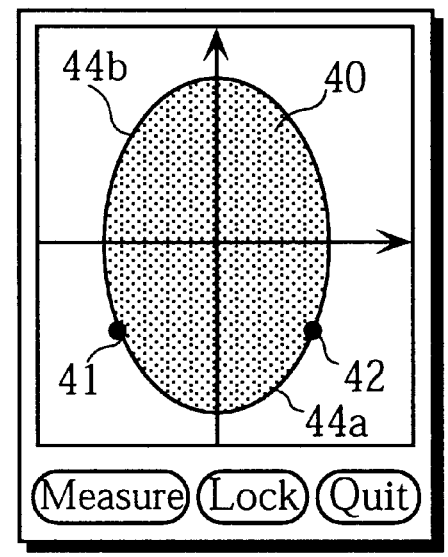
FIG. 25b shows the section shown in FIG. 25a when a starting point and an ending point are designated on the outline of the section.

More specifically, when inputting three points on the outline of the section in a Canvas, the user first clicks the starting point and the ending point. For instance, when a section 40 shown in FIG. 25a is displayed in the Canvas, the user clicks points 41 and 42 on the outline of the section 40 as the starting point and the ending point, respectively. When the points 41 and 42 are clicked as the ending point and the starting point, two path lengths 44a and 44b may be the desired path length between the two points. In order to select one of the path lengths, the user clicks a point 43 as the passing point. Instead of clicking the passing point, the user may click the area of the Canvas in which the desired path is drawn.

Figure 26A:
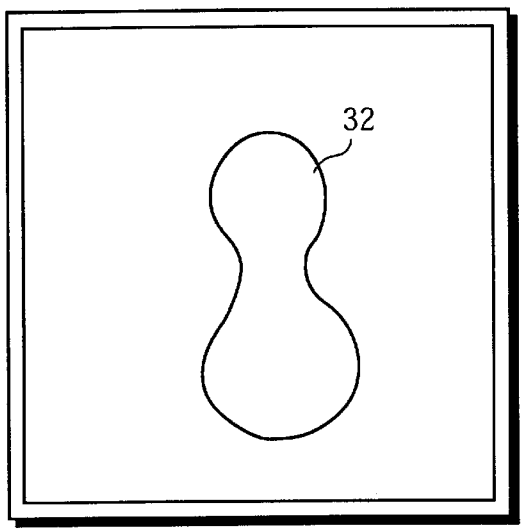
FIG. 26a shows a solid model displayed in a Viewer.

When inputting three points on the surface of the solid model, the user clicks the three points in the order of the starting point, the ending point, and the passing point. For instance, when a solid model 32 shown in FIG. 26a is displayed in a Viewer, points 51, 52, and 53 are input as the starting point, the ending point, and the passing point, respectively. An input in a Canvas and in a Viewer is distinguished by the kind of window in which the starting point is input.

After the acceptance of the input of three points, the process proceeds to the main routine and returns to Step S609. In this case, three points have been input, so that the process proceeds to Step S611. At Steps S611 to 613, the section of the outline on which the three points is positioned. When the three points have been input in the Canvas, the section has already obtained and the data of the section is used.

Figure 26B:
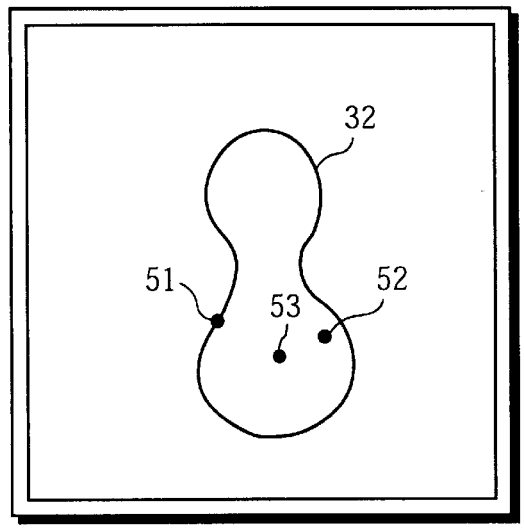
FIG. 26b shows the solid model shown in FIG. 26a when a starting point, an ending point, and a passing point are designated.
Figure 26C:
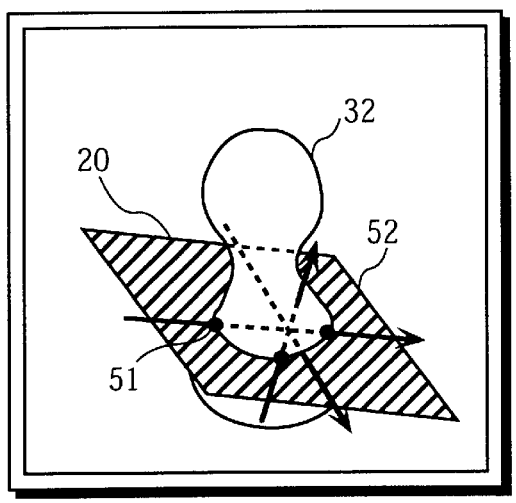
FIG. 26c shows the solid model shown in FIG. 26b when the standard plate is displayed.

When the three points are input in the Viewer, the inclination and the position of the standard plate on the surface of which the three points are positioned are calculated at Step S611. When three points are indicated as shown in FIG. 26b, the inclination and the position of the standard plate is set as shown in FIG. 26c. The segment connecting the starting point 51 and the ending point 52 is set as the X-axis of the standard plate, the middle point of the segment is set as the origin of the standard plate, and the plane that includes the X-axis and the passing point 53 is set as the X-Y plane.

At Step S612, the standard plate is displayed in the Viewer according to the inclination and the position that have been obtained at Step S611. At Step S613, the sectional area of the solid model is obtained. The sectional area is obtained in the same manner as in the cut mode processing. When obtained, the section is displayed in a Canvas as shown in FIG. 26d.

Figure 27:
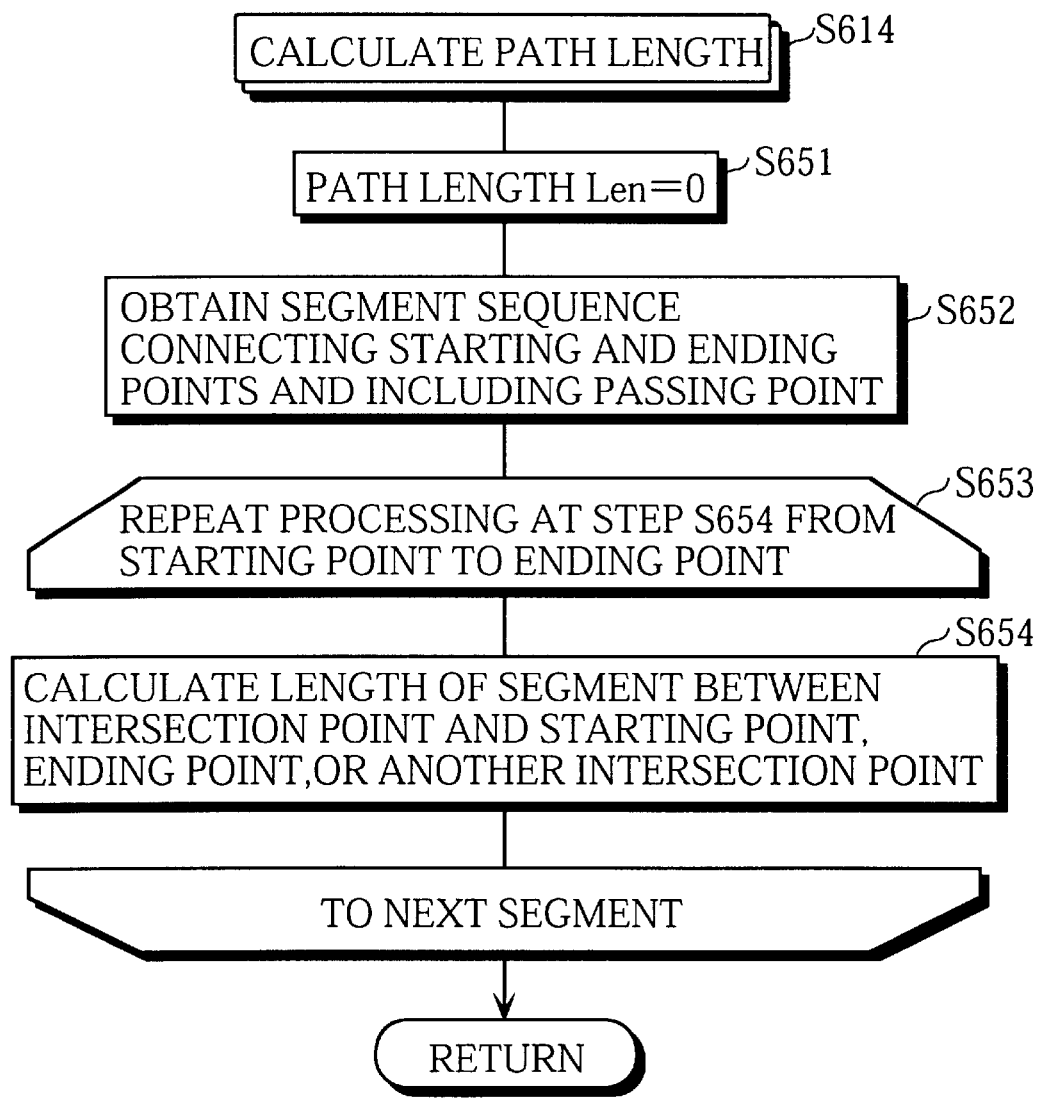
FIG. 27 is a flowchart illustrating the path length measurement processing.

When the section and the three points are displayed in the Canvas, the path length is calculated at Step S614 regardless of the kind of window in which the three points have been input. The path length is calculated by summing up the lengths of the segments between the starting point and the passing point and between the passing point and the ending point. Path length measurement processing will be explained with reference to the flowchart in FIG. 27. In the flowchart, the "path length Len" is the variable representing the length of a path including a starting point, an ending point, and a passing point. When the process proceeds to the flowchart, the processor 10 substitutes "0" into the path length Len at Step S651. In other words, the path length Len is initialized.

At Step S652, the processor 10 obtains the segment sequence that connects the starting and ending points and includes the passing point. At Step S653, the processor 10 controls the processing at Step S654 so that the processing is executed for all the segments between the starting point and the ending point. At Step S654, the processor 10 calculates the length of a segment between an intersection point and the starting point, the ending point, or another intersection point, and adds the segment length to the path length Len. When the processing has been executed for the segments between the starting point and the ending point, the length of the path including the designated three points is obtained.

Figure 25C:
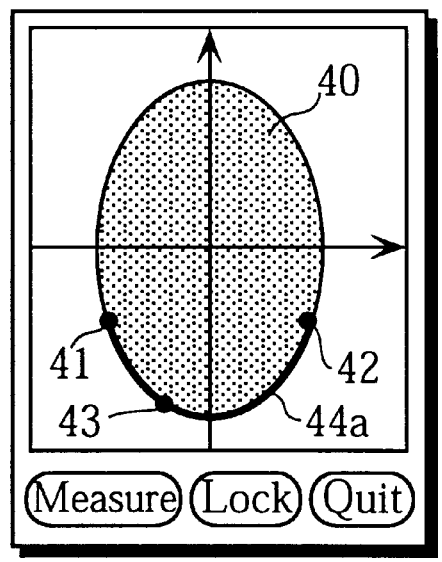
FIG. 25c shows the section shown in FIG. 25b when a passing point is designated.
Figure 26D:
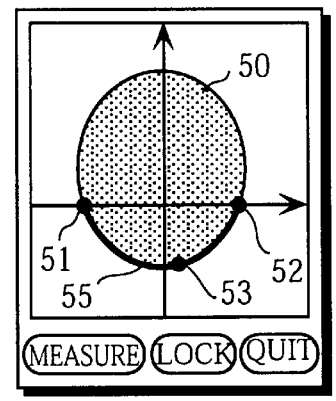
FIG. 26d shows a image of the section of the solid model cut with the standard plate shown in FIG. 26c.

When the path length is calculated, the process proceeds to Step S615, and the designated path is displayed by a bold line in a color different from the other line in the outline of the section (refer to FIGS. 25c and 26d). At Step S616, the calculated value of the path length is displayed in the length information display unit 83 in the measuring processing operation panel 70.

(3-4-3) N-Point-Input Mode Processing

In the N-point-input mode processing, the length of a path that is on the surface of the solid data and on more than one plane is obtained. It is difficult for the user to precisely designate such a path by dragging the mouse 5 on a two-dimensional display. As a result, the user designates the path with a plurality of points on the surface of the solid model. The user designates N points including the starting point, the ending point, and a plurality of passing points.

The N points on the solid model are positioned on more than one plane. As a result, a plurality of paths including the N points may be drawn. Under the circumstances, it is impossible for the user to designate one path including the N points only by selecting the starting point, the ending point, and the N points. In this embodiment, groups of three points are created from the N points, and the length of a path including the three points is calculated in the manner used in the three-point-input mode processing for each group of three points. Using the result of the calculation, the approximate length of the path including the N points is obtained.

Figure 28A:
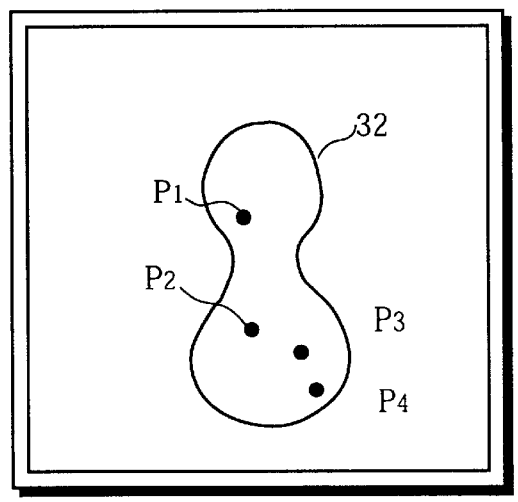
FIG. 28a shows a solid model on which four points are designated.
Figure 28B:
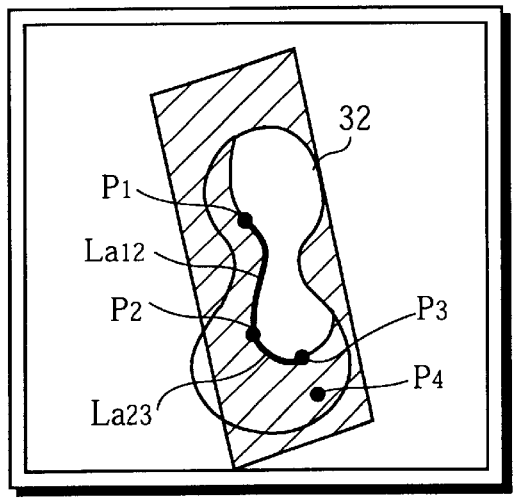

More specific explanation will be given with reference to FIGS. 28a, 28b, and 28c. For instance, four points P1, P2, P3, and P4 (the point P1 represents the starting point, the point P4 represents the ending point, and the points P2 and P3 represent the passing points) on the surface of a solid model 32 are designated as shown in FIG. 28a. The path including the points P1, P2, and P3 as shown in FIG. 28b is obtained using the plane on which the points P1, P2, and P3 are positioned. The path length between the points P1 and P2 is set as a path length La12, and that between the points P2 and P3 is set as a path length La23.

Figure 28C:
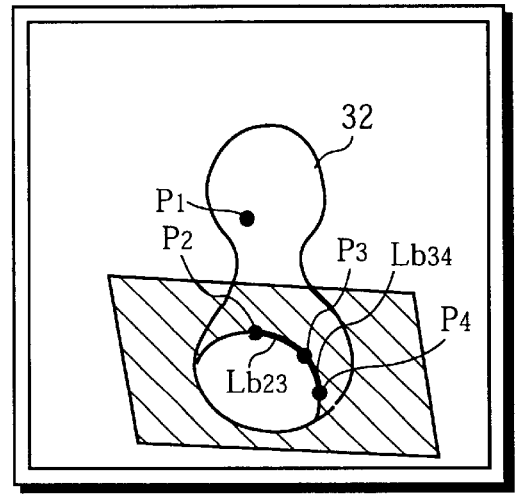

On the other hand, the path including the points P2, P3, and P4 as shown in FIG. 28c is obtained using the plane on which the points P2, P3, and P4 are positioned. The path length between the points P2 and P3 is set as a path length Lb23, and that between the points P3 and P4 is set as a path length Lb34. The path lengths La12, La23, Lb23, and Lb34 are obtained in the same manner as in the three-point-input mode processing.

As a result, two path lengths, the path lengths La23 and Lb23, are obtained between the points P2 and P3. In this processing, the desired path length between the two points to be obtained is considered to be almost equal to the average of the two path lengths, so that the average of the path lengths La23 and Lb23 is set as the path length between the points P2 and P3. In other words, the path length from the point P1 to the point P4 through the points P2 and P3 is represented by the expression "La12+((La23+Lb23)/2)+Lb34".

In the same manner, the length of the path including the N points (points P1, P2, . . . , PN−1, and PN) on the surface of the solid model, a path length Path(P1, P2, . . . , PN−1, PN) is obtained. The consecutive three points, points Pi, Pi+1, and Pi+2 are set as the starting point, the passing point, and the ending point of these three points, respectively. The path length between the starting point and the passing point on the plane including the three points is set as a path length L(Pi, Pi+1, Pi+2, "former"), and the path length between the passing point and the ending point is set as a path length L(Pi, Pi+1, Pi+2, "latter").

In the N-point-input mode processing, only one path length between the starting point (the point P1) and the next point (the point P2) and only one path length between the ending point (the point PN) and the point just before the ending point (the point PN−1) are obtained. On the other hand, the path lengths between other points (the points Pi and Pi+1(i=2, 3, . . . , N−2)) is obtained by calculating the average of the path lengths L (Pi, Pi+1, Pi+2, "latter") and L(Pi+1, Pi+2, Pi+3, "former"). As a result, the path length Path(P1, P2, . . . , PN−1, PN) is represented by the expression below.

$$L(P_1, P_2, P_3, \text{"former"}) + L(P_{N-2}, P_{N-1}, P_N, \text{"latter"}) + \sum_{i=1}^{N-3} \frac{L(P_i, P_{i+1}, P_{i+2},)\text{"latter"} + L(P_{i+1}, P_{i+2}, P_{i+3},)\text{"former"}}{2} \quad \text{①}$$

The processing of obtaining the length of a path including the N points will be explained. When the N-point mode button 133 in the selection panel 130 is selected at Step S617 in the flowchart in FIG. 23, the N-point-input mode processing starts. At Step S618, whether the N points have been input is judged. When it is not the case, the process proceeds to Step S619, and the input of the N points is awaited.

Figure 29A:
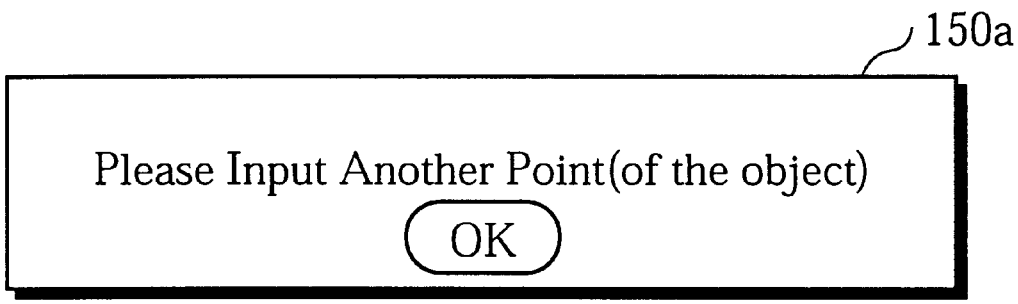
FIG. 29a shows a pop-up menu displayed in the N-point-input mode processing.

In the N-point-input mode processing, the user inputs the N points by clicking the N points on the surface of the solid model in a Viewer. When the user clicks the first point, a pop-up menu 150a as shown in FIG. 29a is displayed on the display screen. When the user inputs the second and third points, the pop-up menu 150a is repeatedly displayed on the display screen.

Figure 29B:
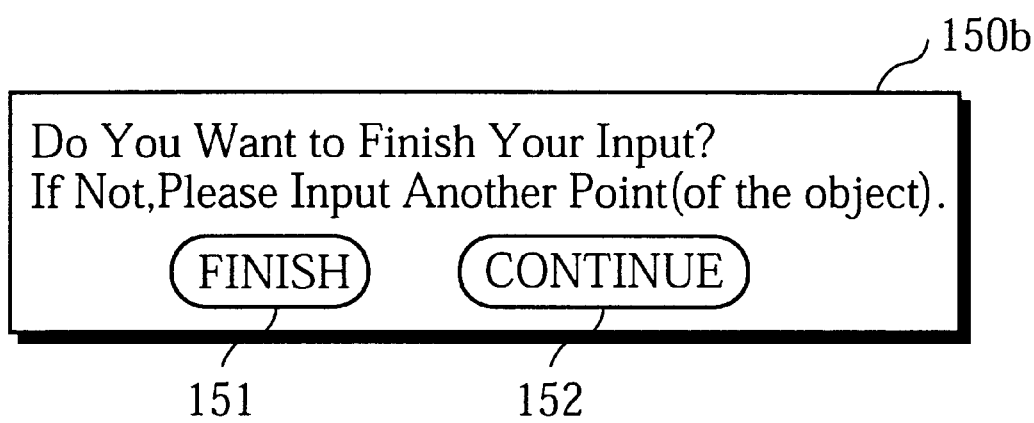
FIG. 29b shows another pop-up menu displayed in the N-point-input mode processing.

In the N-point-input processing, it is possible to input any number of points more than three. As a result, the user has to indicate that all of the points have been input. After the input of the fourth point, a pop-up menu 150b as shown in FIG. 29b is displayed and questions the user whether a point will be further input. When it is the case, the user selects a continue button 152, and when it is not the case, the user selects a finish button 151. When the user selects the finish button 151, all of the N points have been input, and the coordinate values of the N points in the Viewer coordinate are input.

When the input of the N points has been accepted, the process proceeds to the main routine, returns to Step S618, and proceeds to Step S620. At Step S620, the processor 10 cuts the path to be obtained. In other words, consecutive three points included in the path are extracted from the input N points in order to make groups of three points. In such groups of three points, the consecutive last two points in one group are the same as the consecutive first two points in the next group.

At Step S621, the data of the section the outline of which includes extracted three points is obtained, and at Step S622, the length of the path including the three points. The standard plate on which the three points are positioned is obtained, the section of the solid model cut with the standard plate is obtained, and the length of the path including the three points is obtained. The processing at Steps S621 and S622 is the same as in the three-point-input mode processing.

When the processing at Steps S621 and S622 has been executed for all the groups of three points ("yes" at Step S623), the path length is calculated in accordance with the expression ① at Step S624. At Step S625, the path including the N points are displayed. In this embodiment, the path is a segment sequence of the straight lines that connects the N points. Of course, it is possible to calculate and display the curved line that connects the N points smoothly.

At Step S626, the path length that has been calculated at Step S624 is displayed in the length information display unit 83 in the measuring processing operation panel 70. The N-point-input processing is completed with Step S626.

In the N-point-input processing that has been described, it is possible to calculate the length of any path on the surface of the solid model. In this embodiment, the path length between the two points is calculated from the two path lengths between the two points. It is possible to obtain the path length between the two points by calculating a curved line in accordance with the linear interpolation using the path lengths between the two points of two curved lines as the weight. In this embodiment, consecutive three points are extracted from the N points in order to make groups of three points so that the consecutive last two points in one group are the same as the consecutive first two points in the next group. It is possible to create groups of three points so that the two points in one group are the same as the two points in another group. For instance, when points Pa, Pb, Pc, and Pd have been input, it is possible to make groups (Pa, Pb, Pd) and (Pa, Pc, Pd).

(3-5) Curved Surface Mode Processing

Figure 30:
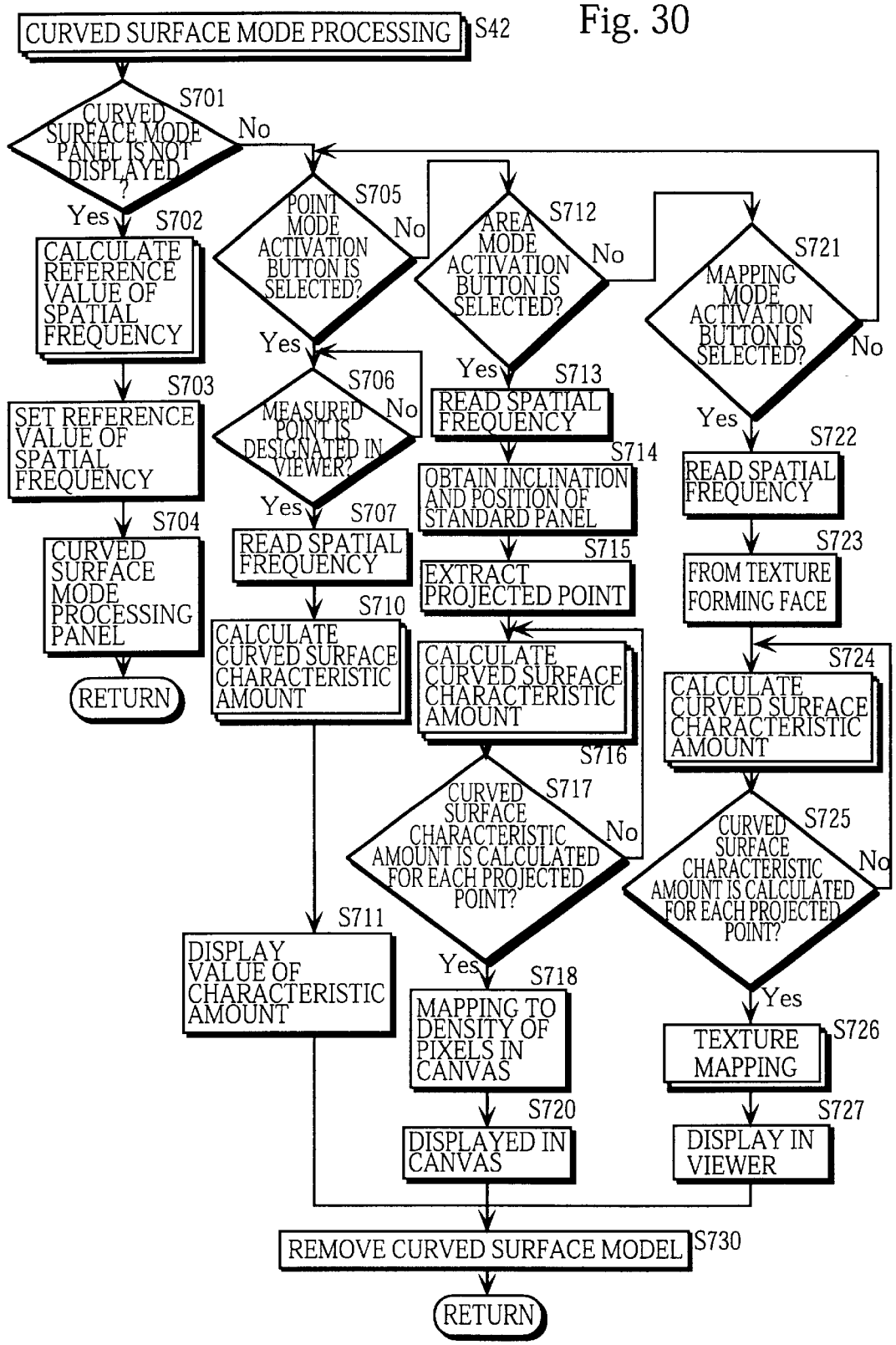
FIG. 30 is a flowchart illustrating the curved surface mode processing.

In the curved surface mode processing, the characteristic amount such as the differential value and the curvature of a point or part of the surface of the solid model that the user has designated is obtained and displayed as a numerical value and an image. In the calculation of the characteristic amount, the spatial frequency of the unevenness on the surface of the solid model is set or adjusted. The curved surface mode processing is executed when the curved surface activation button 73 in the measuring processing operation panel 70 is selected, i.e., when the result of the judgement at Step S35 in the flowchart of the measuring processing shown in FIG. 11 is "Yes". FIG. 30 is a flowchart illustrating the curved surface mode processing. The adjustment of the spatial frequency and the calculation of the characteristic amount in the curved surface mode processing will be explained with reference to the flowchart shown in FIG. 30.

(3-5-1) Adjustment of Spatial Frequency

The adjustment of spatial frequency includes the removal of high-frequency noise that arises when measuring an object, the adjustment of the inequality of the distances between the sampling points, and the adjustment of spatial frequency when the user obtains characteristic amount macroscopically or microscopically. In this embodiment, the spatial frequency represents the periods of a concave and a convex included in one unit of length, and the adjustment of spatial frequency represents the designation of the frequency of concave and convex at which the characteristic amount is calculated. The reciprocal number of spatial frequency represents the distance in which a concave and a convex are included. As a result, the adjustment of spatial frequency is the adjustment of the area in which a concave and a convex are included.

Figure 31A:
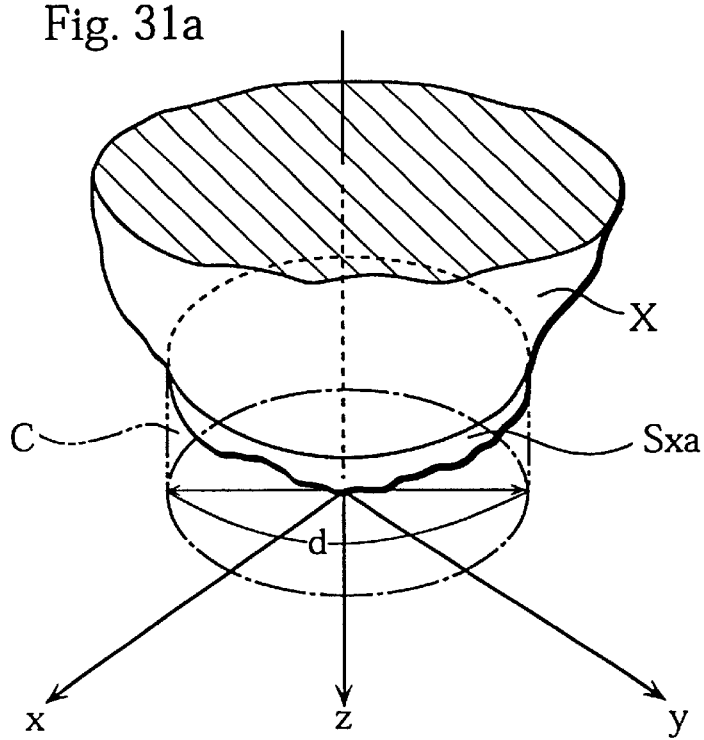
FIG. 31a shows the curved surface included in the area determined by a spatial frequency.

For instance, by the designation of spatial frequency, i.e., by the designation of distance, a solid model surface area Sxa that is included in the line of intersection of a circular cylinder and the solid model surface as shown in FIG. 31a. The diameter of the circular cylinder has distance "d" and is determined by the reciprocal number of a spatial frequency, and a solid model "X" is considered a curved surface Sxb for which a smoothing processing has been executed, and the characteristic amount of the solid model surface area Sxa is calculated. In the actual calculation, it is not required to calculate the line of intersection of the area and the solid model surface area Sxa. It is sufficient for the calculation to obtain several points on the line of intersection.

In the flowchart shown in FIG. 30, when the curved surface mode processing panel 140, which will be described later, is not displayed, the process proceeds to Step S702, and the spatial frequency is adjusted. Just after the activation of the curved surface mode processing, the curved surface mode processing panel 140 is not displayed, and the process proceeds to Step S702.

Figure 32:
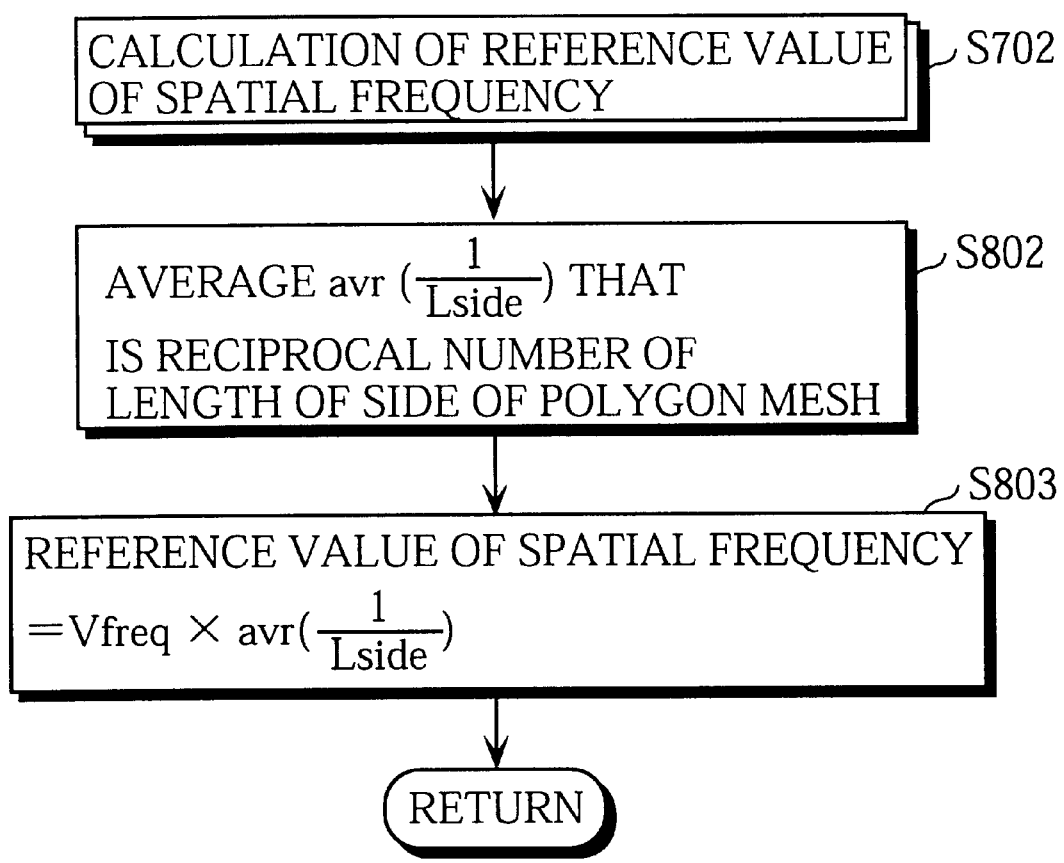
FIG. 32 is a flowchart illustrating the processing for calculating the standard value of a spatial frequency.

At Step S702, the standard value of spatial frequency is calculated. The standard value represents appropriate spatial frequency for the calculation of characteristic amount and is set according to the average distance between the vertexes on the surface of the solid model. In other words, the standard value is calculated according to the density of the vertexes on the surface of the solid model. FIG. 32 is a flowchart illustrating the processing for calculating the standard value of spatial frequency. At Step S802, an average avr(1/Lside) that represents the average of the reciprocal number of the length of the sides of the polygon meshes of the solid model is obtained. The average avr(1/Lside) is the average of the spatial frequency when the distance between two vertexes is considered to be one period. At Step S803, the average avr(1/Lside) that has been obtained at Step S802 is multiplied by a correction "V frag", and the standard value of the spatial frequency is calculated. In this calculation, the correction "V frag" that is obtained empirically represents "0.25". In this embodiment, the standard value of spatial frequency is calculated according t o the density of the vertexes on the surface of the solid model. It is possible to obtain the standard value of spatial frequency by user's selecting the spatial frequency that has the widest band.

Figure 33:
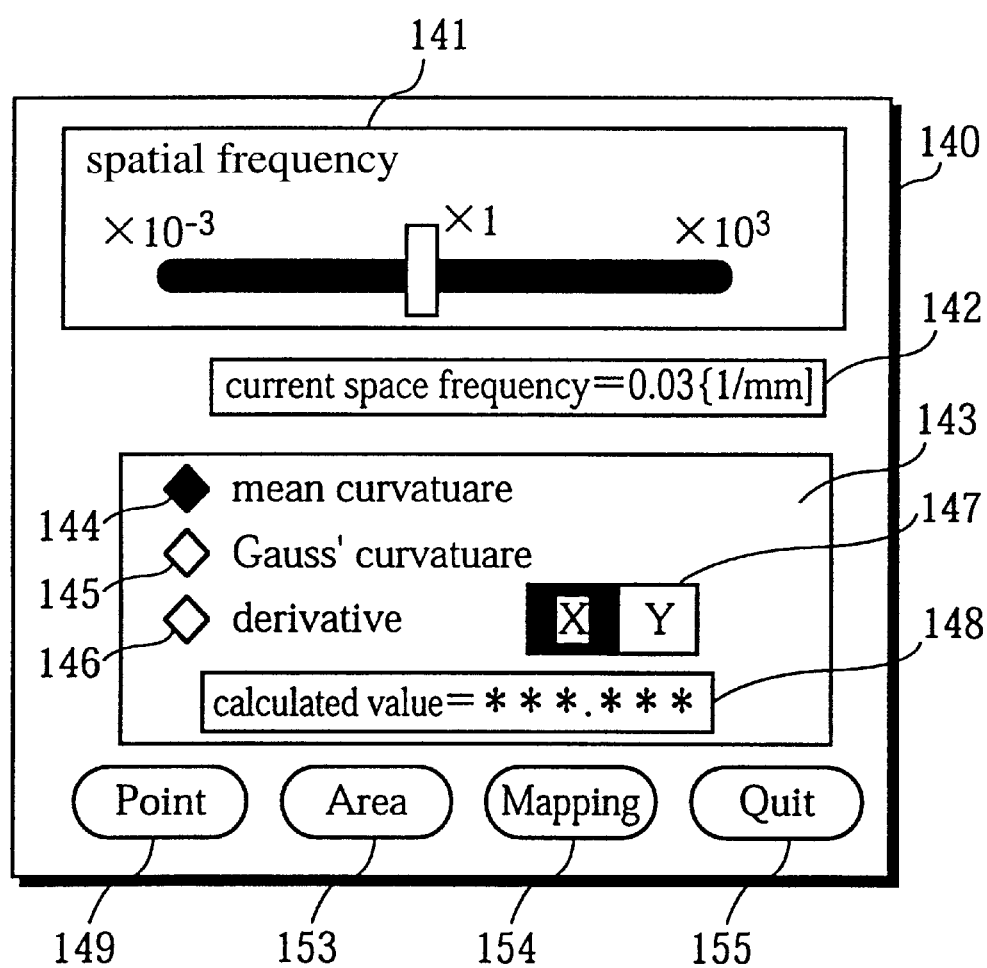
FIG. 33 shows the curved surface mode processing panel.

When obtained, the standard value of spatial frequency is stored in a predetermined storage area at Step S703 and the curved surface mode processing panel 140 is displayed at Step S704. FIG. 33 shows the curved surface mode processing panel 140 displayed at Step S704. The curved surface mode processing panel 140 includes a slider 141, a spatial frequency display unit 142, characteristic amount selection buttons 144, 145, and 146, a differential direction selection button 147, a calculated value display unit 148, a point mode activation button 149, an area mode activation button 153, a mapping mode activation button 154, and a quit button 155.

The slider 141 is selected when the user adjusts spatial frequency. The user selects the magnification ratio of the calculated standard value by moving the cursor on the ruler with the mouse 5. The magnification ratio is changed from $10^{-3}$ to $10^3$. The spatial frequency display unit 142 displays the spatial frequency that has been obtained using the slider 141. When the curved surface mode processing panel 140 is displayed on the display screen for the first time, the spatial frequency display unit 142 displays the standard value of spatial frequency calculated at Step S702.

The characteristic amount selection buttons 144, 145, and 146 are used for selecting the kind of characteristic amount that the user is to calculate. The user selects average curvature, Gaussian curvature, or differential value with the characteristic amount selection button 144, 145, or 146, respectively. When differential value is selected as characteristic amount, the direction of the differential is selected with the differential direction selection button 147.

The point mode activation button 149 is selected when the user activates point mode processing for obtaining the characteristic amount at one point on the surface of the solid model. The obtained characteristic amount is displayed in the calculated value display unit 148. The area mode activation button 153 is selected when the user activates area mode processing for calculating the characteristic amount at all the vertexes on the surface of solid model seen from one direction and for displaying the calculation result as an image. The mapping mode activation button 154 is selected when the user activates mapping mode processing for calculating the characteristic amount at all the vertexes on the surface of the solid model and for placing the calculation result on the image of the solid model with texture mapping processing. The quit button 155 is selected for completing the curved surface mode processing.

(3-5-2) Characteristic Amount Calculation Processing

When the curved surface mode processing panel 140 is displayed on the display screen, the process proceeds to the main routine, returns to Step S701, and proceeds to characteristic amount calculation processing. In the characteristic amount calculation processing, all of the point mode processing, the area mode processing, and the mapping mode processing is executed and a differential value, an average curvature, or a Gaussian curvature is calculated as characteristic amount according to the selection of a button in the curved surface mode processing panel 140. An average curvature indicates the concave or convex of a curved surface. A Gaussian curvature indicates whether a curved surface is made by curving a plane. When the expansion and/or contraction is necessary in addition to the curve of a plane, the Gaussian curvature is not "0". Not all kinds of characteristic amount depend on the normal direction at a target measured point. As a result, the coordinate system defined by the normal direction and the coordinate system defined by the standard plate should be used properly according to the kind of characteristic amount.

(3-5-2a) Calculation of Differential Value

A differential value is calculated independent from the normal direction at a target point. As a result, the coordinate system defined by the standard plate is used for the calculation of a differential value. In this embodiment, the coordinate system defined by the standard plate is called a "XLYLZL coordinate system". In the XLYLZL coordinate system, the coordinates of the point near a target point is (x,y,f(x,y)). The value of the coordinate f(x,y) is calculated from the ZL coordinates of vertexes P1, P2, ..., Pn, which are the vertexes of the polygon mesh on which the point (x,y,f(x,y)) is positioned, by completing the reciprocal number of the distances between the vertexes and the target point as the weight. More specifically, when the ZL coordinate of a vertex Pi is ZL(Pi) and the distance between the vertex Pi and the target point is L(Pi), the value of the coordinate f(x,y) is represented by the expression described below.

$$f(x, y) = \frac{\sum_{i=1}^{n} (ZL(P_i)/L(P_i))}{\sum_{i=1}^{n} (1/(L(P_i)))}$$

It is possible to obtain the value of the coordinate f(x,y) by approximation using a Parametric curve or surface in a B-spline or normal blending manner.

When the target point is (x0,y0,f(x0,y0)) and the interval distance is "d" which is calculated from the spatial frequency, the differential values in the XY-axis and YL-axis of the target point are represented by the expressions described below.

$$\frac{\partial f}{\partial x} = \frac{f(x_0 + d/2, y_0) - f(x_0 - d/2, y_0)}{d} \quad (2)$$

$$\frac{\partial f}{\partial y} = \frac{f(x_0, y_0 + d/2) - f(x_0, y_0 - d/2)}{d} \quad (3)$$

Figure 34A:
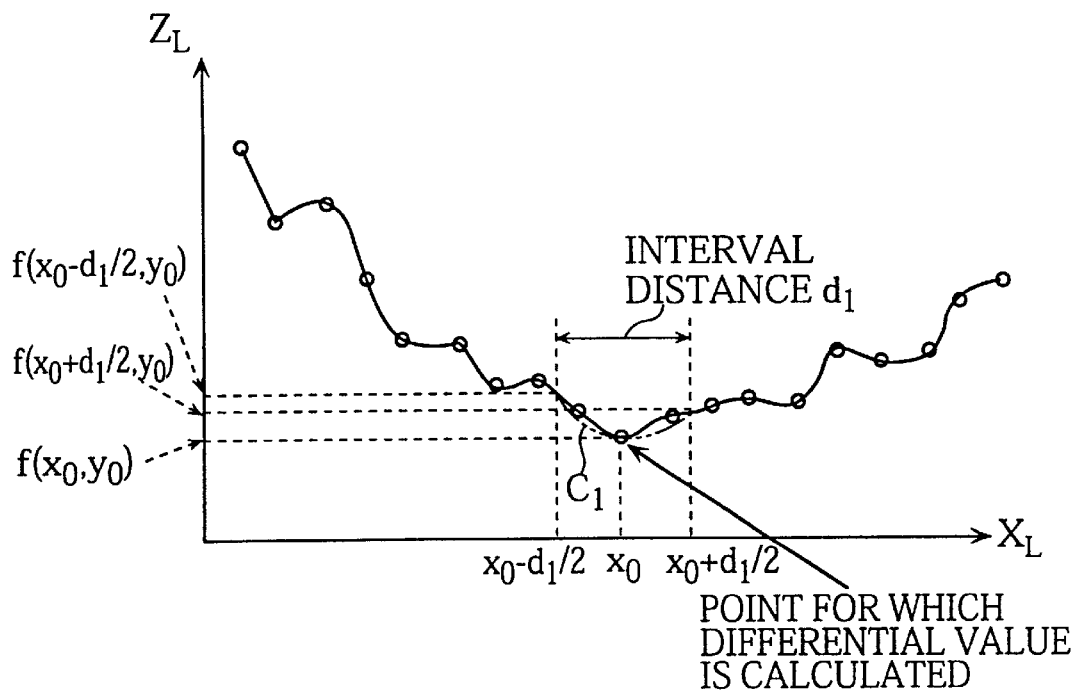
FIG. 34a shows the variable that is used as the coefficient in the calculation of characteristic amount in which the spatial frequency is high.
Figure 34B:
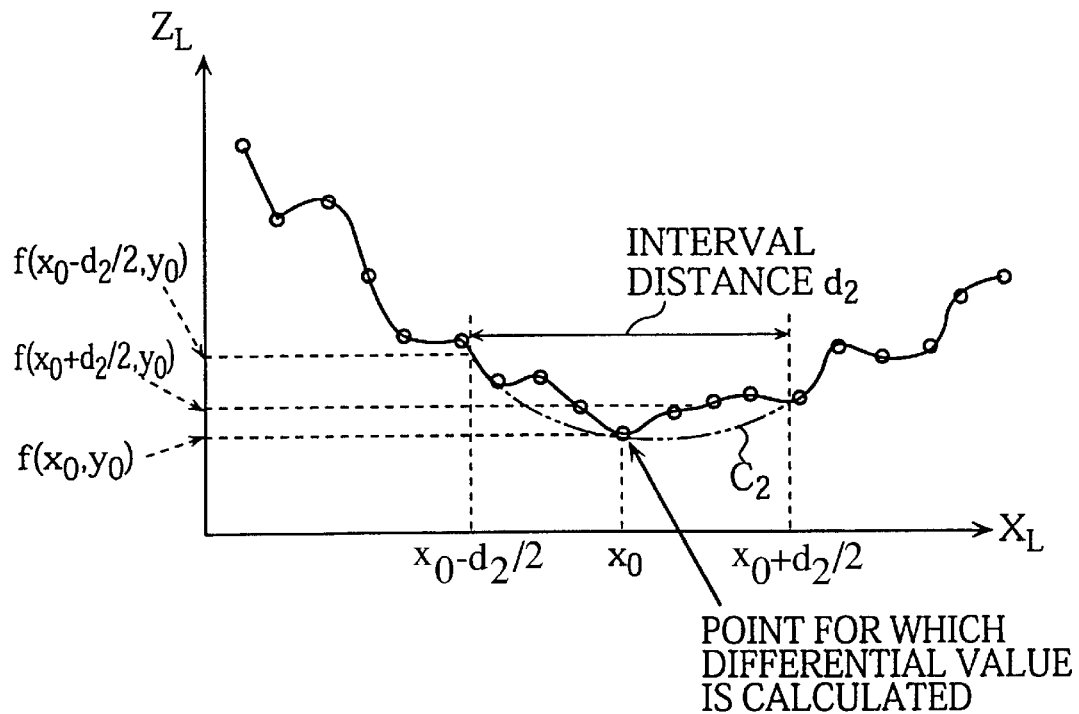
FIG. 34b shows the variable that is used as the coefficient in the calculation of characteristic amount in which the spatial frequency is low.

FIGS. 34a and 34b show the relationship between the interval distance "d" that is defined by the spatial frequency and a coordinate f(x0,y0), a coordinate f(x0–d/2,y0), and a coordinate f(x0+d/2,y0). FIG. 34a shows the relationship when the value of the interval distance "d" is set as a narrow value (i.e., high spatial frequency), an interval distance "d1". FIG. 34b shows the relationship when the value of the interval distance "d" is set as a wide value (i.e., low spatial frequency), an interval distance "d2". The differential values in the XY-axis and YL-axis are calculated in the same manner. As a result, the calculation of the differential value in the XL-axis will be described. According to the expressions ② and ③, the differential value is calculated from the points (x0–d/2,y0,f(x0–d/2,y0)), (x0+d/2,y0,f(x0+d/2,y0)) in the area inside of the circle the radius of which is the interval distance "d" and the center is the target point (x0,y0,f(x0,y0)). As a result, the curved line between the two points is considered as a smoothed curved line in the characteristic amount calculation. In the calculation, when the interval distance "d" is set small, the characteristic amount is calculated microscopically, and when the interval distance "d" is set large, the characteristic amount is calculated macroscopically.

In this embodiment, the curved line (curved surface) is considered as a smoothed curved line (smoothed curved surface) in calculating the differential value. When executing normal differential processing after actually smoothing the curved line (curved surface) over the interval distance "d", almost the same result may be obtained. The same may be said to the calculation of a curvature that will be described below.

(3-5-2) Calculation of Curvature

Figure 35:
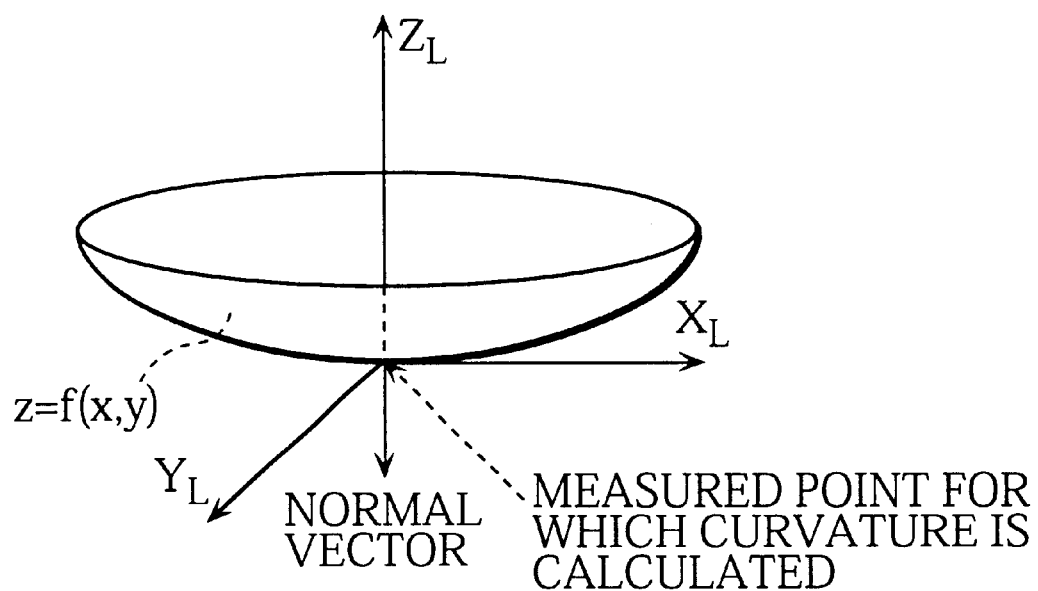
FIG. 35 shows a coordinate system defined by the normal of a target measured point for which a curvature is calculated.

A curvature depends on the normal direction of a target point. As a result, a curvature is calculated using a local coordinate system, the XLYLZL coordinate system that is defined by the normal at a target point. More specifically, a coordinate system in which the origin is the target point and the ZL-axis is set in the opposite direction of the normal at the target point is used as shown in FIG. 35. The XL-axis and the YL-axis are set appropriately according to the condition. In this coordinate system, the coordinates of the point near the target point on the surface of the solid model is represented as $(x,y,f(x,y))$, and the value of $(x,y)$ is obtained in the same manner as in the differential value calculation.

An average curvature κm, and a Gaussian curvature κg that are calculated in the curvature calculation are represented by the expressions described below.

$$\kappa m = \frac{\partial^2 f}{\partial x^2} + \frac{\partial^2 f}{\partial y^2} \quad \text{④}$$

$$\kappa g = \left(\frac{\partial^2 f}{\partial x^2}\right)\left(\frac{\partial^2 f}{\partial y^2}\right) - \left(\frac{\partial^2 f}{\partial x \partial y}\right)^2 \quad \text{⑤}$$

When the XL-coordinate and the YL coordinate of the target point are "x0" and "y0", respectively, the values of "$\partial^2 f/\partial x^2$", "$\partial^2 f/\partial y^2$", and "$\partial^2 f/(\partial x \partial y)$" in the expressions ④ and ⑤ are approximated using the interval distance "d" (the reciprocal number of the spatial frequency) in accordance with the expressions below.

$$\frac{\partial^2 f}{\partial x^2} = \frac{f(x_0 + d, y_0) + f(x_0 - d, y_0) - 2f(x_0, y_0)}{d^2} \quad \text{⑥}$$

$$\frac{\partial^2 f}{\partial y^2} = \frac{f(x_0, y_0 + d) + f(x_0, y_0 - d) - 2f(x_0, y_0)}{d^2} \quad \text{⑦}$$

$$\frac{\partial^2 f}{\partial x \partial y} = \frac{f(x_0 + d/2, y_0 + d/2) + f(x_0 - d/2, y_0 - d/2) - f(x_0 + d/2, y_0 - d/2) + f(x_0 - d/2, y_0 + d/2)}{d^2} \quad \text{⑧}$$

The average curvature and the Gaussian curvature may be calculated from the data of vertexes on the solid model in accordance with the expressions ④ to ⑧. In these expressions, the same relationship between the interval distance "d" and the coordinate f(x0,y0), the coordinate f(x0−d/2,y0), and the coordinate f(x0+d/2,y0) as shown in FIGS. 34a and 34b is found. As a result, the surface of the solid model between the two points in FIG. 34a (34b) is considered to be smoothed as the curved line (curved surface) C1 (C2) in the characteristic amount calculation. In the curvature calculation, since a local coordinate system is used, "x0=0" and "y0=0".

(3-5-3) Point Mode Processing

When the point mode activation button 149 in the curved surface mode processing panel 140 shown in FIG. 33 is selected, the result of the judgement at Step S705 in the flowchart of the curved surface mode processing shown in FIG. 30 is "yes", and the point mode processing starts.

In the point mode processing, the designation of a target point on the surface of the solid model in a Viewer is awaited at Step S706. When the target point has been designated, the present spatial frequency, i.e., the value of the spatial frequency displayed in the spatial frequency display unit 142 in the curved surface mode processing panel 140 is read at Step S707.

Figure 36:
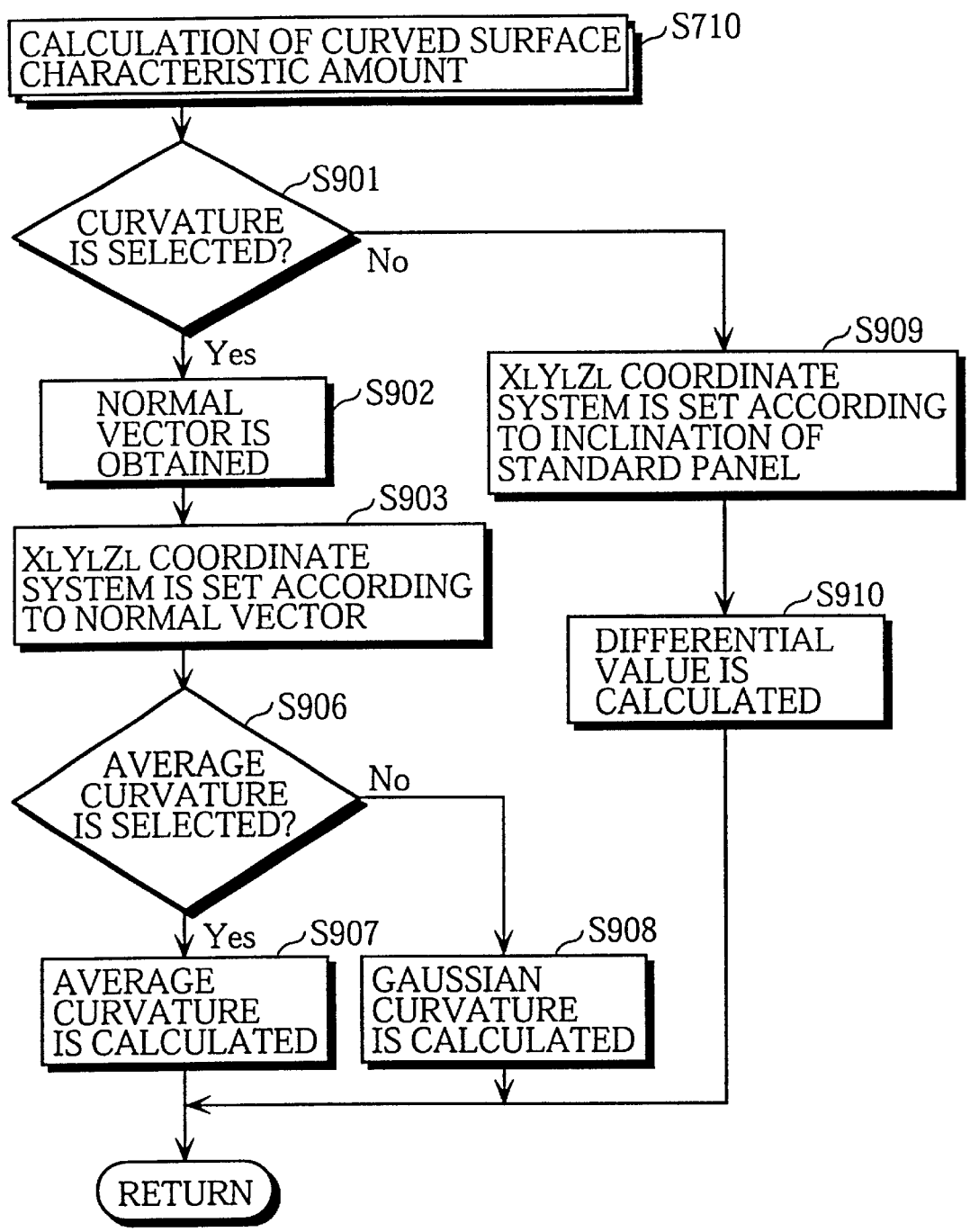
FIG. 36 is a flowchart illustrating the processing of the calculation of curved surface characteristic amount.

At Step S710, the characteristic amount on a curved surface is calculated. FIG. 36 is a flowchart illustrating the processing of the calculation of curved surface characteristic amount. The processing of a characteristic amount is different according to the kind of the characteristic amount, i.e., differential value, average curvature, or Gaussian curvature that is selected with the characteristic amount selection button 144, 145, or 146 in the curved surface mode processing panel 140.

At Step S901, the processor 10 judges whether the selected kind of characteristic amount is curvature. When it is not the case, the selected kind is differential value. As a result, the process proceeds to Step S909, and the coordinate system on the standard plate is set as the coordinated system. At Step S910, the differential value at the target point is calculated in the direction set with the differential direction selection button 147 in the curved surface mode processing panel 140 in accordance with the expressions ② and ③.

When curvature is the selected kind of characteristic amount at Step S901, the normal vector at the target point is obtained at Step S902, and the XLYLZL coordinate system as shown in FIG. 35 is set according to the obtained normal vector at Step S903. At Step S906, whether an average curvature is to be obtained is judged. When it is the case, the average curvature κm at the target point is calculated in accordance with the expressions ④, ⑥, ⑦, and ⑧ at Step S907. When it is not the case, the Gaussian curvature is to be obtained. As a result, the Gaussian curvature κg at the target point is calculated in accordance with the expressions ⑤, ⑥, ⑦, and ⑧ at Step S908.

When the processing of the calculation of curved surface characteristic amount is completed, the calculated characteristic amount is displayed in the calculated value display unit 148 in the curved surface mode processing panel 140 at Step S711, and the point mode processing is completed.

(3-5-4) Area Mode Processing

Figure 37A:
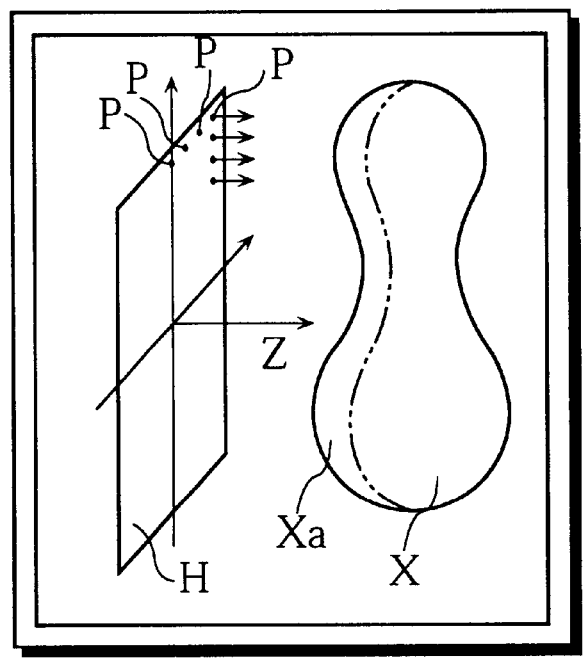
FIG. 37a shows the projection of pixels on the standard plate on the solid model.
Figure 37B:
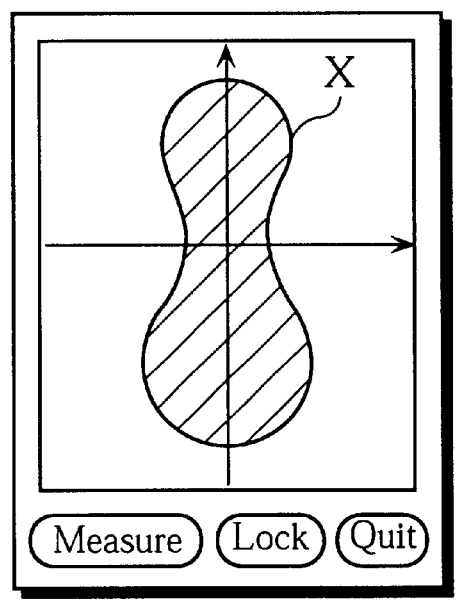
FIG. 37b shows the area displayed on a Canvas on which the pixels on the standard plate are projected.

In the area mode processing, the characteristic amount at each point on the surface of a solid model that is projected to a standard plate is displayed as an image. More specifically, the characteristic amount at the points (that are positioned on the left side of the two-dot chain line in FIG. 37a) on the surface of a solid model "X", the characteristic amount at the points that are obtained by projecting points "p"s, which are on a standard plate "H" corresponding to the pixels in a Canvas, on the solid model "X" in the Z-axis direction as shown in FIG. 37a are calculated. The density of a pixel in a Canvas is defined according to the calculated characteristic amount at the corresponding point on the surface of the solid model "X". In this manner, the calculated characteristic amount is displayed as an image in a Canvas as shown in FIG. 37b. When the process proceeds to the area mode processing, the user has to adjust the inclination and position of the standard plate so that the desired side of the solid model should be projected.

When the area mode activation button 153 in the curved surface mode processing panel 140 is selected, the result of the judgement at Step S712 in the flowchart shown in FIG. 30 is "yes", and the area mode processing starts.

In the area mode processing, the value of the present spatial frequency, i.e., the value of the spatial frequency displayed in the spatial frequency display unit 142 in the curved surface mode processing panel 140 is read at Step S713. At Step S714, the inclination and position of the standard plate is obtained. At Step S715, the points that are on the standard plate and correspond to the pixels in a Canvas are projected on the solid model in the Z-axis direction, and the coordinates of the points projected on the surface of the solid model are calculated. In this embodiment, the Canvas includes 480×480 pixels.

The characteristic amount at each of the projected points on the surface of the solid model is calculated at Step S716. The calculation processing is the same as in the flowchart shown in FIG. 36. When the characteristic amount at each of the projected points has been calculated ("yes" at Step S717), the density of the pixels corresponding to the projected points are changed according to the characteristic amount and mapped in the Canvas at Step S718. The larger the absolute value of the characteristic amount at a projected point, the smaller the brightness of the pixel data, and the smaller the absolute value of the characteristic amount at a projected point, the larger the brightness of the pixel data. The RGB (Red, Green, and Blue) value of pixel data is set according to the characteristic amount. For instance, when the value of characteristic amount is positive, the color of the pixel is set as blue, and when the value of characteristic amount is negative, the color of the pixel is set as red. When the calculation for mapping is completed, the mapped data are displayed in the Canvas at Step S720. In this embodiment, points on the surface of the solid model are obtained by projecting the points that are on the standard plate and correspond to the pixels in a Canvas on the solid model, and the density represented by the characteristic amount at the obtained points is displayed by the corresponding pixels. Instead, it is possible to display the density representing the characteristic amount on the surface of the solid model in a Canvas in the manner described below. The vertexes on the surface of the solid model are projected on the standard plate to obtain the points corresponding to the vertexes. The density of the pixels corresponding to the obtained points is calculated according to the characteristic amount at the vertexes. Then the density of the parts surrounded by the corresponding pixels is completed using the calculated density of the corresponding pixels, and the density representing the characteristic amount on the surface of the solid model is displayed in a Canvas.

(3-5-5) Mapping Mode Processing

In the mapping mode processing, the characteristic amount at each vertex on the surface of a solid model is calculated, and the image corresponding to the calculated characteristic amount is placed on the surface of the solid model by texture mapping processing.

In the texture mapping processing, the processing described below is executed. As shown in FIG. 38, a texture pattern "B" that is to be placed on the surface of the solid model "X" is formed on a texture forming face in a texture space. Then, mapping data that showing the correspondence between the texture forming face that is represented by texture space coordinates and the surface of the solid model "X" that is represented by solid model space coordinates (the coordinates in the Viewer coordinate system) is obtained. And the texture space coordinates are converted into the solid model space coordinates according to the mapping data, and the texture pattern is formed on the surface of the solid model "X".

In the mapping mode processing, polar coordinates are used as the texture space coordinates, and a spherical surface is used as the texture forming face. The reason for the use of a spherical surface is that the plane in a two-dimensional orthogonal coordinate system is not appropriate for the texture mapping on the surface of a three-dimensional shape model. When the mapping is properly executed, other kinds of texture forming face such as the plane on a two-dimensional orthogonal coordinate system and the surface on a circular cylinder may be used.

Figure 39:
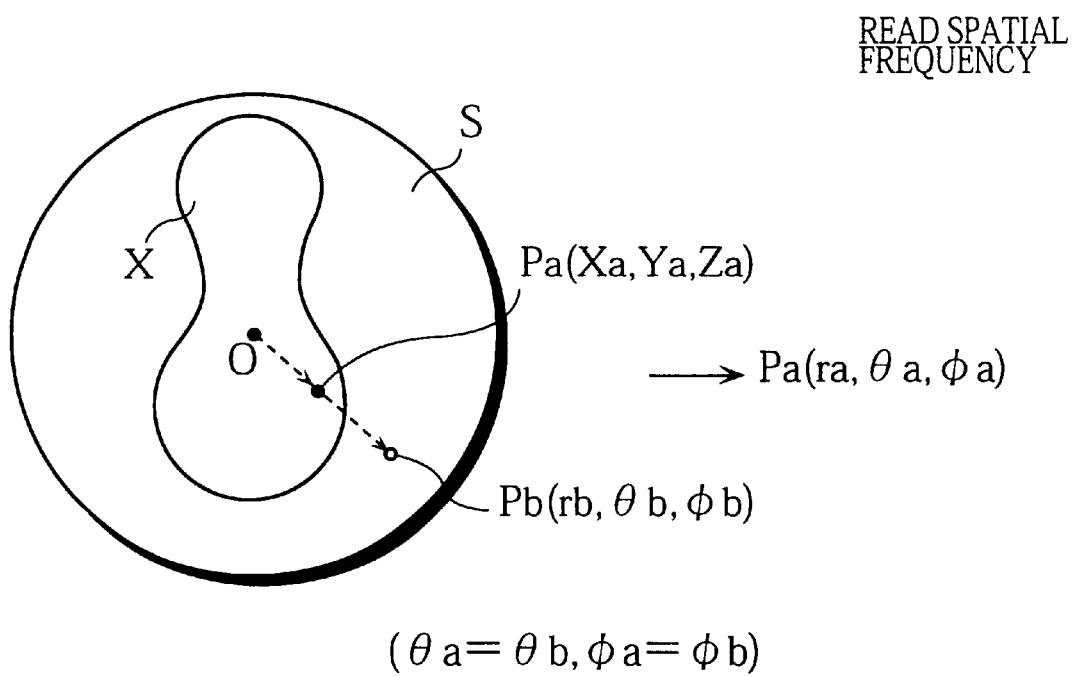
FIG. 39 is a drawing for explaining the mapping of the surface of a solid model in a orthogonal coordinate system and the spherical surface in a polar coordinate system.

The mapping data between the spherical surface in the polar coordinate space and the surface of the solid model "X" is obtained in the manner described below. As shown in FIG. 39, the solid model "X" in the Viewer coordinate system is positioned inside of a spherical surface "S" that is the texture forming face. The center of the spherical surface is positioned at the center of the texture space and the radius of the spherical surface is "rb". The origin of the Viewer coordinate system is the origin of the polar coordinate system, and the origin is positioned inside of the solid model. When the origin is positioned outside of the solid model, the solid model is moved so that the origin is positioned inside of the solid model.

In the mapping mode processing, it is necessary to represent the points on the surface of the solid model and the spherical surface by coordinates in the same coordinate system. As a result, Viewer coordinates (x,y,z) are converted into polar coordinates (r, θ, φ). The conversion is realized by the expressions below.

$$\gamma = \sqrt{x^2 + y^2 + z^2}$$

$$\theta = \begin{cases} \cos^{-1}(Z/r) & (y \geq 0) \\ 2\pi - \cos^{-1}(Z/r) & (y < 0) \end{cases}$$

$$\phi = \begin{cases} \cos^{-1}(x/r\sin\theta) & (z \geq 0) \\ 2\pi - \cos^{-1}(x/r\sin\theta) & (z < 0) \end{cases}$$

The coordinates of the vertexes on the surface of the solid model "X" are converted into the corresponding polar coordinates using these expressions. Then the mapping data is obtained as mentioned below. As shown in FIG. 39, a point "Pb" at which the straight line that is drawn from an origin "O" to a point "Pa" on the surface of the solid model "X" intersects the spherical surface "S" is set as the point corresponding to the point "Pa" in the mapping data. The points "Pa" and "Pb" have the same coordinate values apart from the value of "rb". As a result, when the coordinates of the vertexes on the surface of the solid model "X" are represented by the polar coordinates, angle components "θ" and "φ" are the mapping data of the corresponding points on the spherical surface. The value of the coordinate "r" is fixed and is not needed to be obtained as the mapping data.

The more specific explanation of the mapping mode processing with reference to the flowchart in FIG. 30 will be given below. When the mapping mode activation button 154 in the curved surface mode processing panel 140 is selected, the result of the judgement at Step S721 is "Yes", and the mapping mode processing starts.

In the mapping mode processing, the value of the present spatial frequency is read at Step S722. At Step S723, the texture forming face as shown in FIG. 38 is formed. At Step S724, curved face characteristic amount is calculated for each of the vertexes on the surface of the solid model "X".

The processing in the calculation of the curved face characteristic amount is the same as in the flowchart in FIG. 36 that has been described in the explanation of the point mode processing. When characteristic amount has been calculated for all of the vertexes ("yes" at Step S725), the texture mapping processing is performed at Step S726.

Figure 40:
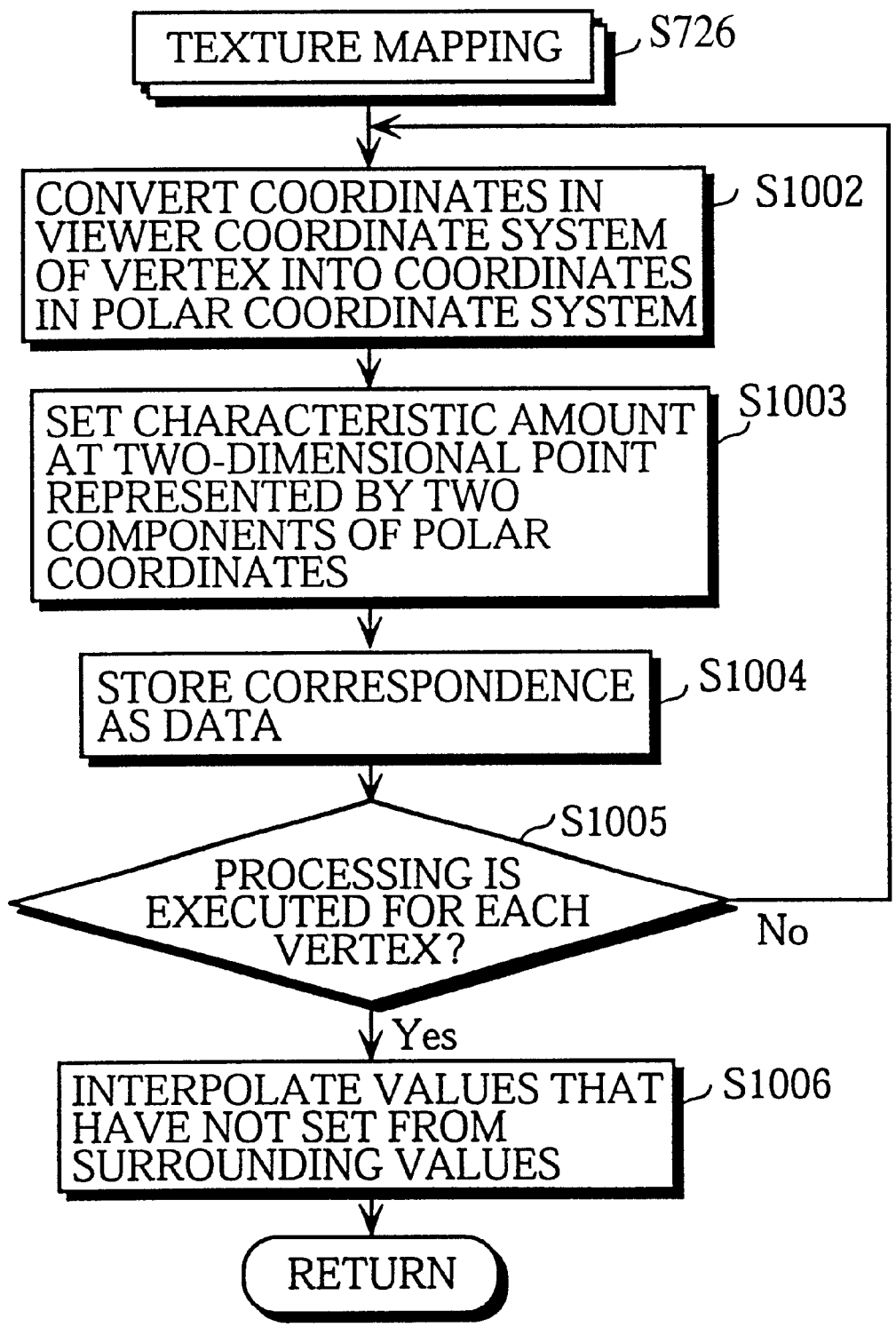
FIG. 40 is a flowchart illustrating the texture mapping processing.

FIG. 40 is a flowchart illustrating the texture mapping processing S726. The coordinates in the Viewer coordinate system of a vertex on the surface of a solid model (that has been moved as necessary) are converted into the coordinates in the polar coordinate system (Step S1002). At Step S1003, the brightness and the RGB values at the vertex is set for the two-dimensional point represented by the two components, the "θ" and "φ" of the polar coordinates into which the coordinates of the vertex has been converted according to the characteristic amount at the vertex. Brightness and the RGB values are set in the same manner as in the area mode processing. At Step S1004, the correspondence between the coordinates in the Viewer coordinate system and the angle components of the polar coordinates is stored as mapping data. When the processing at Steps S1002 to S1004 has been completed for all vertexes of the solid model ("yes" at Step S1005), the image patterns for the parts on the surface of the solid model apart from the vertexes are interpolatorily obtained using the image patterns set for the vertexes at Step S1006. More specifically, the density for the vertexes of a polygon mesh is averaged for a point on the plane surrounded by the vertexes by weighing the density of the vertexes according to the distances between the point and the vertexes, and the density for the point is calculated. As a result, a complete texture pattern is formed on the texture forming face as data.

When the above mentioned processing is completed, the texture pattern that has been obtained as data according to the mapping data is set on the surface of the solid model. The solid model on the surface of which the texture pattern has been set is displayed in a Viewer (Step S727), and the process is completed.

In this embodiment, the vertexes on the surface of the solid model are mapped into the texture forming face, and the texture patterns for the points surrounded by the vertexes are completed based on the density according to the characteristic amount at the vertexes. Instead, it is possible to form the texture pattern in the manner described below. The points on the surface of the solid model corresponding to the points regularly positioned on the texture forming face are obtained. Then, the characteristic amount at the obtained points is calculated, and the density according to the calculated characteristic amount is obtained. The texture pattern is formed according to the obtained density.

In the curved surface mode processing, it is possible to obtain the characteristic amount on the surface of a solid model as numerical values with the adjustment of the spatial frequency and to display the obtained characteristic amount as an image by the mapping mode processing.

Figure 31B:
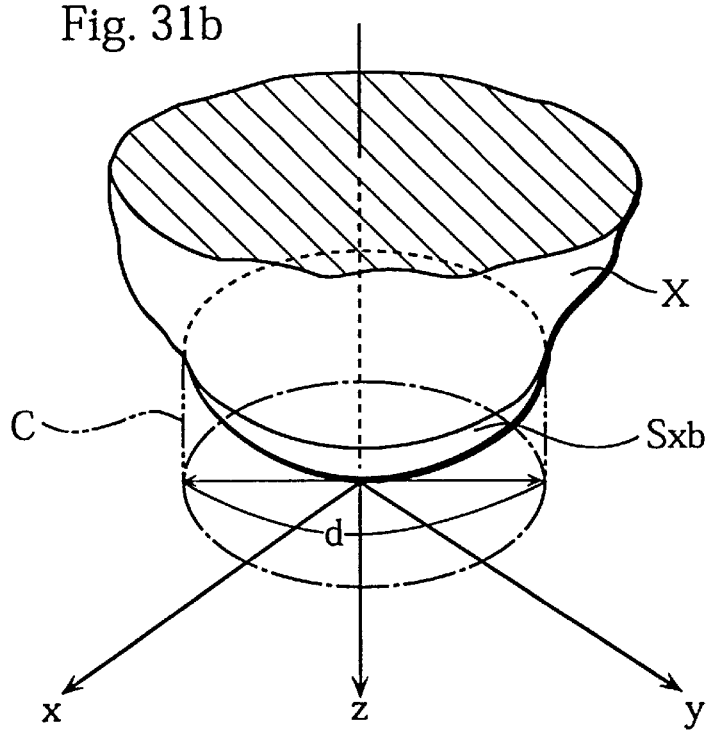
FIG. 31b shows the curved surface for which smoothing processing is executed.
Figure 41:
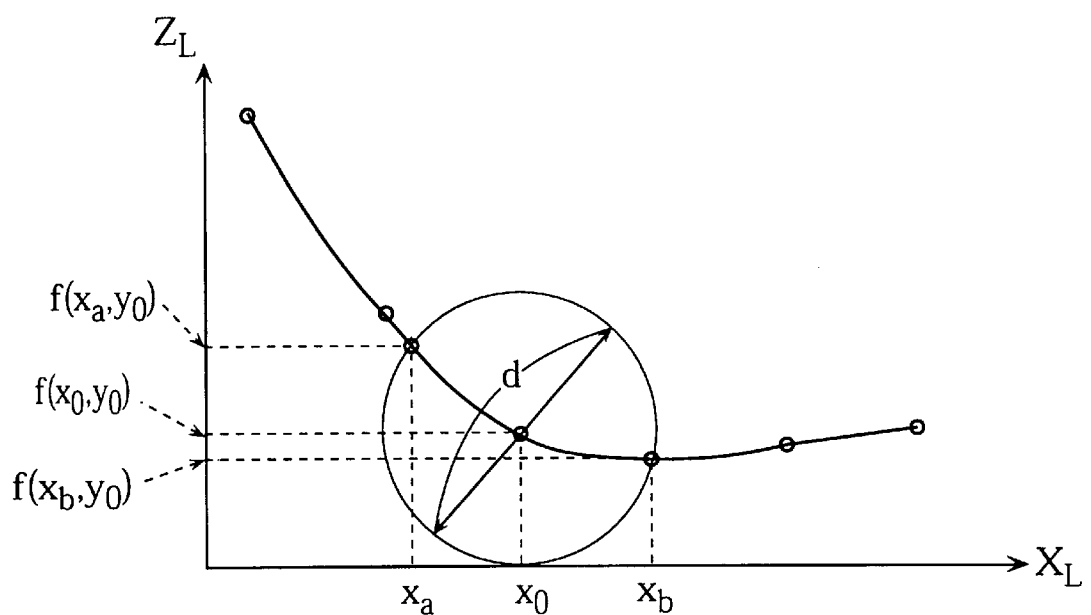
FIG. 41 shows the variable that is used as the coefficient in the calculation of characteristic amount when the area obtained from spatial frequency is positioned inside of a sphere.

In this embodiment, the surface of the solid model that is surrounded by the line of intersection of the surface of the solid model and the circular cylinder that is defined by the interval distance "d" obtained from the spatial frequency is considered a curved surface as shown in FIGS. 31a and 31b when the characteristic amount is calculated. The circular cylinder may instead be a sphere the radius of which corresponds to the interval distance "d". FIG. 41 shows an XLZL-plane in this case corresponding to that in FIGS. 34a and 34b.

In FIG. 41, according to the points of intersection of the sphere the center of which is the target point and the surface of the solid model, values of f(xa,y0) and f(xb,y0) are obtained. Using the values of f(xa,y0) and f(xb,y0), the characteristic amount at the target point may be obtained. As a result, it is possible to use the points in the area at a regular distance from the target point on the surface of the solid model as the data for calculating the characteristic amount at the target point independent of the irregularity of the distances among the vertexes.

In this embodiment, the characteristic amount is displayed by changing the density of pixels in the area mode processing and the mapping processing. Instead, it is possible to display the characteristic amount by changing the color or the pattern of hatching.

In this embodiment, a differential value and a curvature are used as the characteristic amount obtained from the shape of the solid model. Instead, it is possible to use other kinds of characteristic amount. For instance, a Laplacian Δ that is represented by the expression below may be calculated as the characteristic amount.

$$\Delta = \frac{\partial^2 f}{\partial x^2} + \frac{\partial^2 f}{\partial y^2} + \frac{\partial^2 f}{\partial z^2}$$

The Laplacian Δ represents the degree of the edge on the surface of a three-dimensional shape model. A specified coefficient in the polynomial representing a smoothed curved surface, the average of the curvature, and the like may be used as the characteristic amount.

(3-6) Supplement Mode Processing

Figure 42A:
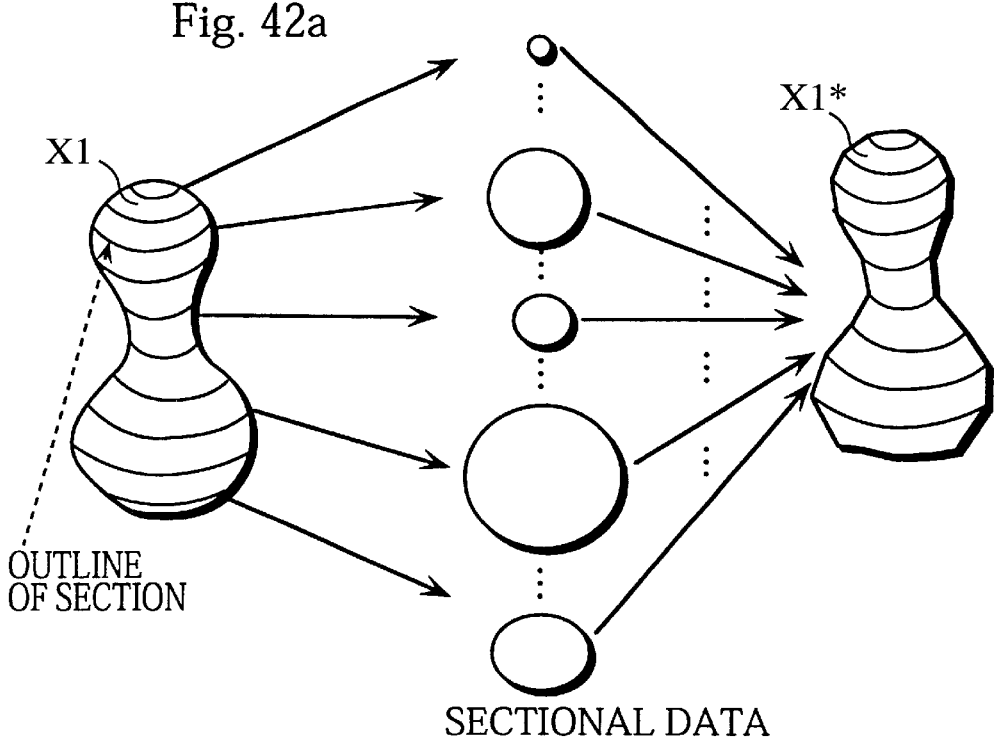
FIG. 42a shows a model of the process for decomposing a solid model including no data loss part into sectional data and recreating the solid model.

In the supplement mode processing, the data loss part of a solid model is automatically supplemented. The basic manner of the supplement mode processing will be explained with reference to FIGS. 42a and 42b. For instance, the solid model "X1" is cut with a plurality of planes the normals of which are in one direction as shown in FIG. 42a. By doing so, a plurality of pieces of sectional data (a plurality of outlines) may be obtained by the same calculation as in the cut mode processing that has been described. When the obtained outlines are put in the same direction in the three-dimensional space and are connected with polygons, a solid model "X1*" is created. When the gaps between the planes for cutting the solid model "X1" are narrow enough, the solid models "X1" and "X1*" are almost the same one.

Figure 42B:
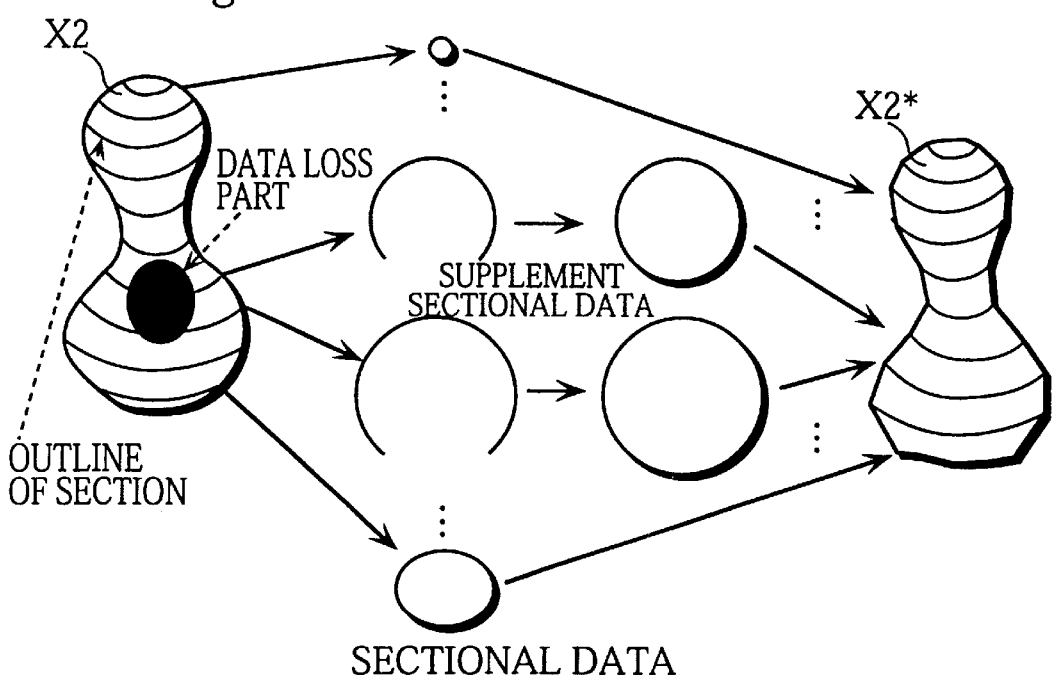
FIG. 42b shows a model of the process for decomposing a solid model including a loss part into sectional data and recreating the solid model.

When a solid model "X2" that has a data loss part is cut with a plurality of planes the normals of which are in one direction as shown in FIG. 42b in the same manner as the solid model "X1", a plurality of pieces of sectional data (a plurality of outlines) are obtained. In this case, an obtained outline that includes the data loss part is judged as the outline of the open section, which is not a closed section because the segments included in the outline are not completely connected, in the flowchart of the connection of segments in FIG. 17b in the cut mode processing. It is possible to change such an open section into a closed one by supplementing the outline. When the outlines of such open sections have been supplemented and when the obtained outlines are put in the three-dimensional space and connected with polygons, a solid model "X2*" is created. When the gaps between the planes for cutting the solid model "X2" are narrow enough, the solid models "X2" and "X2*" are almost the same one, and the data loss part is supplemented.

In the supplement mode processing, the direction of the normal of the planes that cut the solid model is important. The normal should be set so that the data loss part is sliced properly. In this embodiment, the Z-axis of the standard plate is set as the direction of the normal of the planes that cut the solid model so that the user may set the proper direction.

Figure 43:
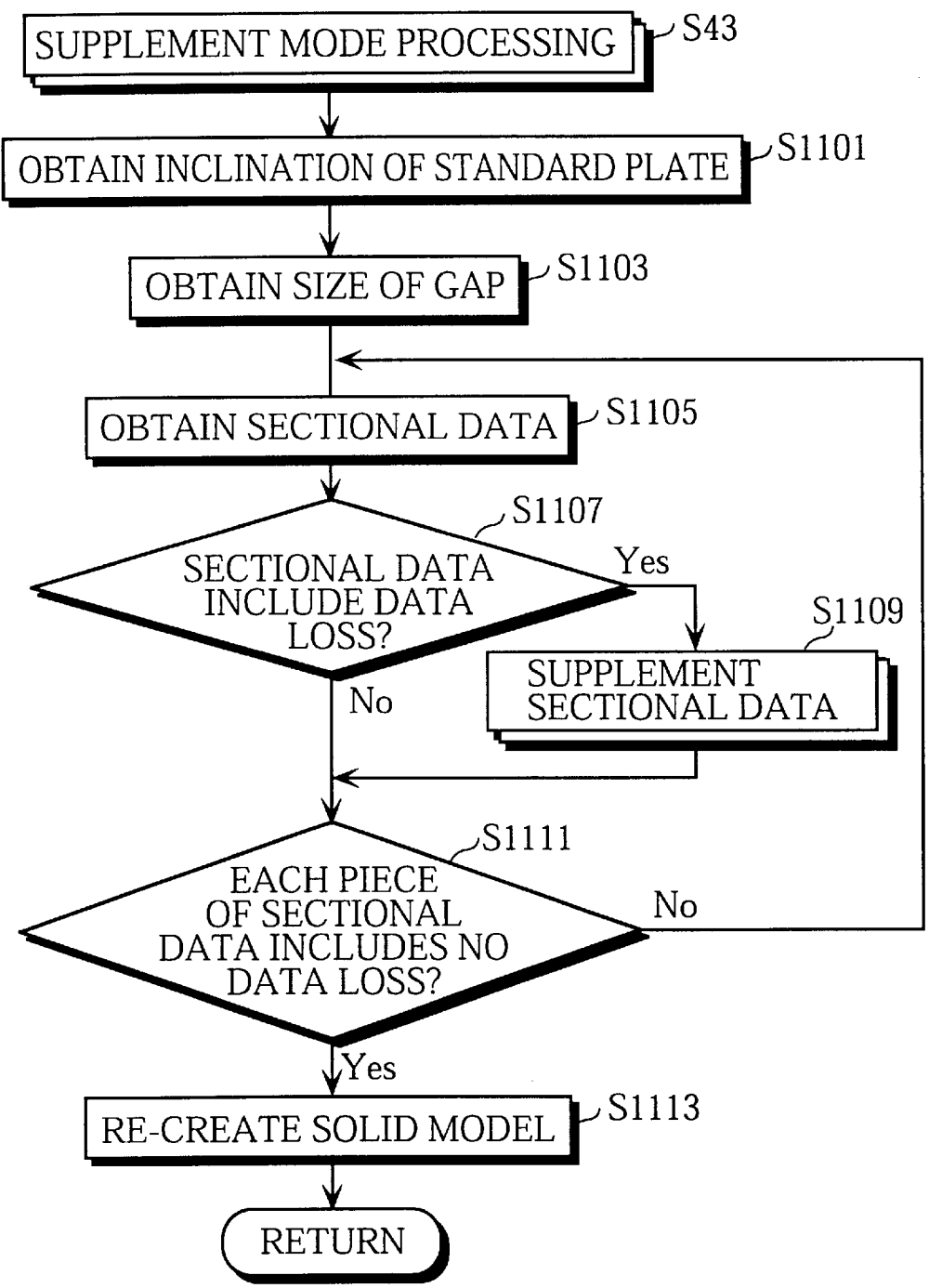
FIG. 43 is a flowchart illustrating the supplement mode processing.

In the flowchart of the measuring processing in FIG. 11, when the supplement mode activation button 74 (refer to FIG. 12) is selected, the result of the judgement at Step S36 is "yes", and the process proceeds to the supplement mode processing at Step S43. FIG. 43 is a flowchart illustrating the supplement mode processing. In the supplement mode processing, the inclination of the standard plate set by the user is obtained at Step S1101. At Step S1103, the height of the solid model in the Z-axis is obtained, and the size of the gap between the planes that cut the solid model are calculated from the obtained height. In this embodiment, the size of the gap is 1/1000 of the height of the solid model.

At Step S1105, the solid model is cut with each of a plurality of planes the gap between which is 1/1000 of the height of the solid model in the Z-axis, and a plurality of pieces of sectional data (a plurality of outlines) are obtained. The sectional data are obtained in the same manner as in the cut mode processing that has been explained. At Step S1107, whether data loss is included in the sectional data, i.e., whether the obtained outlines includes the outline of an open section is judged. When it is the case, the sectional data are supplemented at Step S1109. The supplement processing will be described later in detail.

When each sectional data that includes data loss has been supplemented ("yes" at Step S1111), the obtained sectional data including the supplemented sectional data are connected to restore the original solid model at Step S1113. At Step S1113, the process is completed.

(3-6-1) Sectional Data Supplement Processing

Figure 44A:
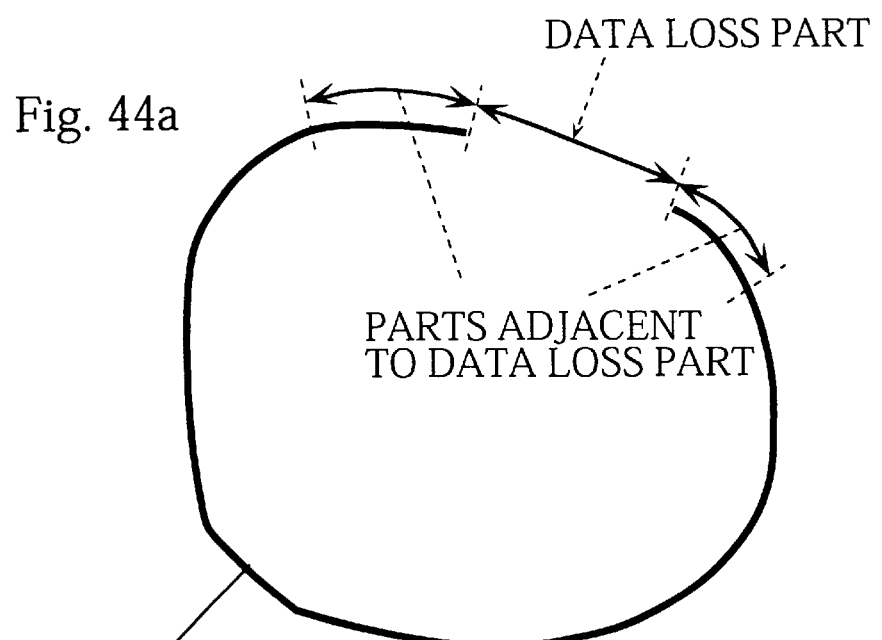
FIG. 44a shows an example of the outline that includes a data loss part.
Figure 44B:
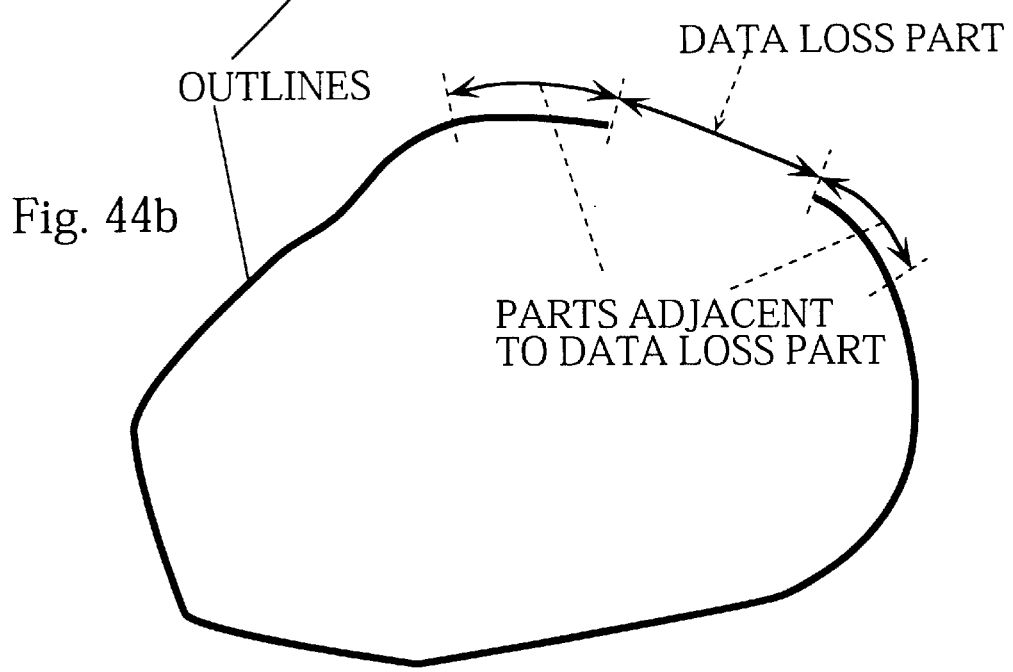

The processing of the supplement of sectional data at Step S1109 will be explained below. In the sectional data supplement processing, sectional data is supplemented only using the shape of the part adjacent to the data loss part. In FIGS. 44a and 44b, the data loss parts of the outlines represent the same data loss part in a solid model. In FIGS. 44a and 44b, the shapes of the parts of the outlines apart from the data loss part are quite different from the shapes of the parts adjacent to the data loss parts. As a result, if the data loss parts are supplemented considering the shape of the parts apart from the data loss parts, the shapes of the supplemented outlines are quite different from each other. On the other hand, when the outlines are supplemented considering the adjacent parts, the supplemented outlines are almost the same.

Figure 45:
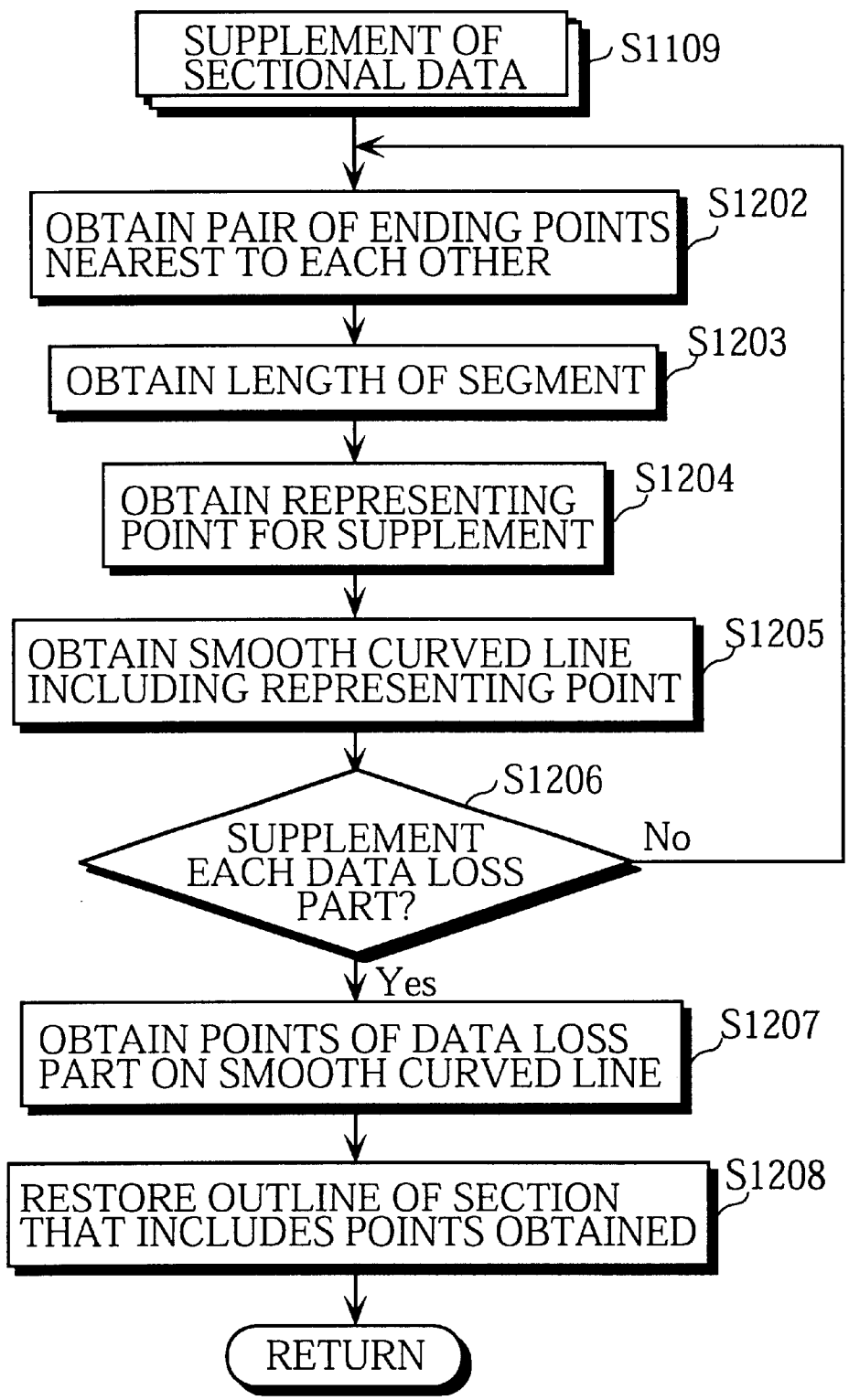
FIG. 45 is a flowchart illustrating the sectional data supplement processing.
Figure 46A:
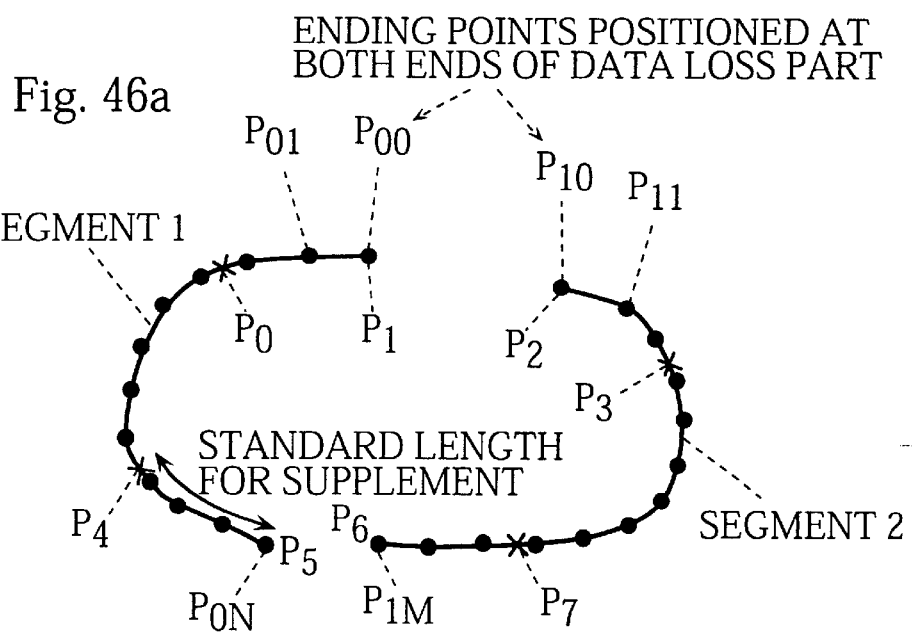
FIG. 46a shows an example of the outline of the section representing the sectional data including data loss.

FIG. 45 is a flowchart illustrating the sectional data supplement processing. FIG. 46a shows an example of the outline of the section representing the sectional data including data loss. The outline in FIG. 46a includes two segments, a segment 1(P00, P01, . . . , P0N) and a segment 2(P10, P11, . . . , P1M). In the outline in FIG. 46a, the parts between points P00 and P10, and between points P0N and P1M are data loss parts. In the flowchart in FIG. 45, the pairs of ending points that are nearest to each other, i.e., the pairs of the ending points positioned at the both ends of the data loss parts are obtained at Step S1202. In FIG. 46a, pairs (P00, P10) and (P0N, P1M) are obtained. Here, the points P00, P10, P0N, and P1M are represented by points P1, P2, P5, and P6, respectively.

At Step S1203, the lengths of the segments 1 and 2 are calculated. At Step S1204, standard lengths for the supplement are obtained according to the calculated lengths. In this embodiment, one fifth of a segment length from a point positioned at an end of a data loss part is set as a standard length for the supplement of the data loss part. The point the standard length apart from the ending point positioned at an end of a data loss part on the segment is set as a representing point. Such a representing point is obtained by an appropriate interpolation. For instance, representing points, P0, P3, P4, and P7 are obtained in FIG. 46a.

At Step S1205, a smooth curved line including a pair of ending points that has been obtained at Step S1202 and a representing point that has been obtained at Step S1204 for the same data loss part is drawn. Such a smooth curved line is drawn in accordance with a general blending modulus. More specifically, a smooth curved line including a pair of ending points, i.e., the points P1 and P2, and the representing points P0 and P3 is obtained by the expression below. In this expression, the points P1 and P2, and the representing points P0 and P3 are position vectors, and a coordinate vector C(t) ($0 \leq t \leq 1$) on the curved line including the four points is calculated in accordance with the general blending modulus.

$$C(t) = [\,t^3 \ \ t^2 \ \ t^1 \ \ t^0\,]\,[A]\,[G]$$

Where $$A = \begin{bmatrix} \dfrac{-(1-\alpha)^2}{\alpha} & \dfrac{(1-\alpha)+\alpha\beta}{\alpha} & \dfrac{-(1-\alpha)^2-\alpha\beta}{\alpha} & \dfrac{\beta^2}{1-\beta} \\ \dfrac{2(1-\alpha)^2}{\alpha} & \dfrac{-2(1-\alpha)-\alpha\beta}{\alpha} & \dfrac{2(1-\alpha)-\beta(1-2\alpha)}{\alpha} & \dfrac{-\beta^2}{1-\beta} \\ \dfrac{-(1-\alpha)^2}{\alpha} & \dfrac{-(1-2\alpha)}{\alpha} & \alpha & 0 \\ 0 & 1 & 0 & 0 \end{bmatrix}$$

$$[G]^T = [\,P0 \ \ P1 \ \ P2 \ \ P3\,]$$

$$\alpha = \frac{|[P1]-[P0]|}{|[P2]-[P1]|+|[P1]-[P0]|}$$

$$\beta = \frac{|[P2]-[P1]|}{|[P3]-[P2]|+|[P2]-[P1]|}$$

Figure 46B:
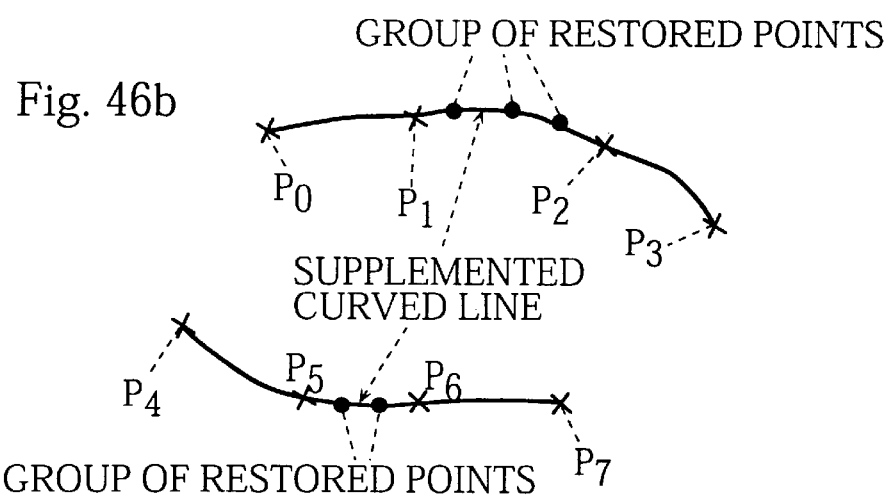
FIG. 46b shows the data loss part of the outline shown in FIG. 46a supplemented by a curved line.

At Step S1205, the curved line that connects the points P1 and P2 smoothly as shown in FIG. 46b is obtained.

Figure 46C:
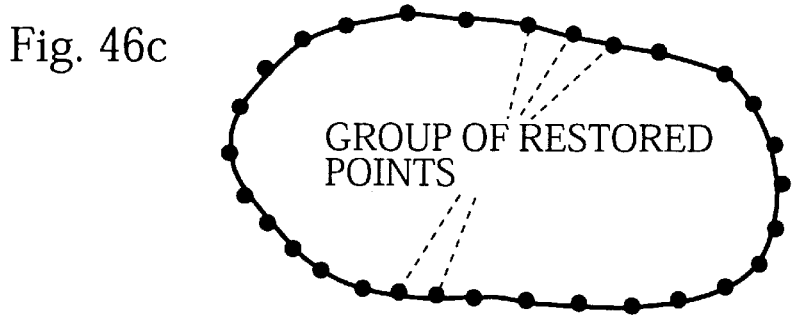
FIG. 46c shows the outline shown in FIG. 46a when the outline is supplemented.

At Step S1206, whether each data loss part has been supplemented is judged. When it is the case, appropriate several points are restored on the curved lines that have been obtained at Step S1205 as shown in FIG. 46b at Step S1207. At Step S1208, the outline of a section that includes the restored points is restored, and the sectional data is restored. As a result, the sectional data shown in FIG. 46a is restored as shown in FIG. 46c. In the supplement mode processing that has been described, the data loss part of a solid model may be easily supplemented. In this embodiment, the direction of the normal of the sections of the solid model is designated with a hand process using the standard plate. The direction of the normal may instead be obtained automatically by solid model processing such as thinning. In this embodiment, each section of the solid model has the same normal direction. It is not necessary for each section to have the same normal direction.

As has been described, it is possible for the three-dimensional shape data processing apparatus according to the present embodiment to process and analyze three-dimensional shape data in the cut mode processing, the distance mode processing, the curved surface mode processing, and the supplement mode processing.

In this embodiment, the three-dimensional shape data of an object that has been optically read is processed and analyzed. Three-dimensional data that is created by a modeler and the like may instead be processed and analyzed. In this embodiment, a solid model is made of polygon meshes. A solid model may instead be made of other data. For instance, voxel data, a plurality of pieces of outline data, face data by a parametric representation such as NURBS, and computer aided design (CAD) data.

Although the present invention has been fully described by way of examples with reference to the accompanying drawings, it is to be noted that various changes and modifications will be apparent to those skilled in the art. Therefore, unless such changes and modifications depart from the scope of the present invention, they should by construed as being included therein.

What is claimed is:

1. A three-dimensional shape data processing apparatus that measures a length of a path on a surface of a three-dimensional shape represented by three-dimensional shape data, comprising:

a point acceptance section for accepting input of at least four points that designates the path on the surface of the three-dimensional shape;

a grouping section for grouping the points that have been accepted by the point acceptance section to form groups, each of which includes three accepted points, wherein two accepted points in one group are also included in another group;

a first length obtaining section for obtaining each first length that is a length between two adjacent accepted points of three accepted points in one of the groups along a line of intersection of a plane including the three accepted points and the surface of the three-dimensional shape for each of the groups;

a second length obtaining section for obtaining each second length that is a length between two accepted points commonly included in two of the groups along the path that has been designated by the point acceptance section according to first lengths that have been obtained by the first length obtaining section.

2. A three-dimensional shape data processing apparatus according to claim 1, wherein the second length between two accepted points commonly included in two of the groups is obtained according to two first lengths between the two points.

3. A three-dimensional shape data processing apparatus according to claim 1 further comprising a path length calculation section for calculating the length of the path passing all of the accepted points on the surface of the three-dimensional shape.

4. A three-dimensional shape data processing apparatus according to claim 3, wherein the path length calculation section calculates the length of the path passing the accepted points on the surface of the three-dimensional shape according to each first length and second length that has been obtained by the first length obtaining section and the second length obtaining section, respectively.

5. A three-dimensional shape data processing apparatus that calculates a characteristic amount representing a shape of a surface of a three-dimensional shape represented by three-dimensional shape data, comprising:

a distance information obtaining section for obtaining distance information;

a point obtaining section for obtaining a plurality of points in an area defined by the obtained distance information on the surface of the three-dimensional shape; and a characteristic amount calculation section for considering the surface of the three-dimensional shape including the obtained plurality of points to be a smoothed curved surface and for calculating the characteristic amount for a shape of the smoothed curved surface;

wherein the distance information obtaining section accepts a distance designated by a user and obtains the distance information.

6. A three-dimensional shape data processing apparatus that calculates a characteristic amount representing a shape of a surface of a three-dimensional shape represented by three-dimensional shape data, comprising:

a distance calculation section for calculating a distance on the basis of data of a plurality of points comprised in the three-dimensional shape data;

a point obtaining section for obtaining a plurality of points in an area defined by the calculated distance on the surface of the three-dimensional shape; and a characteristic amount calculation section for considering the surface of the three-dimensional shape including the obtained plurality of points to be a smoothed curved surface and for calculating the characteristic amount for a shape of the smoothed curved surface;

wherein the point obtaining section includes:

a target point obtaining section for obtaining a target point on the surface of the three-dimensional shape; and wherein the area is defined as including the target point.

7. A three-dimensional shape data processing apparatus according to claim 6, wherein the characteristic amount calculation section calculates the characteristic amount at the target point that has been obtained by the target point obtaining section.

8. A three-dimensional shape data processing apparatus that processes three-dimensional shape data representing a three-dimensional shape, comprising:

a characteristic amount obtaining section for obtaining a characteristic amount that represents a shape of a surface of the three-dimensional shape at a plurality of points on the surface of the three-dimensional shape;

a texture creation section for creating a texture pattern on a texture forming face that corresponds to the surface of the three-dimensional shape according to the obtained characteristic amount at the plurality of points on the surface of the three-dimensional shape; and a texture mapping section for mapping the created texture pattern on the surface of the three-dimensional shape.

9. A three-dimensional shape data processing apparatus according to claim 8, wherein the texture forming face is a spherical surface.

10. A three-dimensional shape data processing apparatus according to claim 8, wherein the texture creation section creates the texture pattern by changing brightness and/or colors according to the obtained characteristic amount.

11. A three-dimensional shape data processing apparatus that supplements a deficit of three-dimensional shape data, comprising:

a section obtaining section for cutting a three-dimensional shape represented by the three-dimensional shape data with a plurality of planes to obtain a plurality of sections, each of which is represented by a piece of sectional data;

a lack extracting section for extracting a lack of each outline for each of the plurality of sections;

a supplement section for supplementing the lack of each outline extracted by the lack extracting section, and for supplementing sectional data corresponding to the lack; and a restoration section for restoring the three-dimensional shape data using pieces of sectional data including the sectional data that have been supplemented by the supplement section.

12. A three-dimensional shape data processing apparatus according to claim 11, wherein the section obtaining section includes:

a direction obtaining section for obtaining a direction for the three-dimensional shape; and a slice section for cutting the three-dimensional shape with a plurality of parallel planes a direction of normals of which is the obtained direction, and for obtaining the plurality of pieces of sectional data.

13. A three-dimensional shape data processing apparatus according to claim 11, wherein the supplement section includes:

a shape data obtaining section for obtaining shape data of a part of an outline with a lack, the part that has a predetermined length and is adjacent to the lack; and an outline completion section for completing the lack using the shape data that has been obtained by the shape data obtaining section.

14. A storage medium storing a program that has a computer operate as a three-dimensional shape data processing apparatus that measures a length of a path on a surface of a three-dimensional shape represented by three-dimensional shape data, wherein a process recorded on the program comprises:

a point acceptance step of accepting input of at least four points that designates the path on the surface of the three-dimensional shape;

a grouping step of grouping the points that have been accepted at the point acceptance step to form groups, each of which includes three accepted points, wherein two accepted points in one group are included in another group;

a first length obtaining step of obtaining each first length that is a length between two adjacent accepted points of three accepted points in one of the groups along a line of intersection of a plane including the three accepted points and the surface of the three-dimensional shape for each of the groups;

a second length obtaining step of obtaining each second length that is a length between two accepted points commonly included in two of the groups along the path that has been designated at the point acceptance step according to first lengths that have been obtained at the first length obtaining step.

15. A storage medium according to claim 14, wherein at the second length obtaining step, a second length between two accepted points commonly included in two of the groups is estimated from two first lengths between the two accepted points when obtaining the second length.

16. A storage medium according to claim 14 further comprising a path length calculation step of calculating the length of the path passing all of the accepted points on the surface of the three-dimensional shape.

17. A storage medium according to claim 16, wherein at the path length calculation step, the length of the path passing the accepted points on the surface of the three-dimensional shape is calculated according to each first length and second length that has been obtained at the first length obtaining step and the second length obtaining step, respectively.

18. A storage medium storing a program that has a computer operate as a three-dimensional shape data processing apparatus that calculates a characteristic amount representing a shape of a surface of a three-dimensional shape represented by three-dimensional shape data, wherein a process recorded on the program comprises:

a distance information obtaining step of obtaining distance information;

a point obtaining step of obtaining a plurality of points in an area defined by the obtained distance information on the surface of the three-dimensional shape;

a characteristic amount calculation step of considering the surface of the three-dimensional shape including the obtained plurality of points to be a smoothed curved surface and for calculating the characteristic amount for a shape of the smoothed curved surface;

wherein at the distance information obtaining step, a distance designated by a user is accepted as the distance information.

19. A storage medium storing a program that has a computer operate as a three-dimensional shape data processing apparatus that calculates a characteristic amount representing a shape of a surface of a three-dimensional shape represented by three-dimensional shape data, wherein a process recorded on the program comprises:

a distance calculation step of calculating a distance on the basis of data of a plurality of points comprised in the three-dimensional shape data;

a point obtaining step of obtaining a plurality of points in an area defined by the calculated distance on the surface of the three-dimensional shape; and a characteristic amount calculation step of considering the surface of the three-dimensional shape including the obtained plurality of points to be a smoothed curved surface and for calculating the characteristic amount for a shape of the smoothed curved surface;

wherein the point obtaining step includes:

a target point obtaining step of obtaining a target point on the surface of the three-dimensional shape; and wherein the area is defined as including the target point.

20. A storage medium according to claim 19, wherein at the characteristic amount calculation step, the characteristic amount at the target point that has been obtained at the target point obtaining step is calculated.

21. A storage medium storing a program that has a computer operate as a three-dimensional shape data processing apparatus that processes three-dimensional shape data, wherein a process recorded on the program comprises:

a characteristic amount obtaining step of obtaining a characteristic amount that represents a shape of a surface of the three-dimensional shape at a plurality of points on the surface of the three-dimensional shape;

a texture creation step of creating a texture pattern on a texture forming face that corresponds to the surface of the three-dimensional shape according to the obtained characteristic amount at the plurality of points on the surface of the three-dimensional shape; and a texture mapping step of mapping the created texture pattern on the surface of the three-dimensional shape.

22. A storage medium according to claim 21, wherein at the texture creation step, the texture pattern is created on a spherical surface as the texture forming face.

23. A storage medium according to claim 21, wherein at the texture creation step, the texture pattern is created by changing brightness and/or colors according to the obtained characteristic amount.

24. A storage medium storing a program that has a computer operate as a three-dimensional shape data processing apparatus that supplements a deficit of three-dimensional shape data, wherein a process recorded on the program comprises:

a section obtaining step of cutting a three-dimensional shape represented by the three-dimensional shape data with a plurality of planes to obtain a plurality of sections, each of which is represented by a piece of sectional data;

a lack extracting step of extracting a lack of each outline for each of the plurality of sections;

a supplement step of supplementing the lack of each outline found at the lack extracting step, and of supplementing sectional data corresponding to the lack; and a restoration step of restoring the three-dimensional shape data using pieces of sectional data including the sectional data that have been supplemented at the supplement step.

25. A storage medium according to claim 24, wherein the section obtaining step includes:

a direction obtaining step of obtaining a direction for the three-dimensional shape; and a slice step of cutting the three-dimensional shape with a plurality of parallel planes a direction of normals of which is the obtained direction, and for obtaining the plurality of pieces of sectional data.

26. A storage medium according to claim 24, wherein the supplement step includes:

a shape data obtaining step of obtaining shape data of a part of an outline with a lack, the part that has a predetermined length and is adjacent to the lack; and an outline completion step of completing the lack using the shape data that has been obtained at the shape data obtaining step.

* * * * *